(12) United States Patent
Kondo

(10) Patent No.: US 6,848,301 B2
(45) Date of Patent: Feb. 1, 2005

(54) CYLINDER-BY-CYLINDER INTAKE AIR QUANTITY DETECTING APPARATUS FOR INTERNAL COMBUSTION ENGINE

(75) Inventor: Wakichi Kondo, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/721,770

(22) Filed: Nov. 26, 2003

(65) Prior Publication Data

US 2004/0129249 A1 Jul. 8, 2004

(30) Foreign Application Priority Data

Nov. 28, 2002 (JP) .......................... 2002-344891
Dec. 12, 2002 (JP) .......................... 2002-360386

(51) Int. Cl.$^7$ .................... G01M 15/00; F02D 41/14
(52) U.S. Cl. .................. 73/118.2; 123/435; 123/494
(58) Field of Search .............. 123/406.24, 406.25, 123/406.41, 435, 436, 494; 73/116, 118.2; 701/111

(56) References Cited

U.S. PATENT DOCUMENTS 4,999,781 A * 3/1991 Holl et al. .............. 701/108
5,398,544 A * 3/1995 Lipinski et al. ........... 73/118.2
6,728,627 B2 * 4/2004 Machida .................. 73/118.2

FOREIGN PATENT DOCUMENTS

| JP | 62-017342 | 1/1987 |
| JP | 2000-220489 | 8/2000 |

* cited by examiner

Primary Examiner—Tony M. Argenbright
(74) Attorney, Agent, or Firm—Nixon & Vanderhye P.C.

(57) ABSTRACT

A rate of cylinder-to-cylinder variations in an intake air quantity is calculated, and learned as a learning value based on an output from an airflow meter when a predetermined condition is met. The predetermined condition is set at a preferable condition for learning the rate of cylinder-to-cylinder variations. Subsequently, the rate of cylinder-to-cylinder variations is estimated based on the learning value when the predetermined condition is not met. Thus, cylinder-to-cylinder variations of an engine are accurately obtained in almost all the operating ranges, so that the measurement of the cylinder-by-cylinder intake air quantity with high degree of accuracy is achieved.

11 Claims, 37 Drawing Sheets

CYLINDER-BY-CYLINDER INTAKE AIR QUANTITY DETECTING APPARATUS FOR INTERNAL COMBUSTION ENGINE

CROSS REFERENCE TO RELATED APPLICATION

This application is based on and incorporates herein by reference Japanese Patent Applications No. 2002-344891 filed on Nov. 28, 2002 and No. 2002-360386 filed on Dec. 12, 2002.

FIELD OF THE INVENTION

The present invention relates to a cylinder-by-cylinder intake air quantity detecting apparatus for an internal combustion engine for detecting the rate of cylinder-to-cylinder variations in intake air quantity or cylinder-by-cylinder intake air quantities.

BACKGROUND OF THE INVENTION

In general, in an internal combustion engine having a plurality of cylinders, cylinder-to-cylinder variations in intake air quantity (quantity of air introduced into a cylinder) may result due to the difference in shapes of intake manifolds of the cylinders or variations in valve clearances among intake valves. Such cylinder-to-cylinder variations in the intake air quantity may cause cylinder-to-cylinder variations in torque or in air-fuel ratio. When the cylinder-to-cylinder variations in torque increase, variations in engine torque in a cycle increase, whereby vibrations may cause uncomfortable feeling to a driver. When the cylinder-to-cylinder variations in air-fuel ratio increase, variations in air-fuel ratio of exhaust gas, which flow into a catalyst in a cycle, increase correspondingly. Consequently, the margin of fluctuations of air-fuel ratio of exhaust gas may exceed the purification capacity of the catalyst, whereby the rate of exhaust gas purification may be lowered.

As a countermeasure of such problems, some methods for correcting cylinder-to-cylinder variations in torque or variations in air-fuel ratio are proposed. For example, Patent Document 1 (JP-A-62-17342), proposes a technology in which a torque sensor provided on a crankshaft detects torque generated at each cylinder, and the fuel injection quantity of each cylinder is corrected, so that average torque of all the cylinders is produced in each cylinder.

Patent Document 2 (JP-A-2000-220489), proposes a technology in which the air-fuel ratio of each cylinder is estimated based on the output from an air-fuel ratio sensor provided on an exhaust pipe, and the fuel injection quantity of each cylinder is corrected so as to reduce the cylinder-to-cylinder variations in air-fuel ratio.

In general, a throttle valve controls the intake air quantity. In recent years, however, a variable intake valve mechanism is provided for varying the lift amount of the intake valve. The lift amount of the intake valve is controlled according to the position of an accelerator, or the conditions of the engine operation, so that the intake air quantity is controlled. Such intake air quantity controlled by the variable intake valve is advantageous, because the intake air quantity may be reduced by reducing the lift amount of the intake valve, without throttling the air intake passage by the throttle valve. Thus pumping loss may be reduced, thereby reducing fuel consumption.

However, in the intake air quantity control with the variable intake valve, since the lift amount of the intake valve decreases at low load, the actual lift amount with respect to the rate of the target lift amount varies increasingly from cylinder to cylinder (variations due to cylinder-to-cylinder differences in component tolerance and assembling tolerance), which may lead to increase in cylinder-to-cylinder variations in intake air quantity. Therefore, fluctuations in torque or the air-fuel ratio in each cylinder may result due to the effect of cylinder-to-cylinder variations in intake air quantity, and hence cylinder-to-cylinder variations in torque or in air-fuel ratio may increase.

In the above Patent Documents 1 and 2, toque and the air-fuel ratio are detected for every individual cylinder, and cylinder-to-cylinder variations in torque and in air-fuel ratio are corrected by manipulating the fuel injection quantity of each cylinder based on the detected data. However, when cylinder-to-cylinder variations in intake air quantity increase, it becomes difficult to correct cylinder-to-cylinder variations in torque and in air-fuel ratio with high degree of accuracy simply by correcting the fuel injection quantity. In addition, it is also difficult to correct such variations with high degree of accuracy when the cylinder-to-cylinder variations in torque and in air-fuel ratio is generated from a combination of a plurality of causes such as cylinder-to-cylinder variations in intake air quantity and in intake fuel quantity.

Furthermore, an airflow meter or an intake pipe pressure sensor is mounted to an intake pipe assembly, which tends to be affected by the reflected waves of the intake air pulsation or the air intake interference of other cylinders. Therefore, the output waveforms from the airflow meter or the intake pipe pressure sensor contains noise caused by the reflected waves of the intake air pulsation or air intake interference of other cylinders. Therefore, the output waveforms from the airflow meter or the intake pipe pressure sensor do not become pulsation waveforms which reflect cylinder-to-cylinder variations in intake air quantity with high degree of accuracy in some operating ranges due to the effect of reflected waves or the intake air interference. Thus cylinder-to-cylinder variations in intake air quantity may not be detected with high degree of accuracy.

When a vehicle is actually traveling, since the operating condition changes every second, so that time (or the number of times) for sampling the outputs from the airflow meter or from the intake pipe pressure sensor cannot be secured sufficiently in some operating ranges, which may also become a cause of failure to detect the cylinder-to-cylinder variations in intake air quantity with high degree of accuracy.

SUMMARY OF THE INVENTION

In view of such circumstances, it is an object of the present invention to provide a cylinder-by-cylinder intake air quantity detecting apparatus for an internal combustion engine in which cylinder-to-cylinder variations in intake air quantity (rate of cylinder-to-cylinder variations) can be detected with high degree of accuracy even in the operating ranges in which information, which reflects cylinder-to-cylinder variations in intake air quantity with high degree of accuracy, cannot be detected easily from the output from a detecting unit such as an airflow meter. Thus, accuracy for detecting cylinder-to-cylinder variations may be improved in substantially all the operating ranges.

In order to achieve the object described above, a cylinder-by-cylinder variation detecting apparatus for an internal combustion engine includes a detecting unit for detecting at least one of the intake air quantity flowing in an intake pipe, the pressure in the intake pipe, and the in-cylinder pressure for the internal combustion engine having a plurality of cylinders, and is adapted in such a manner that in the operating range in which a predetermined condition to execute variation learning is met, the rate of cylinder-to-cylinder variations in intake air quantity or the cylinder-by-cylinder intake air quantities are calculated and the calculated value is learned as a learning value of cylinder-to-cylinder variations based on the output from the detecting unit by a cylinder-by-cylinder variation learning unit. While in the operating range in which the condition to execute variation learning is not met, the rate of cylinder-to-cylinder variations in intake air quantity or the cylinder-by-cylinder intake air quantity are estimated depending on the current operating range using the learning value of cylinder-to-cylinder variations by a cylinder-to-cylinder variations estimating unit.

In this manner, the learning value of cylinder-to-cylinder is learned with high degree of accuracy in the operating range, in which the condition to execute variation learning is met, and information reflects the cylinder-to-cylinder variations in intake air quantity from the output from the detecting unit such as an airflow meter with high degree of accuracy. In other operating ranges, the rate of cylinder-to-cylinder variations in intake air quantity or the cylinder-by-cylinder intake air quantity is estimated depending on the current operating range using the learning value of cylinder-to-cylinder variations with high degree of accuracy described above. Therefore, the rate of cylinder-to-cylinder variations in intake air quantity or the cylinder-by-cylinder intake air quantity may be calculated with relatively high degree of accuracy.

Alternatively, the areas of output waveform from the detecting unit for a predetermined period is calculated for every intake stroke or for every compression stroke of each cylinder by an area calculating unit. Then, the rate of cylinder-to-cylinder variations of intake air quantity or the cylinder-by-cylinder intake air quantity is calculated by the cylinder-to-cylinder variations in intake air quantity calculating unit based on the area of the waveform for the predetermined period of the air cylinder as described-above.

The reason for calculating the area of the output waveform from the detecting unit is that, the effect of noise or the like may be reduced when the area of is used, in comparison with the case in which the instantaneous output value from the detecting unit is used. The period for calculation of the area is limited to a predetermined period, so as to confine the period for calculation of the area to the period that has less error-causing factors.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

<<First Embodiment>>

Figure 1:
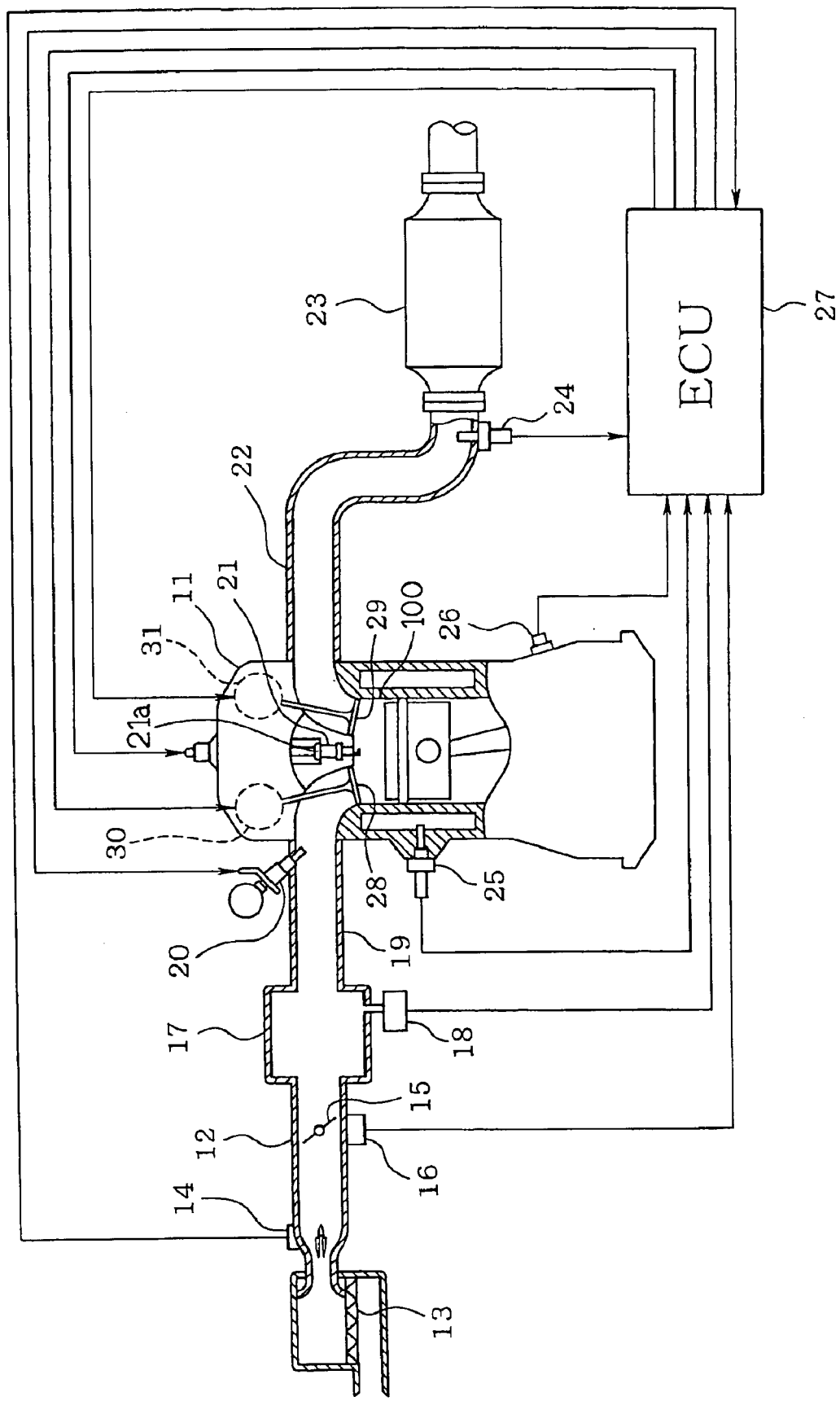
FIG. 1 is a schematic diagram showing an entire engine control system according to a first embodiment of the present invention.

Referring now to the drawings from FIGS. 1 to 12, a first embodiment of the present invention will be described. A schematic construction of the entire engine control system will be described based on FIG. 1. A four-cylinder engine 11, which is an internal combustion engine, includes four cylinders 100 from a first cylinder #1 to a fourth cylinder #4, an air cleaner 13 is provided at the uppermost stream of an intake pipe 12 of the engine 11, and an airflow meter 14 (detecting unit) provided on the downstream side of the air cleaner 13 for detecting the intake air quantity. The airflow meter 14 employed here is capable of detecting the back flow of the intake air. A throttle valve 15 is provided in the air intake pipe 12 for controlling air flow amount in the air intake pipe 12. The throttle valve 15 and a throttle opening sensor 16 are provided on the downstream side of the airflow meter 14. The opening of the throttle valve 15 is adjusted by a DC motor or the like. The throttle opening sensor 16 detects the throttle opening.

In addition, on the downstream side of the throttle valve 15, a surge tank 17, an intake pipe pressure sensor 18 (detecting unit) and an intake manifold 19 are provided. The intake pipe pressure sensor 18 detects the intake pipe pressure. The intake manifold 19 guides air to the respective cylinders 100 of the engine 11. Each of cylinders 100 is provided with a fuel injection valve 20 for injecting fuel in the vicinity of the intake port of the intake manifold 19. The cylinder head of the engine 11 is provided with ignition plugs 21 for the respective cylinders 100, so that the air-fuel mixture in the cylinders 100 is ignited by spark discharge of the respective ignition plugs 21.

An intake valve 28 is provided for introducing the air-fuel mixture into the corresponding cylinder 100. An exhaust valve 29 is provided for exhausting combustion gas from the corresponding cylinder 100. The intake valve 28 and the exhaust valve 29 of the engine 11 are provided with variable valve lift mechanisms 30, 31 for varying the lift amount of the valve, respectively. In addition, the intake valve 28 and the exhaust valve 29 may be provided with variable valve timing mechanisms for varying the valve timing (opening and closing timing), respectively. The exhaust valve 29 may be provided only with the variable valve timing mechanism but not the variable valve lift mechanism 31.

On the other hand, an exhaust pipe 22 of the engine 11 is provided with catalyst 23, such as three-way catalytic converter for purifying CO, HC, NOx in exhaust gas. On the upstream side of a catalyst 23, an exhaust gas sensor 24 is provided for detecting air-fuel ratio or rich/lean of exhaust gas (such as an air-fuel ratio sensor, an oxygen sensor). The cylinder block of the engine 11 is attached with a coolant temperature sensor 25 for detecting the temperature of coolant, and a crankshaft angle sensor 26 for emitting pulse signals each time when the crank shaft of the engine 11 rotates by a predetermined crankshaft angle (for example, 30° CA). The crankshaft angle and the number of engine revolution are detected based on the output signals from the crankshaft angle sensor 26.

The outputs from these sensors are transmitted to an engine control circuit (ECU) 27. The ECU 27 is constructed mainly of a microcomputer. The ECU 27 controls the quantity of fuel injection of the fuel injection valve 20 and the timing of ignition of the ignition plug 21, depending on the engine operating conditions by executing various engine control programs stored in an integrated ROM (recording medium).

Figure 2:
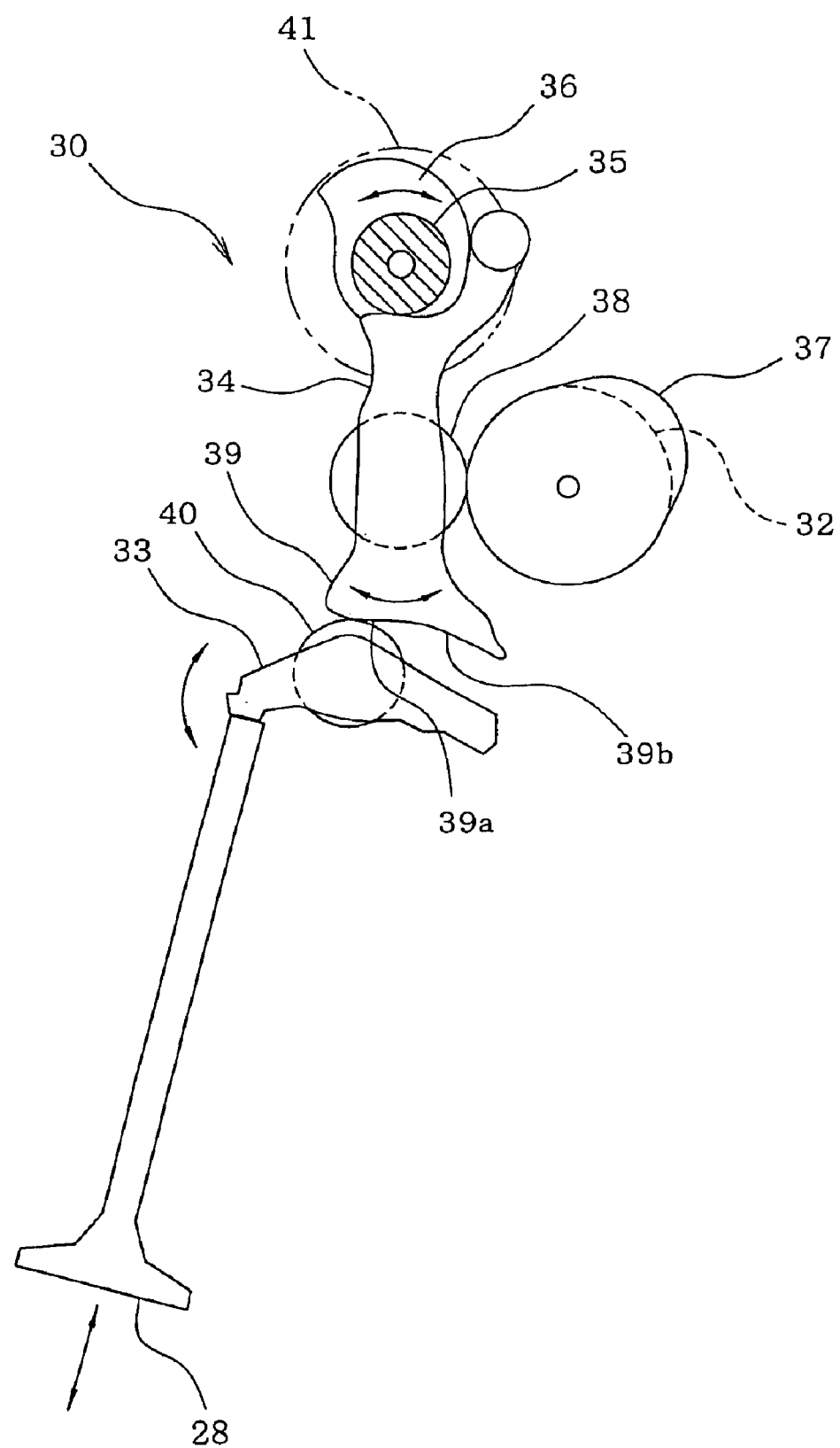
FIG. 2 is a front view of a variable valve lift mechanism.

A construction of the variable valve lift mechanism 30 of the intake valve 28 is explained referring to FIG. 2. Since the variable valve lift mechanism 31 of the exhaust valve 29 has substantially the same construction as the variable valve lift mechanism 30 of the intake valve 28, the description will not be made.

A link arm 34 is provided between a camshaft 32 and a rocking arm 33. The camshaft 32 drives the intake valve 28 and a rocking arm 33. A control shaft 35 rotated by a motor 41 such as a stepping motor is provided upwardly of the link arm 34. The control shaft 35 is rotatably and integrally provided with an eccentric cam 36. The link arm 34 is pivotably supported at the position shifted from the axis of the eccentric cam 36 with the intermediary of a supporting shaft (not shown). The link arm 34 is provided with a pivotal cam 38 at the midsection thereof. The side surface of the pivotal cam 38 abuts against the outer periphery surface of a cam 37 provided on the camshaft 32. The link arm 34 is provided with a pressing cam 39 at the lower end thereof. The lower end surface of the pressing cam 39 abuts against the upper end surface of a roller 40, which is provided at the midsection of the rocking arm 33.

Accordingly, when the cam 37 rotates in accordance with the rotation of the camshaft 32, the pivotal cam 38 of the link arm 34 moves laterally along the shape of the outer peripheral surface of the cam 37. The link arm 34 also pivots laterally. Since the pressing cam 39 moves laterally with the lateral pivotal movement of the link arm 34, a roller 40 of the rocking arm 33 is moved vertically in accordance with the shape of the lower end surface of the pressing arm 39. The rocking arm 33 pivots vertically. The intake valve 28 is provided to move in the vertical direction in accordance with the vertical movement of the rocking arm 33.

On the other hand, when the eccentric cam 36 rotates in accordance with the rotation of the control shaft 35, the position of the supporting shaft of the link arm 34 moves. Thus, the position of the initial contact point between the pressing cam 39 of the link arm 34 and the roller 40 of the rocking arm 33 changes. The lower end surface of the pressing cam 39 of the link arm 34 is formed with a base curved surface 39a, at such curvature that the pressing amount of the rocking arm 33 becomes zero (the valve lift amount of the intake valve 28 is zero) on the left side thereof. A pressing curved surface 39b is formed, so that the pressing amount of the rocking arm 33 increases (the valve lift amount of the intake valve 28 increases) as it proceeds toward the right from the base curved surface 39a.

In a high lift mode in which the valve lift amount of the intake valve 28 is increased, the initial position of the contact point between the pressing cam 39 and the roller 40 is moved rightward in accordance with the rotation of the control shaft 35. The portion of the lower end surface of the pressing cam 39, where the pressing cam 39 contacts the roller 40, is moved rightward when the pressing cam 39 is moved laterally by the rotation of the cam 37. The maximum pressing amount of the rocking arm 33 increases and hence the maximum valve lift amount of the intake valve 28 increases. Consequently, the period in which the rocking arm 33 is pressed increases, and hence the period in which the intake valve 28 is opened increases.

On the other hand, when in a low lift mode in which the valve lift amount of the intake valve 28 is decreased, the initial position of the contact point between the pressing cam 39 of the link arm 34 and the roller 40 of the rocker arm 33 is moved leftward, in accordance with the rotation of the control shaft 35. Accordingly, since the portion of the lower end surface of the pressing cam 39 that comes into contact with the roller 40 is moved leftward, when the pressing cam 39 is moved laterally by the rotation of the cam 37. The maximum pressing amount of the rocking arm 33 decreases, and hence the maximum valve lift amount of the intake valve 28 decreases. Consequently, the period in which the rocking arm 33 is pressed decreases, and hence the period in which the intake valve 28 is opened decreases.

In the variable valve lift mechanism 30 described above, the maximum valve lift amounts and the periods, in which the intake valves 28 of all the cylinders 100 are opened (hereinafter, referred simply to as "lift amount of the intake valve"), can be varied together continuously, by rotating the control shaft 35 by the motor 41 and moving the initial position of the contact point between the pressing cam 39 and the roller 40 of the rocker arm 33 continuously. Hereinafter, the cylinders 100 are referred as cylinders 100 or cylinders (#1 to #4) for specific expression. Here, the sign (#i) is the cylinder number, and represents any one of (#1) to (#4).

ECU 27 controls the variable valve lift mechanism 30 of the inlet valve 28 based on the position of the accelerator or the engine operating conditions by executing the variable valve control program (not shown) stored in the ROM. The intake air quantity is controlled by varying the valve lift amount of the intake valve 28 continuously. In the case of a system employing the variable valve lift mechanism 30 and the variable valve timing mechanism, both of the valve lift amount and the valve timing may be continuously varied to control the intake air quantity.

The ECU 27 calculates the rate of cylinder-to-cylinder variations in intake air quantity DEV, based on the output from the airflow meter 14, by executing the respective routine for correcting cylinder-to-cylinder variations (described later). The rate of cylinder-to-cylinder variations in intake air quantity DEV, which is calculated when the operating range is in the predetermined condition to execute variation learning is met, is learned as a learning value of cylinder-to-cylinder variation GDEV. Then, when the operating range is not in the condition to execute variation learning, the rate of cylinder-to-cylinder variations in intake air quantity DEV according to the current operating range is calculated using the learning value of cylinder-to-cylinder variations GDEV. Subsequently, the lift amount of the intake valve VVL is corrected based on the rate of cylinder-to-cylinder variations in intake air quantity DEV to correct the cylinder-to-cylinder variations in intake air quantity.

The ECU also calculates the area of the output waveform (intake air quantities) from the airflow meter 14 for a predetermined period for the respective intake strokes of the respective cylinders 100, so that the rate of cylinder-to-cylinder variations in intake air quantity DEV (i) is calculated based on the calculated area. Subsequently, the lift amount of the intake valve VVL is corrected based on the rate of cylinder-to-cylinder variations in intake air quantity DEV (i), and the cylinder-to-cylinder variations in intake air quantity are corrected. In this case, the period for calculating the area of the output waveform from the airflow meter 14 is set to a period, in which the intake air quantity is hardly subjected to the influence of the reflected wave from the intake air pulsation or the air intake interference of other cylinders 100. More specifically, the period includes the maximum value of the intake air quantity.

The detailed processing will be described below in the respective routines for correcting the cylinder-to-cylinder variations, according to the present embodiment (1).

[Base Routine for Calculating Cylinder-to-Cylinder Variations]

Figure 3:
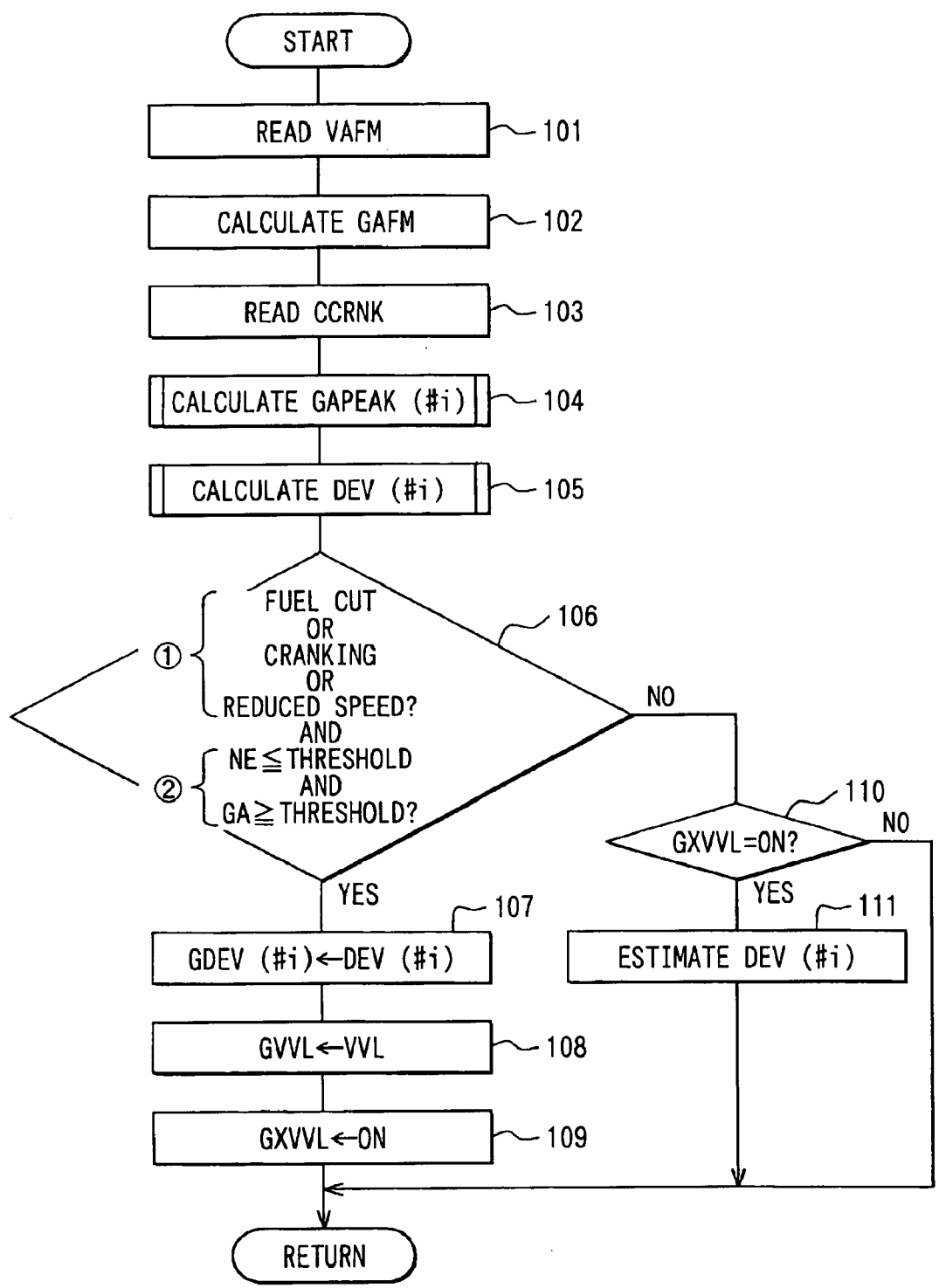
FIG. 3 is a flowchart showing a processing flow of a base routine for calculating cylinder-to-cylinder variations in the first embodiment in the present invention.
Figure 4:
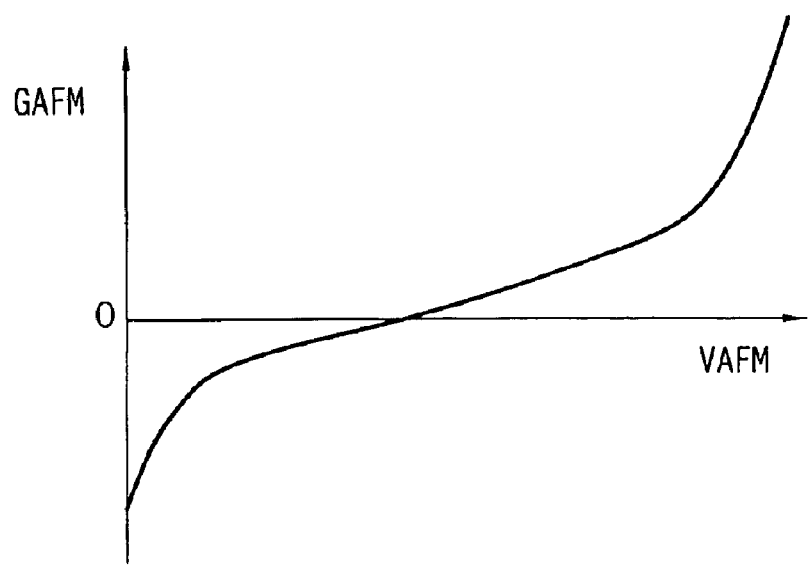
FIG. 4 is a conceptual diagram showing a map for converting an output voltage VAFM from an airflow meter into an instantaneous airflow rate GAFM.
Figure 5:
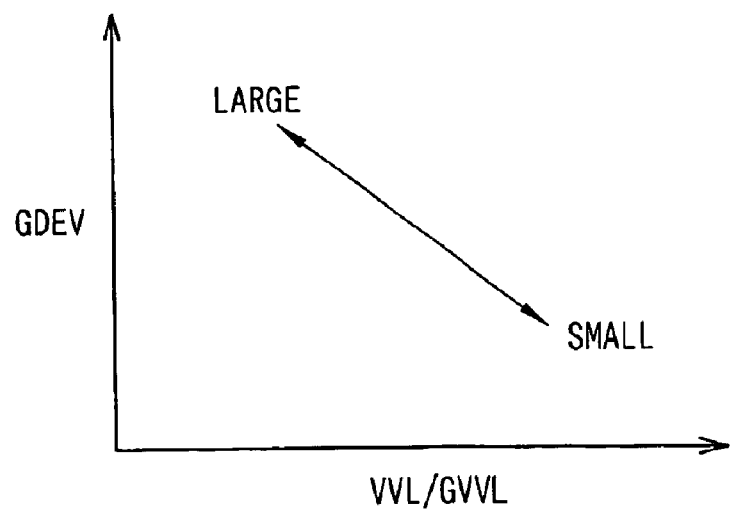
FIG. 5 is a conceptual diagram showing a map of the rate of cylinder-to-cylinder variations in intake air quantity DEV.

A base routine for calculating cylinder-to-cylinder variation shown in FIG. 3 is activated at timings of A/D conversions (for example, 4 ms cycle) of the output voltage from the airflow meter 14. When this routine is activated, the output voltage VAFM from the airflow meter 14 after filtering is read at step 101. The procedure proceeds to step 102, where the output voltage VAFM from the airflow meter 14 is converted into the instantaneous airflow rate GAFM passing though the airflow meter 14, using an instantaneous airflow rate GAMF map in FIG. 4. The instantaneous airflow rate GAFM map is used in the case where the airflow meter 14 is capable of detecting a back flow. When the air is flowing backward, the instantaneous airflow rate GAFM is shown as a minus value.

Subsequently, the procedure proceeds to step 103, where the counted value of a crankshaft angle counter CCRNK is read. The crankshaft angle counter CCRNK is incremented by one, for example, at every 30° CA based on the output signals from the crankshaft angle sensor 26. Therefore, 24 counts of the crankshaft angle counter CCRNK corresponds to one cycle (720° CA). The crankshaft angle counter CCRNK is reset to "0" when the counted value reaches "24". The rotational position of the crank, at which the crankshaft angle counter CCRNK shows the value 0, corresponds to the top dead center of the compression stroke (compression TDC) of the first cylinder #1. The rotational positions of the crank, at which the crankshaft angle counter CCRNK shows the values 6, 12 and 18, are set to respectively correspond to the compression TDCs of the third cylinder #3, the fourth cylinder #4, and the second cylinder #2.

In the subsequent Step 104, a routine for calculating the maximum value of instantaneous airflow rate (FIG. 6) is executed for each cylinder 100 to obtain the maximum value GAPEAK (#i) of the instantaneous airflow rate GAFM in each cylinder 100, during a period corresponding to the intake stroke thereof.

Subsequently, the procedure proceeds to step 105, where a routine for calculating the rate of cylinder-to-cylinder variations in intake air quantity (FIG. 7) is executed. Here, the rate of cylinder-to-cylinder variations in intake air quantity DEV (#i) is calculated based on the maximum value of the instantaneous airflow rate GAPEAK (#i) in each cylinder 100.

Then, the procedure proceeds to step 106, where whether or not the condition to execute variation learning is met is determined. The conditions for executing variation learning means are both conditions 1 and 2 as shown below.

1. The vehicle is in any one of the following conditions: fuel-cut operation, cranking operation, operation in reduced speed (for example, when braking or when the accelerator is released).

2. When the number of engine revolution NE is below a predetermined value (for example 2000 rpm), and the intake air quantity GA is at least a predetermined value (for example, a value corresponding to the intake air quantity during idling operation).

In this case, the condition "1" described above is determined for the following reasons. When the vehicle is in the fuel-cut operation or in the cranking operation, non-combustion is caused in the cylinder 100, and thus the airflow is not affected by variations in rotation due to combustion. Therefore, the output waveform from the airflow meter 14 becomes a pulsation waveform reflecting cylinder-to-cylinder variations in intake air quantity with high degree of accuracy. Here, the rate of cylinder-to-cylinder variations in intake air quantity DEV (#i) can be calculated and learned with high degree of accuracy.

In the system which controls the intake air quantity by varying the lift amount of the intake valve, the lift amount of the intake valve is reduced during the reduced speed operation. Thus, the proportion of variations in the actual lift amount with respect to the target lift amount increases in each cylinder 100. Variations in the intake air quantity in each cylinder 100 increase, and thus the rate of cylinder-to-cylinder variations in intake air quantity DEV (#i) can be calculated and learned with high degree of accuracy.

The condition "2" described above is determined for the following reasons. Since the period of one cycle increases with reduction of the number of the engine revolution NE, the period (or the number of times) for sampling the output from the airflow meter 14 may be increased. When the intake air quantity GA is large, the amplitude of the intake air pulsation increases correspondingly, and thus the characteristic values (maximum value, minimum value, the area, and the like) of the intake air pulsation to be used for calculating the rate of cylinder-to-cylinder variations in intake air quantity DEV (#i) can easily be determined. Based on these reasons, in the operating range in which the number of engine revolution NE is small and the intake air quantity GA is large, the rate of cylinder-to-cylinder variations in intake air quantity DEV (#i) can be learned with high degree of accuracy.

There is another advantage. Even when the valve operating conditions of the valves, such as an inlet valve, exhaust valve, throttle valve, are changed into the operating conditions, which are suitable for learning the cylinder-to-cylinder variations, in the reduced speed operation, variations in toque correspondingly generated cannot be noticed by the driver.

When both of the conditions "1" and "2" described above are satisfied, the condition to execute variation learning is met. However, the condition to execute variation learning is not met when either one or both of the above-described conditions "1" and "2" are not satisfied.

When it is determined that the condition to execute variation learning is met, the procedure proceeds to step 107, where the rate of cylinder-to-cylinder variations in intake air quantity DEV (#i), which is calculated when in the operating condition in which the condition to execute variation learning is met, is learned (stored) as the learning value of cylinder-to-cylinder variations GDEV (#i). The processing executed at steps from 105 to 107 as described above serves as a cylinder-to-cylinder variation learning unit stated in appended claims.

Subsequently, at step 108, the average lift amount of the intake valve VLL, which is obtained when the learning value of cylinder-to-cylinder variations GDEV (#i), is learned as a reference lift amount of the intake valve GVVL. In this case, the average lift amount of the intake valve VLL may be calculated from the rotational position of the driving motor 41 of the variable valve lift mechanism 30.

Then, the procedure proceeds to step 109, where the cylinder-to-cylinder variation learning completion flag GXVVL is turned "ON", which means completion of the cylinder-to-cylinder variation learning, and the routine is terminated.

On the other hand, when it is determined at step 106 where the condition to execute variation learning is not met, the procedure proceeds to step 110 Whether or not learning of the learning value of cylinder-to-cylinder variations GDEV (#i) is completed (whether or not the cylinder-to-cylinder variation learning completion flag GXVVL is ON) is determined at step 110. When the learning of cylinder-to-cylinder variations is not completed, the routine is terminated as is.

On the other hand, when it is determined that learning of the learning value of cylinder-to-cylinder variations GDEV (#i) is completed, the procedure proceeds to step 111. Here, the rate of cylinder-to-cylinder variations in intake air quantity DEV (#i) according to the current average lift amount of the intake valve VLL is calculated at step 111. The VLL is calculated using the learning value of cylinder-to-cylinder variations GDEV (#i) and the ratio between the current average lift amount of the intake valve VLL and the reference lift amount of the intake valve GVVL (VVL/GVVL) in the map of the rate of cylinder-to-cylinder variations in intake air quantity DEV (#i) shown in FIG. 5. In this case, the stored value of the rate of cylinder-to-cylinder variations in intake air quantity DEV (#i) calculated at step 105 is replaced by the estimated value calculated at step 111. The processing at step 111 serves as a cylinder-to-cylinder variation estimating unit.

The cylinder-by-cylinder intake air quantity can be obtained by multiplying the rate of cylinder-to-cylinder variations in intake air quantity DEV (#i) by the intake air quantity GA (average airflow rate) detected by the airflow meter 14.

In the routine described above, the rate of cylinder-to-cylinder variations in intake air quantity DEV (#i) is calculated for all the operating ranges at step 105. However, it may be modified in such a manner that the processing at step 105 is executed when it is determined to be "Yes" at step 106. In this case, the rate of cylinder-to-cylinder variations in intake air quantity DEV (#i) is calculated only when in the operating ranges, in which the condition to execute variation learning is met, and the calculated value is learned as the learning value of cylinder-to-cylinder variations GDEV (#i).

[Routine for Calculating the Maximum Value of Instantaneous Airflow Rate in Each Cylinder]

Figure 6:
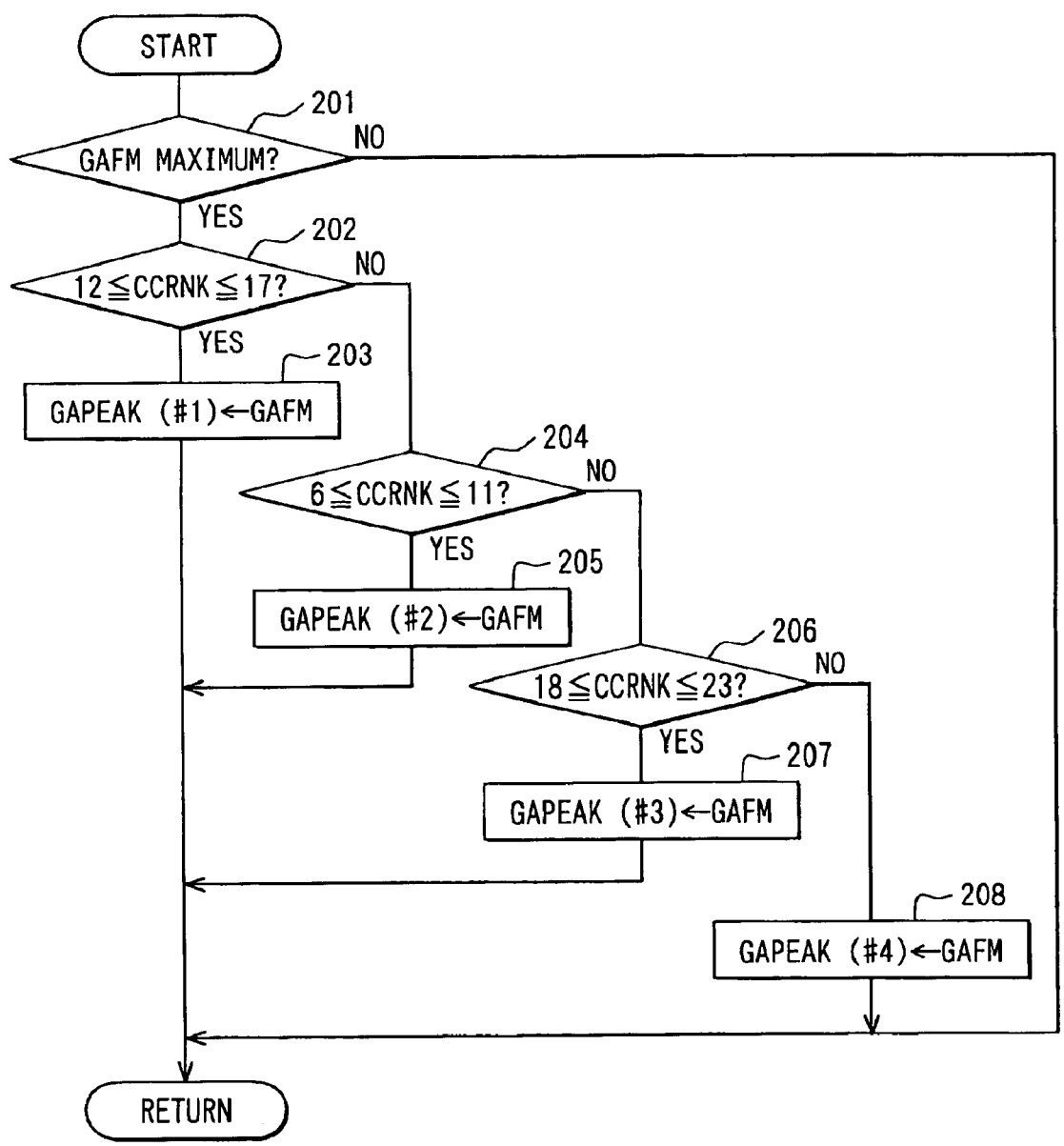
FIG. 6 is a flowchart showing a processing flow of a routine for calculating the maximum value of the instantaneous airflow rate of each cylinder according to the first embodiment.

When the routine of calculating the maximum value of instantaneous airflow rate in each cylinder 100 shown in FIG. 6 is activated at step 104 in FIG. 3, whether or not the instantaneous airflow rate GAFM detected by the airflow meter 14 is the maximum value is determined at step 201. The method of determining the maximum value is such that the current instantaneous airflow rate GAFM is compared with the previous measurement, and whether or not the direction of change of the instantaneous airflow rate GAFM is inverted from increase to decrease is determined.

When the instantaneous airflow rate GAFM is determined not to be the maximum value at step 201, the subsequent processing is not necessary and thus the routine is terminated. Subsequently, when the instantaneous airflow rate GAFM reached the maximum value, the procedure proceeds to step 202, where whether or not the counted value of crankshaft angle counter is CCRNK=12–17 (that is, the period corresponding to the intake stroke of the first cylinder #1) is determined. If CCRNK=12–17, the procedure proceeds to step 203, and the maximum value of the instantaneous airflow rate GAFM in the period corresponding to the intake stroke of the first cylinder #1 is determined to be the maximum value of the instantaneous airflow rate of the first cylinder #1 GAPEAK (#1).

When it is determined to be "No" at step 202 described above, and the counted value of the crankshaft angle counter is determined to be CCRNK=6–11 (that is, the period corresponding to the intake stroke of the second cylinder #2) at step 204, the procedure proceeds to step 205, where the maximum value of the instantaneous airflow rate GAFM during the period corresponding to the intake stroke of the second cylinder #2 is determined to the maximum value of the instantaneous airflow rate of the second cylinder #2 GAPEAK (#2).

When it is determined to be "No" at steps 202 and 204, and the counted value of the crankshaft angle counter is determined to be CCRNK=18–23 (that is, the period corresponding to the intake stroke of the third cylinder #3) at step 206, the procedure proceeds to step 207, where the maximum value of the instantaneous airflow rate GAFM during the period corresponding to the intake stroke of the third cylinder #3 is determined to the maximum value of the instantaneous airflow rate of the third cylinder #3 GAPEAK (#3).

When it is determined to be "No" at steps 202, 204, and 206, that is, when the counted value of the crankshaft angle counter is determined to be CCRNK=0–5 (that is, the period corresponding to the intake stroke of the fourth cylinder #4), the procedure proceeds to step 208, where the maximum value of the instantaneous airflow rate GAFM during the period corresponding to the intake stroke of the fourth cylinder #4 is determined to the maximum value of the instantaneous airflow rate of the fourth cylinder #4 GAPEAK (#4).

Figure 12:
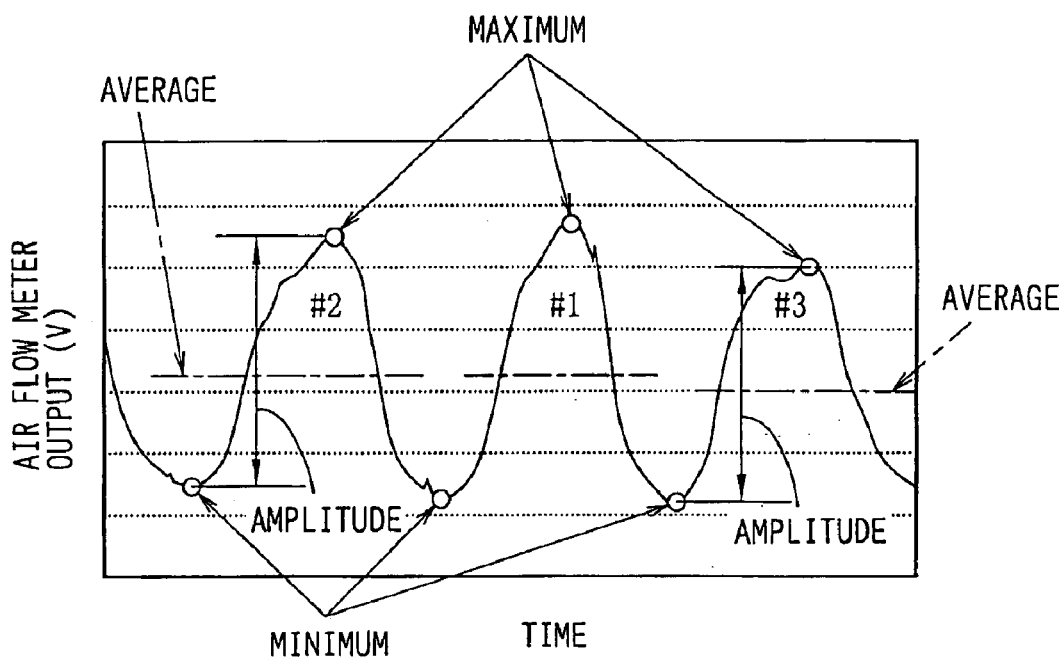
FIG. 12 is a time chart showing a behavior of an output from the airflow meter.

As shown in FIG. 12, the output from the airflow meter 14 (instantaneous airflow rate GAFM) exhibits the pulsation waveform reflecting the intake air quantity in each cylinder 100. Therefore, by calculating the characteristic values (maximum value, minimum value, average value, amplitude value, area, length of track, etc.) of the instantaneous airflow rate detected by the airflow meter 14 at the intervals corresponding to the intake stroke of each cylinder 100, the characteristic value of the pulsation waveform reflecting the intake air quantity in each cylinder 100 can be calculated. Therefore, using the characteristic value, the rate of cylinder-to-cylinder variations in intake air quantity reflecting the cylinder-to-cylinder variations in intake air quantity may be calculated.

[Routine for Calculating the Rate of Cylinder-to-Cylinder Variations in Intake Air Quantity]

Figure 7:
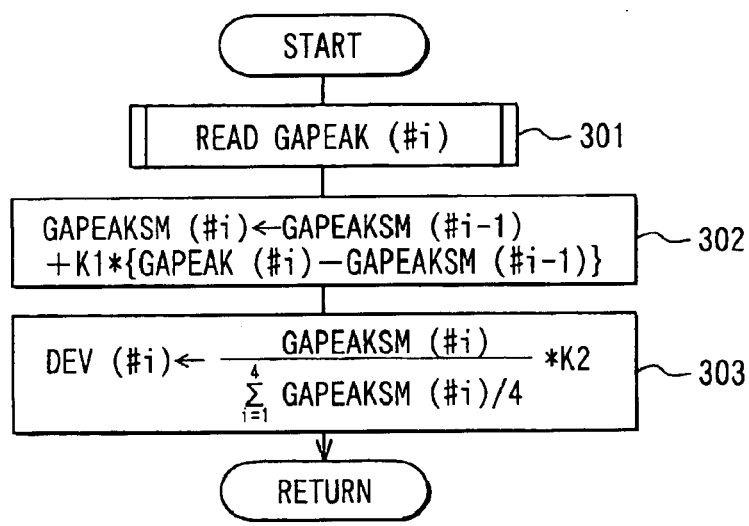
FIG. 7 is a flowchart showing a processing flow of a routine for calculating the rate of cylinder-to-cylinder variations in intake air quantity according to the first embodiment.

The routine for calculating the rate of cylinder-to-cylinder variations in intake air quantity shown in FIG. 7 (105 in FIG. 3) is executed for each stroke (at every 180° CA in the case of a four-cylinder engine). When this routine is activated, the maximum values of the instantaneous airflow rate in each cylinder GAPEAK (#i) is read at step S301, and in the next Step 302 the maximum value of the instantaneous airflow rate GAPEAK (#i) of each cylinder 100 is conditioned among the cylinders 100 to obtain an conditioned value of the maximum value of the instantaneous airflow rate GAPEAKSM#i) for each cylinder 100.

$$GAPEAKSM(\#i) = GAPESKSM(\#i\text{-}1) + K1 \times \{GAPAK(\#i) - GAPEAKSM(\#i\text{-}1)\}$$

In the equation above, K1 is a coefficient of conditioning and GAPEAKSM (#i-1) is a conditioned value of the maximum value of the instantaneous airflow rate of the (#i-1)$^{th}$ cylinder 100.

Subsequently, the procedure proceeds to step 303, where the rate of cylinder-to-cylinder variations in intake air quantity DEV (#i) are calculated using the following equation.

Equation 1

$$DEV(\#i) = \frac{GAPEAKSM(\#i)}{\sum_{i=1}^{4} GAPEAKSM(\#i)/4} \times K2 \qquad (1)$$

The denominator in the equation above is an average value of the conditioned values GAPEAKSM (#i) of the maximum values of the instantaneous airflow rates of all the cylinders 100, and K2 is a correction coefficient for converting the variations in maximum value of instantaneous airflow rate into the variations in intake air quantity.

As is clear from Equation 1 shown above, the rate of cylinder-to-cylinder variations in intake air quantity DEV (#i) in each cylinder 100 is a value obtained by dividing the conditioned value of the rate of cylinder-to-cylinder variations in intake air quantity GAPEAKSM (#i) in each cylinder 100 by the average of the conditioned values of the rates of cylinder-to-cylinder variations in intake air quantities of all the cylinders 100, and then multiplied by the correction coefficient K2.

[Routine for Correcting Cylinder-to-Cylinder Variations]

Figure 8:
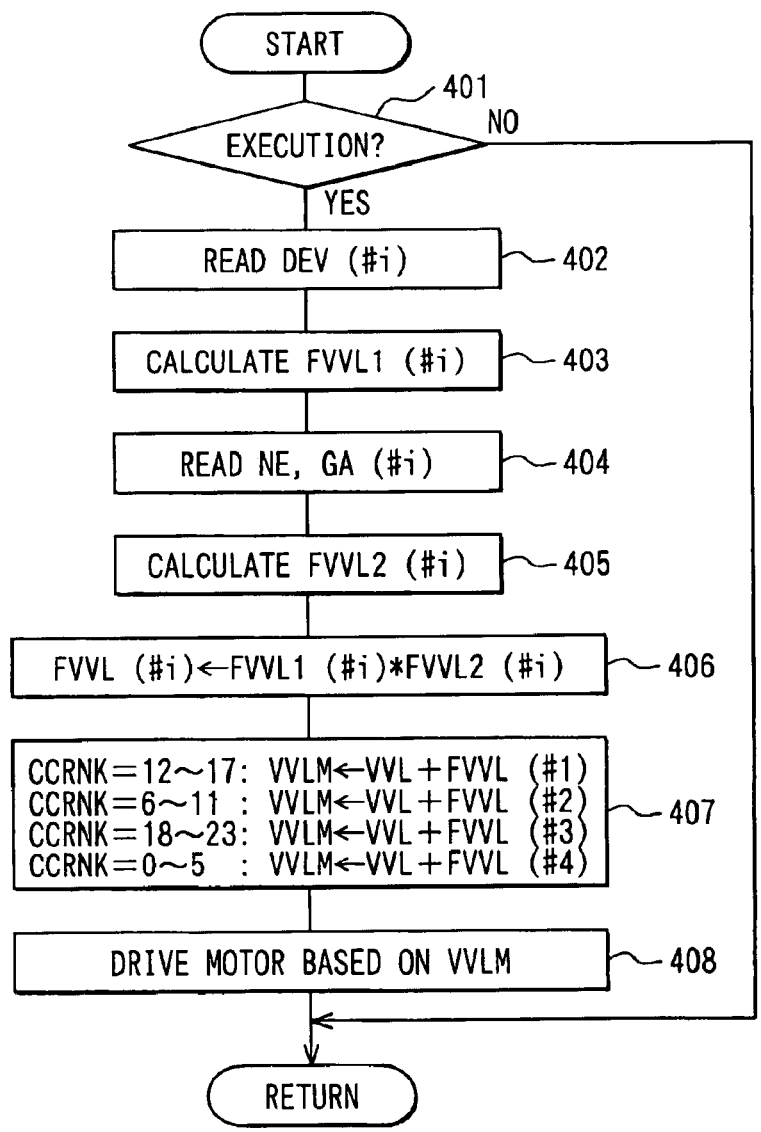
FIG. 8 is a flowchart showing a processing flow of a routine for correcting cylinder-to-cylinder variations according to the first embodiment.

The routine for correcting cylinder-to-cylinder variation shown in FIG. 8 is executed at predetermined regular cycle while the engine is in operation. When this routine is activated, at step 401, whether or not learning of the learning value of cylinder-to-cylinder variations GDEV (#i) is terminated (whether or not the cylinder-to-cylinder variations learning completion flag GXVVL is ON) is determined. When the learning of cylinder-to-cylinder variations is not completed, the routine is terminated without executing the process relating to the cylinder-to-cylinder variation correction from Step 402 on.

On the other hand, when it is determined that learning of cylinder-to-cylinder variations is completed or the condition to execute correction is met at step 401, the processing relating to the correction of the cylinder-to-cylinder variations from the step S402 on is executed in the following manner. At step 402, the rate of cylinder-to-cylinder variations in intake air quantity DEV (#i) obtained finally by the base routine calculating cylinder-to-cylinder variation shown in FIG. 3 is read.

Figure 9:
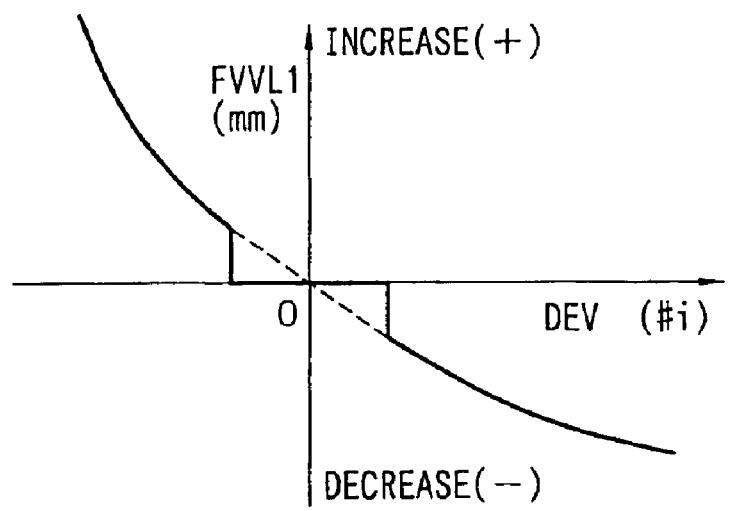
FIG. 9 is a conceptual diagram showing a map of a basic lift correction amount FVVL1.

Subsequently, the procedure proceeds to step 403, the basic lift correction amount FVVL1 (#i) in each cylinder 100 according to the rate of cylinder-to-cylinder variations in intake air quantity DEV (#i) is calculated using a map shown in FIG. 9. According to the map shown in FIG. 9, the basic lift correction amount FVVL1 (#i) becomes a reduced value (minus value) in the range where the rate of cylinder-to-cylinder variations in intake air quantity DEV (#i) is a positive value, and the basic lift correction amount FVVL1 (#i) becomes an increased value (plus value) in the range where the rate of cylinder-to-cylinder variations in intake air quantity DEV (#i) is a negative value. In other words, when the intake air quantity of a certain cylinder 100 increases with respect to the average of the intake air amounts of all the cylinders 100, the reductive correction amount based on the basic lift correction amount FVVL1 (#i) increases correspondingly. In contrast, when the intake air amount of a certain cylinder 100 is reduced with respect to the average of the intake air quantities of all the cylinders 100, the incremental correction amount based on the basic lift correction amount FVVL1 (#i) increases correspondingly. In a predetermined range in which the rate of cylinder-to-cylinder variations in intake air quantity DEV (#i) is about zero, the basic lift correction amount FVVL1 (#i) is set to zero, and thus the lift amount of the intake valve VVL is not corrected.

Figure 10:
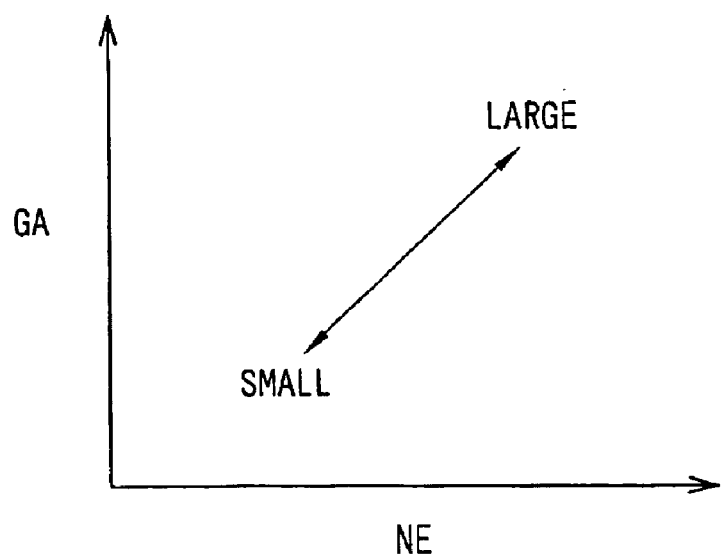
FIG. 10 is a conceptual diagram showing a map of a correction coefficient FVVL2.

After the number of engine revolution NE and the intake air amount GA (average airflow rate) detected by the airflow meter 14 are read in the next Step 404, the procedure proceeds to the Step 405, where the map of the correction coefficient FVVL2 shown in FIG. 10 is searched, and then the correction coefficient FVVL2 (#i) according to the current engine operating conditions (for example, the number of engine revolution NE and the intake air quantity GA) of each cylinder 100 is calculated.

Generally, when the intake air quantity GA is reduced (when the lift amount of the intake valve is reduced), it is susceptible to the correction of the lift amount of the intake valve. Therefore, the map of the correction coefficient FVVL2 in FIG. 10 is set in such a manner that the correction coefficient FVVL2 is reduced with decrease in intake air quantity GA.

Subsequently, the procedure proceeds to step 406, where the basic lift correction amount FVVL1 (#1) of each cylinder 100 is multiplied by the correction coefficient FVVL2 (#i) to obtain a lift correction amount FVVL (#i) for each cylinder 100.

$$FVVL(\#i)=FVVL1(\#i) \times FVVL2(\#i)$$

Then the procedure proceeds to step 407, where the lift correction amount FVVL (#i) of each cylinder 100 is added to the average of the lift amounts of the intake valves VVL of all the cylinders 100 before correction to obtain a final target lift amount of the intake valve VVLM.

In this case, in the period in which the counted value of the crankshaft angle counter CCRNK=12–17 (that is, the period corresponding to the intake stroke of the first cylinder #1), the final target lift amount of the intake valve VVLM is calculated using the valve lift correction amount FVVL (#1) of the first cylinder #1 according to the following equation.

$$VVLM=VVL+FVVL(\#1)$$

The period in which the counted value of the crankshaft angle counter CCRNK=6–11, (that is, the period corresponding to the intake stroke of the second cylinder #2), the final target lift amount of the intake valve VVLM is calculated using the valve lift correction amount FVVL (#2) of the second cylinder #2 according to the following equation.

$$VVLM=VVL+FVVL(\#2)$$

In counted value of the crankshaft angle counter CCRNK=18–23, (that is, the period corresponding to the intake stroke of the third cylinder #3), the final target lift amount of the intake valve VVLM is calculated using the valve lift correction amount FVVL (#3) of the third cylinder #3 according to the following equation.

$$VVLM=VVL+FVVL(\#3)$$

In counted value of the crankshaft angle counter CCRNK=0–5, (that is, the period corresponding to the intake stroke of the fourth cylinder #4), the final target lift amount of the intake valve VVLM is calculated using the valve lift correction amount FVVL (#4) of the fourth cylinder #4 according to the following equation.

$$VVLM=VVL+FVVL(\#4)$$

Subsequently, the procedure proceeds to step 408, where the motor 41 of the variable valve lift mechanism 30 of the intake valve 28 is driven at high speed according to the final target lift amount of the intake valve VVLM of each cylinder 100 which varies corresponding to the intake stroke of each cylinder 100, and then the lift amount of the intake valve is corrected for each intake stroke of each cylinder 100 so that the intake air amount of each cylinder 100 is corrected. Accordingly, cylinder-to-cylinder variations in intake air quantity are corrected.

In the routine for correcting the cylinder-to-cylinder variations described above, correction of the cylinder-to-cylinder variations is not executed until the learning of cylinder-to-cylinder variations is completed. However, it is also possible to execute correction of cylinder-to-cylinder variations using the rate of cylinder-to-cylinder variations in intake air quantity DEV (#i) calculated at step 105 in FIG. 3 until the learning of cylinder-to-cylinder variations is completed.

Figure 11:
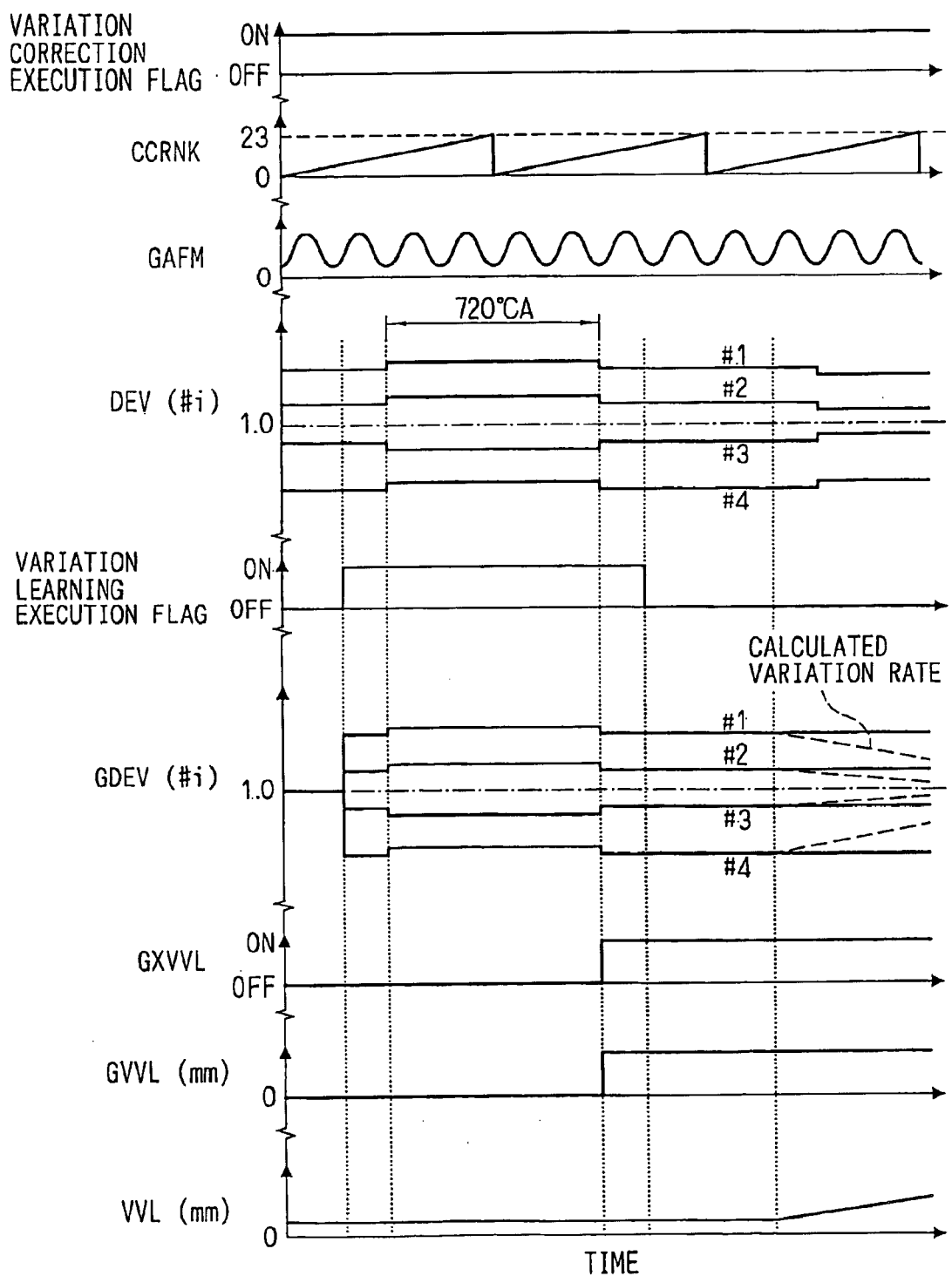
FIG. 11 is a time chart showing an example of execution of the first embodiment.

Referring now to a time chart in FIG. 11, an example of the present embodiment (1) shown above will be described. In the period, in which the condition to execute cylinder-to-cylinder variation correction is met and the cylinder-to-cylinder variation correction execution flag is turned ON, the rate of cylinder-to-cylinder variations in intake air quantity DEV (#i) in each cylinder 100 is calculated based on the output from the airflow meter 14 per cycle (instantaneous airflow rate GAFM). The rate of cylinder-to-cylinder variations in intake air quantity DEV (#i), which is calculated when the condition to execute variation learning is met and the variation learning execution flag is ON, is learned as a learning value of cylinder-to-cylinder variations GDEV (#i). Besides, the average of the lift amounts of the intake valves VLL, which is calculated when the learning value of cylinder-to-cylinder variations GDEV (#i) is learned, is learned as a reference lift amount of intake valve GVVL.

In the period in which the cylinder-to-cylinder variation learning completion flag is OFF, because the condition to execute variation learning is not met after leaning the learning value of cylinder-to-cylinder variation GDEV (#i) is completed and the cylinder-to-cylinder variation learning completion flag GXVVL is turned ON, the final rate of cylinder-to-cylinder variations in intake air quantity DEV (#i) is calculated using the learning value of cylinder-to-cylinder variations GDEV (#i) and the ratio of the current average lift amount of the intake valve VVL with respect to the reference lift amount of the intake valve GVVL (VVL/GVVL).

Since the present embodiment (1) described above is constructed to learn the rate of cylinder-to-cylinder variations in intake air quantity DEV (#i), which is calculated when the condition to execute variation learning is met and the vehicle is in the operating range in which the calculation accuracy of the rate of cylinder-to-cylinder variations in intake air quantity DEV (#i) can be secured as a learning value of cylinder-to-cylinder variations GDEV (#i). Thus, the learning value of cylinder-to-cylinder variations GDEV (#i) can be learned with high degree of accuracy.

The present embodiment is constructed to estimate the rate of cylinder-to-cylinder variations in intake air quantity DEV (#i), in accordance with the current operating range using the learning value of cylinder-to-cylinder variations GDEV (#i) with high degree of accuracy in the operating range in which the condition to execute variation learning is not met. Therefore, the rate of cylinder-to-cylinder variations in intake air quantity DEV (#i) can be calculated with relatively high degree of accuracy, even in the operating range in which the output waveform from the airflow meter 14 is not the pulsation waveform or in the operating range in which a sufficient time (or the number of times) for sampling the output from the airflow meter 14 cannot be secured. The pulsation waveform reflects the cylinder-to-cylinder variations in intake air quantity with a high degree of accuracy. Therefore, detection accuracy for cylinder-to-cylinder variations can be improved in almost all of the operating range, so that the cylinder-to-cylinder variation in intake air quantity can be corrected with high degree of accuracy in almost all the operating range. Thus, the cylinder-to-cylinder variations both in torque and in air-fuel ratio can be reduced.

<<Second Embodiment>>

The operating conditions of the intake valve 28, the exhaust valve 29, and the throttle valve 15 are not necessarily suitable for calculating the rate of cylinder-to-cylinder variations in intake air quantity DEV when the condition to execute variation learning is met.

Figure 14:
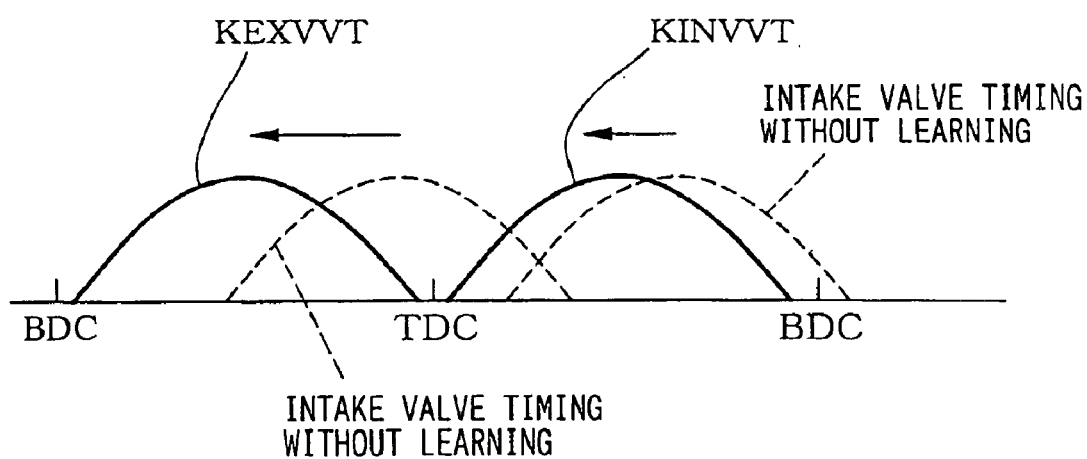
FIG. 14 is a valve characteristic drawing for explaining the timing angular position of an intake valve when leaning and the timing angular position of an exhaust valve when learning.
Figure 13:
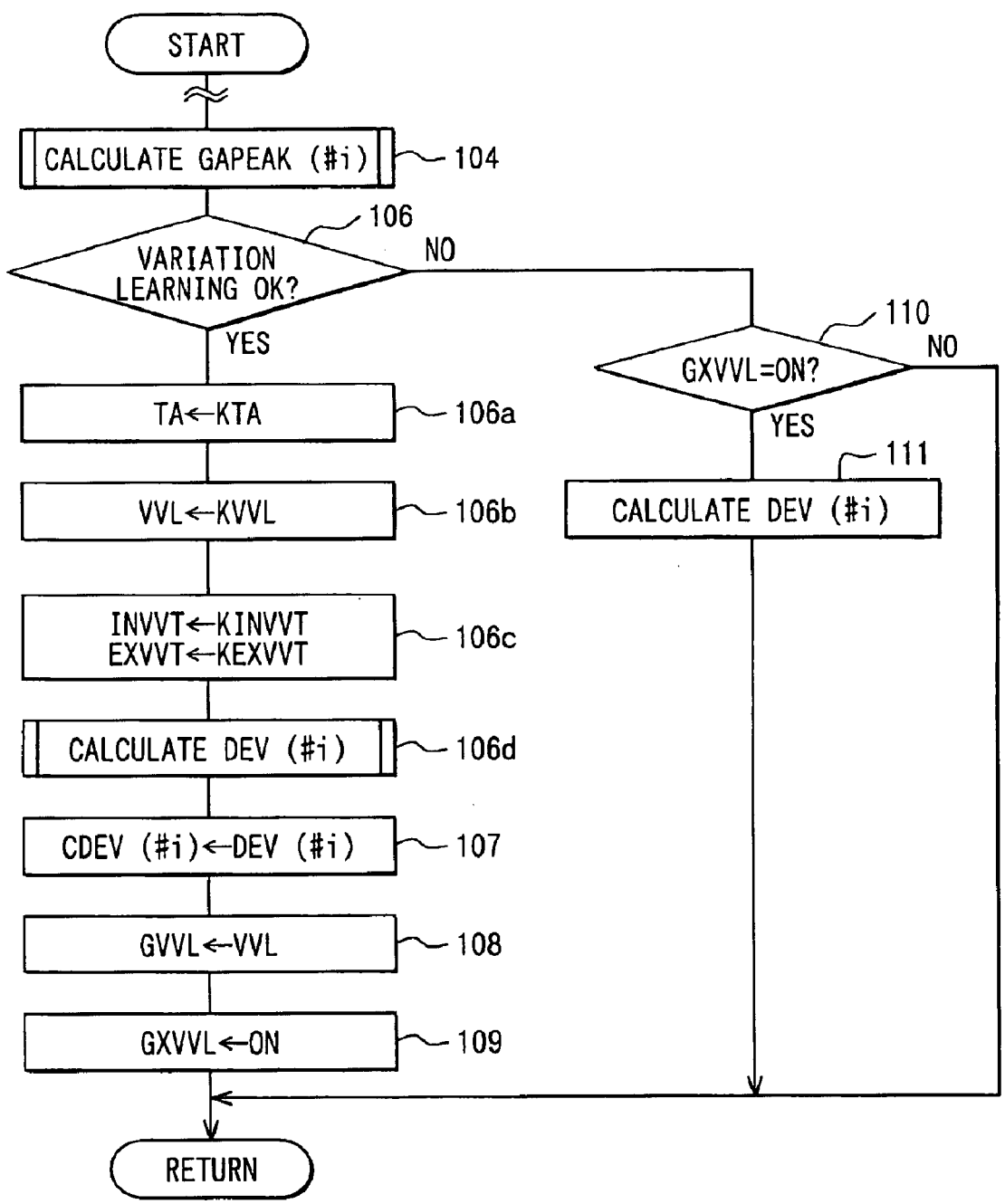
FIG. 13 is a flowchart showing a part of processing flow of a base routine for calculating cylinder-to-cylinder variations according to a second embodiment in the present invention.
Figure 15:
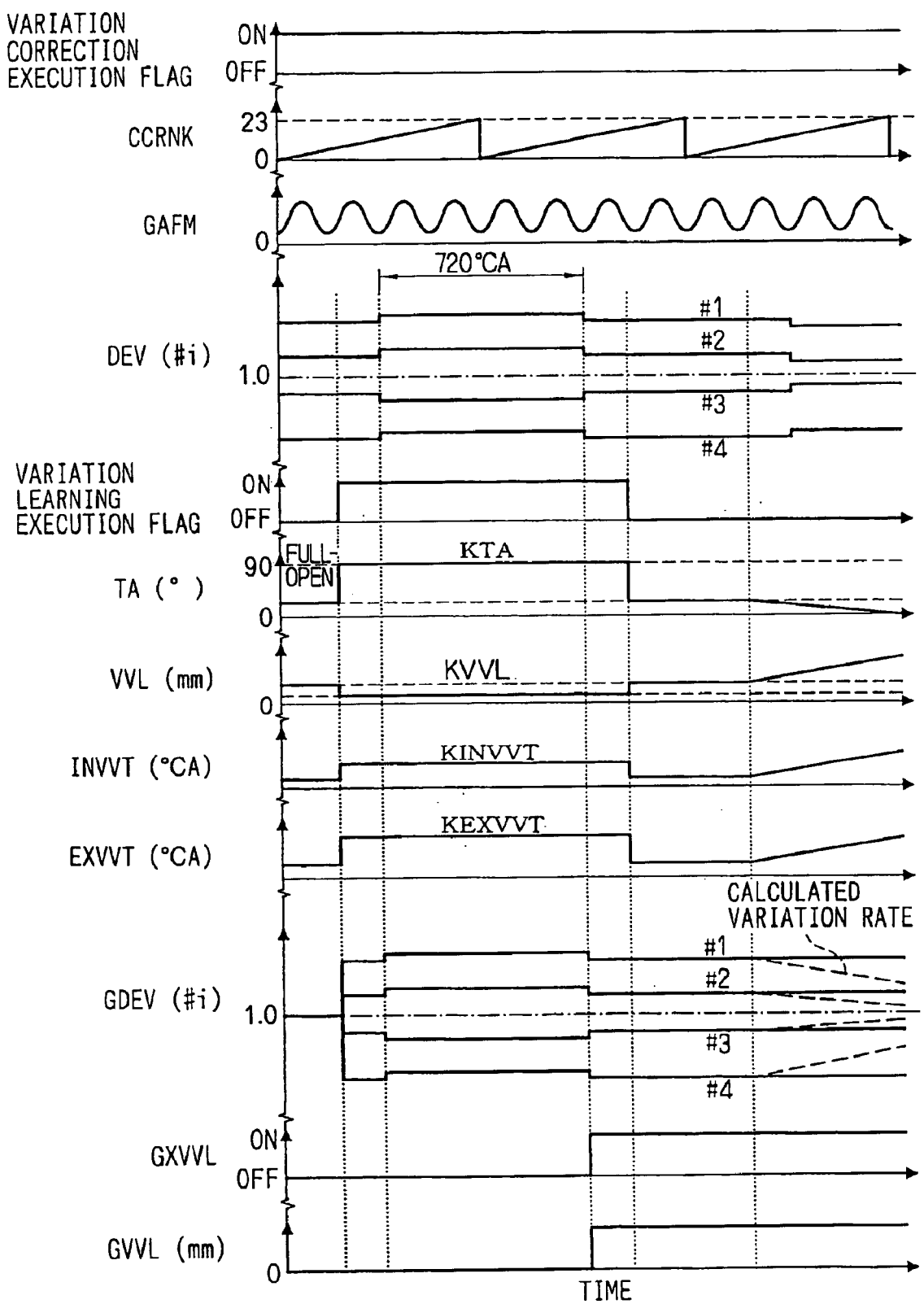
FIG. 15 is a time chart showing an example of execution of the second embodiment.

Therefore, the second embodiment of the present invention shown in FIG. 13 to FIG. 15 is constructed to change the valve operating conditions of the intake valve 28, the exhaust valve 29, and the throttle valve 15 in the valve operating conditions for learning. Subsequently, the rate of cylinder-to-cylinder variations in intake air quantity DEV is calculated, and the calculated value is learned as a learning value of cylinder-to-cylinder variation GDEV, in the condition to execute variation learning.

The processing of the base routine for calculating the cylinder-to-cylinder variation shown in FIG. 13 will be described below. When this routine is activated, the maximum value GAPEAK (#i) of instantaneous airflow rate GAFM in the period corresponding to the intake stroke of each cylinder 100 is calculated as at steps 101 to 104 in FIG. 3 described in conjunction with the first embodiment. Subsequently, the procedure proceeds to step 106, where whether or not the condition to execute variation learning is met is determined in the same manner as in the first embodiment.

When it is determined that the condition to execute variation learning is met as a consequent of determination, the procedure proceeds to step 106a, where the throttle opening TA is changed to the throttle opening KTA for learning. The throttle opening KTA for learning is set to full-bore or at an opening at which the pressure in the intake pipe becomes substantially the ambient pressure. Accordingly, the amplitude of the intake air pulsation to be detected by the airflow meter 14 which is disposed on the upstream side of the throttle valve 15 may be increased. Thus, the characteristic value of the intake air pulsation (for example, the maximum value) to be used for calculation of the rate of cylinder-to-cylinder variations in intake air quantity DEV (#i) can easily be determined, thereby becoming the state suitable for leaning the learning value of cylinder-to-cylinder variations GDEV (#i).

Subsequently, the procedure proceeds to the Step 106b, where the lift amount of the intake valve VVL is changed to the lift amount of the intake valve for leaning KVVL. The lift amount of the intake valve for learning KVVL is set to a value smaller than a predetermined lift amount or to the minimum value. The lift amount of the intake valve VVL becomes smaller and the ratio of cylinder-to-cylinder variations in the actual lift amount increases with respect to those in the target lift amount. Accordingly, the cylinder-to-cylinder variations in intake air quantity in each cylinder 100 correspondingly increase. Thus, a state suitable for learning the learning value of cylinder-to-cylinder variations GDEV (#i) is provided.

Subsequently, the procedure proceeds to the Step 106c, where the timing of the intake valve INVVT is changed into the timing of the intake valve for leaning KINVVT. The timing of the exhaust valve EXVVT is changed into the timing of the exhaust valve for leaning KEXVVT. As shown in FIG. 14, the timing of the intake valve for leaning KINVVT and the timing of the exhaust valve for leaning KEXVVT are set, so that there is no valve overlap between the intake valve 28 and the exhaust valve 29. The opening period of the intake valve 28 is set between the top dead center (TDC) to the bottom dead center (BDC). Consequently, blowback of the combustion gas or intake air can be avoided, and thus disorder of intake air pulsation due to blowback of combustion gas or intake air may be prevented, which provides a state suitable for learning the learning value of cylinder-to-cylinder variations GDEV (#i).

The valve operating conditions for the throttle valve 15, the intake valve 28, and the exhaust valve 29 are changed into the valve operating conditions for learning in the manner described above. Subsequently, the procedure proceeds to step 106d, where the routine for calculating the rate of cylinder-to-cylinder variations in intake air quantity in FIG. 7, which was described in the first embodiment, is executed. The rate of cylinder-to-cylinder variations in intake air quantity DEV (#i) is calculated based on the maximum value of the instantaneous airflow rate in each cylinder GAPEAK (#i). Subsequently, the procedure proceeds to step 107, where the rate of cylinder-to-cylinder variations in intake air quantity DEV (#i) calculated at step 106d is learned (stored) as a learning value of cylinder-to-cylinder variation GDEV (#i). Other parts of the processing are the same as the processing in each step shown in FIG. 3 described in conjunction with the first embodiment.

In the second embodiment described above, as shown in a time chart in FIG. 15, in the period in which the condition to execute variation learning is met and the variation learning execution flag is turned ON, the throttle opening TA, the lift amount of the intake valve VVL, the timing of the intake valve INVVT, and the timing of the exhaust valve EXVVT are changed respectively into the valve operating conditions (KTA, KVVL, KINVVT, KEXVVT). The valve operating conditions (KTA, KVVL, KINVVT, KEXVVT) are suitable for leaning the cylinder-to-cylinder variations, and the rate of cylinder-to-cylinder variations in intake air quantity DEV (#i) which is calculated in this specific conditions as a learning value of cylinder-to-cylinder variations GDEV (#i). Accordingly, accuracy of leaning of the learning value of cylinder-to-cylinder variations GDEV (#i) can be improved.

<<Third Embodiment>>

Figure 16:
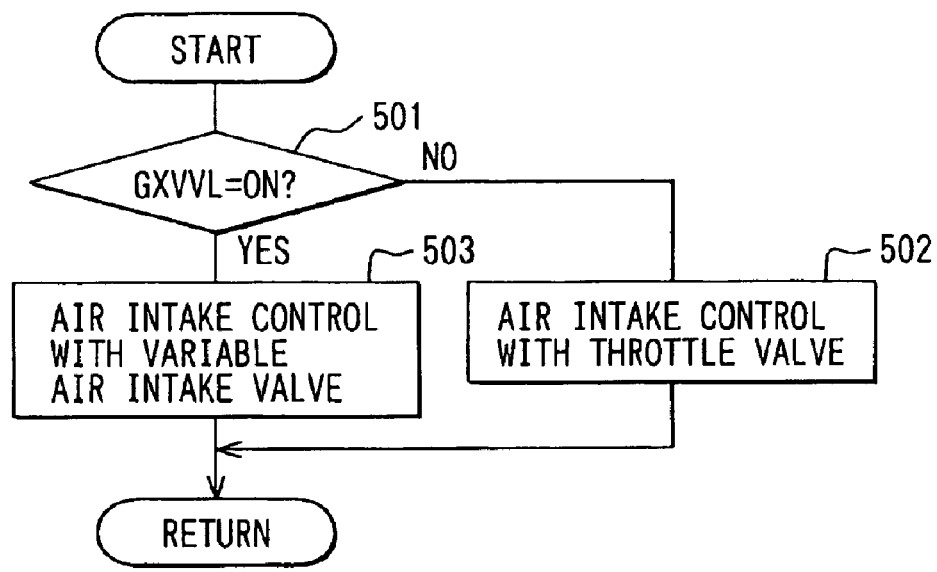
FIG. 16 is a flowchart showing a processing flow of a routine for switching intake air quantity control systems according to a third embodiment in the present invention.
Figure 17:
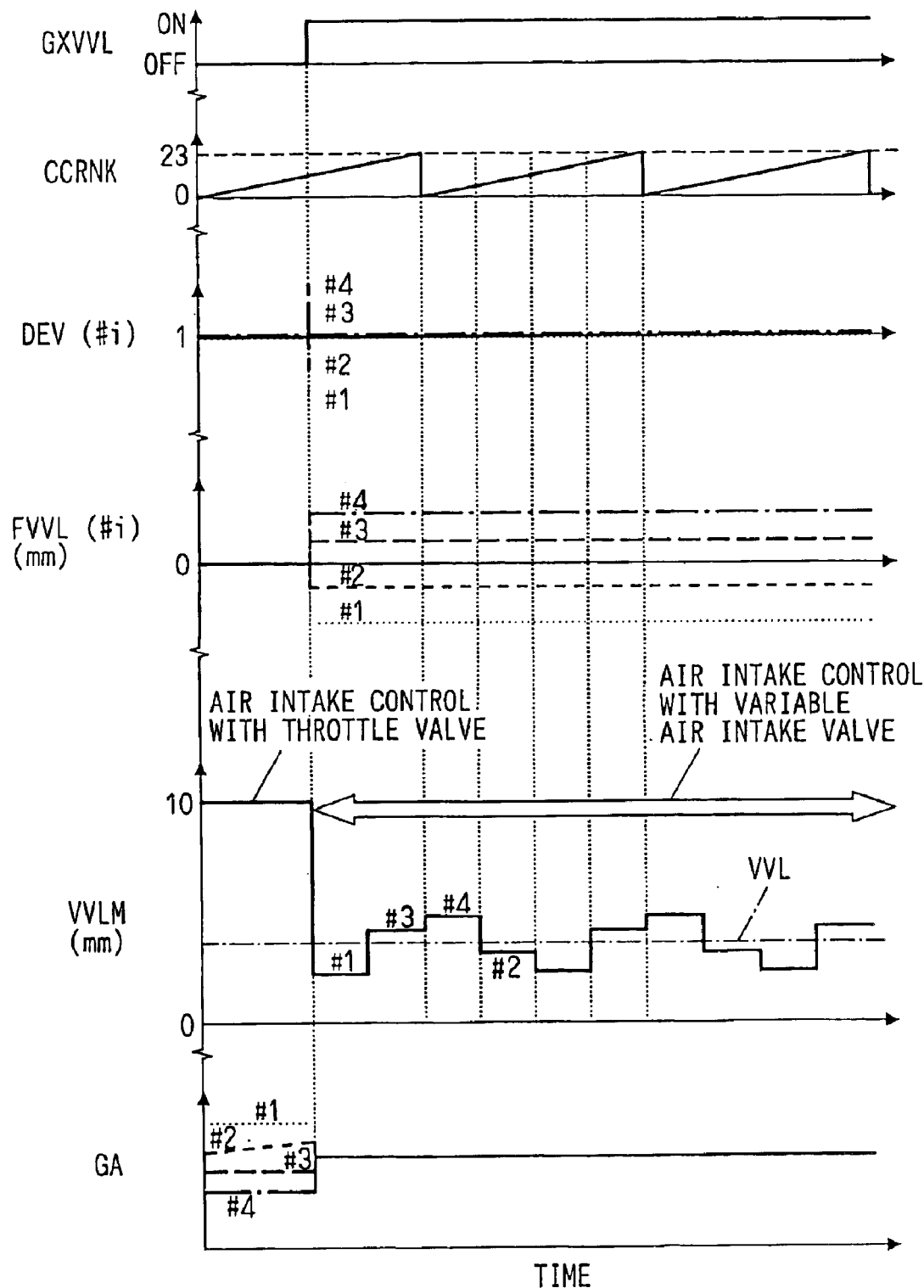
FIG. 17 is a time chart showing an example of execution of the third embodiment.

Referring now to FIG. 16 and FIG. 17, the third embodiment of the present invention will be described. In the third embodiment, the routine for switching the intake air quantity control method shown in FIG. 16 is executed. The intake air quantity is prohibited from being controlled by controlling the variable intake valve, but controlled by the throttle valve until leaning the learning value of cylinder-to-cylinder variations GDEV (#i) is completed. The intake air quantity is controlled by controlling the variable intake valve, after leaning the learning value of cylinder-to-cylinder variations GDEV (#i) is completed.

The routine for switching the intake air quantity control method shown in FIG. 16 is activated at predetermined cycles (for example, a cycle of 4 ms). When this routine is activated, whether or not leaning of the learning value of cylinder-to-cylinder variation GDEV (#i) is completed (whether or not the cylinder-to-cylinder variations learning completion flag GXVVL is turned ON) is determined at step 501. When leaning of the cylinder-to-cylinder variations is not completed, the procedure proceeds to step 502, where the intake air quantity is prohibited from being controlled by controlling the variable intake valve, but controlled by the throttle valve. In this control of intake air quantity by controlling the throttle valve, the intake air quantity is controlled by varying the throttle opening TA based on the position of the accelerator or on the operating conditions of the engine. In this case, the lift amount of the intake valve VVL is fixed to a predetermined value, such as the maximum value (for example 10 mm).

Subsequently, when it is determined that leaning of the learning value of cylinder-to-cylinder variations GDEV (#i) is completed at step 501, the procedure proceeds to step 503, where the intake air quantity is controlled by controlling the variable intake valve. When the intake air quantity is controlled by controlling the variable intake valve, the intake air quantity is controlled by varying the lift amount of the intake valve VVL based on the position of the accelerator or the operating conditions of the engine, while correcting the cylinder-to-cylinder variations in intake air quantity based on the rate of cylinder-to-cylinder variations in intake air quantity DEV (#i), which is estimated by the use of the learning value of cylinder-to-cylinder variation GDEV (#i). In this case, the throttle opening TA is controlled so that the pressure in the intake pipe PM is maintained at a predetermined negative pressure (for example, −5 kPa) for reducing noise of intake air pulsations.

In the third embodiment described above, as shown in a time chart in FIG. 17, the intake air quantity is prohibited from being controlled by controlling the variable intake value, but controlled by the throttle valve before leaning of the learning value of cylinder-to-cylinder variations GDEV (#i) is completed (when the cylinder-to-cylinder variation learning completion flag GXVVL is OFF). In this arrangement, accuracy of control of the intake air quantity can be secured by controlling the intake air quantity with the throttle valve, until learning of the learning value of cylinder-to-cylinder variations GDEV (#i) is completed. Thus, deterioration of drivability or exhaust emission due to unlearning of the learning value of cylinder-to-cylinder variations GDEV (#i) may be avoided.

Subsequently, after learning of the learning value of cylinder-to-cylinder variations GDEV (#i) is completed and the cylinder-to-cylinder variation learning completion flag GXVVL is turned ON, control of the intake air quantity by controlling the variable intake valve is started. Control of the intake air quantity by controlling the variable intake valve can be executed while correcting the cylinder-to-cylinder variations in intake air quantity with high degree of accuracy using the estimated rate of cylinder-to-cylinder variations in intake air quantity DEV (#i) in the state in which the rate of cylinder-to-cylinder variations in intake air quantity DEV (#i) for almost entire operating range can be estimated with high degree of accuracy using the learning value of cylinder-to-cylinder variations GDEV (#i). Here, control of the intake air quantity by controlling the variable intake valve can be executed with high degree of accuracy.

<<Fourth Embodiment>>

In the first to the third embodiments, the rate of cylinder-to-cylinder variations in intake air quantity DEV (#i) is calculated using the instantaneous airflow rate GAFM detected by the airflow meter 14. However, in the fourth embodiment of the present invention shown in FIG. 18 and FIG. 19, the rate of cylinder-to-cylinder variations in intake air quantity DEV (#i) is calculated using the instantaneous intake pipe pressure PMAP detected by the intake pipe pressure sensor 18 (detecting unit).

Figure 19:
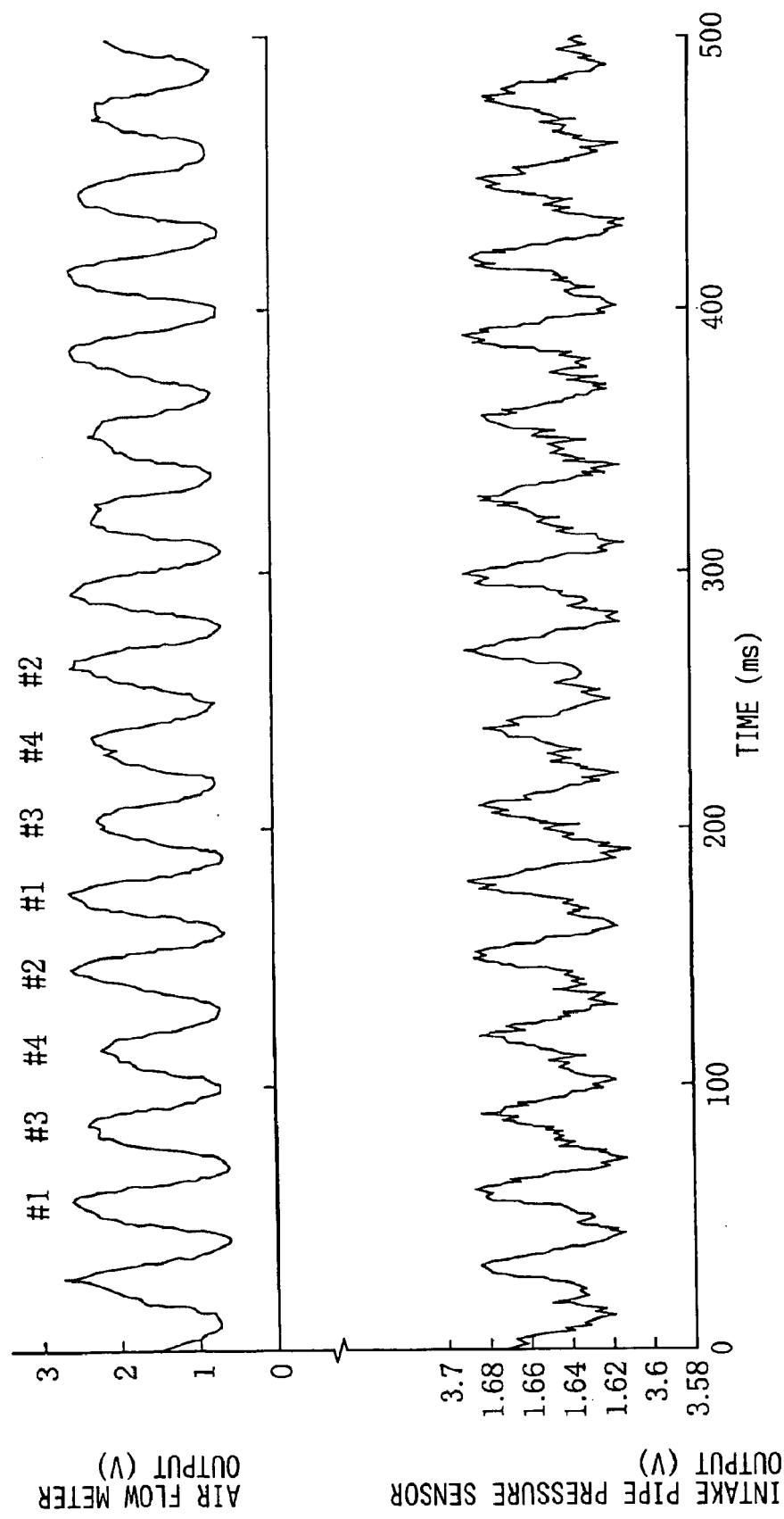
FIG. 19 is a time chart for explaining a correlation between the output from the airflow meter and the output from an intake pipe pressure sensor.

During engine operation, as shown in FIG. 19, the output from the intake pipe pressure sensor 18 (instantaneous intake pipe pressure PMAP) pulsates synchronously with the pulsation of the output from the airflow meter 14 (instantaneous airflow rate GAFM), and the output from the intake pipe pressure sensor 18 becomes a substantially minimum value when the output (instantaneous airflow rate GAFM) from the airflow meter 14 (instantaneous intake pipe pressure PMAP) becomes the maximum value.

Figure 18:
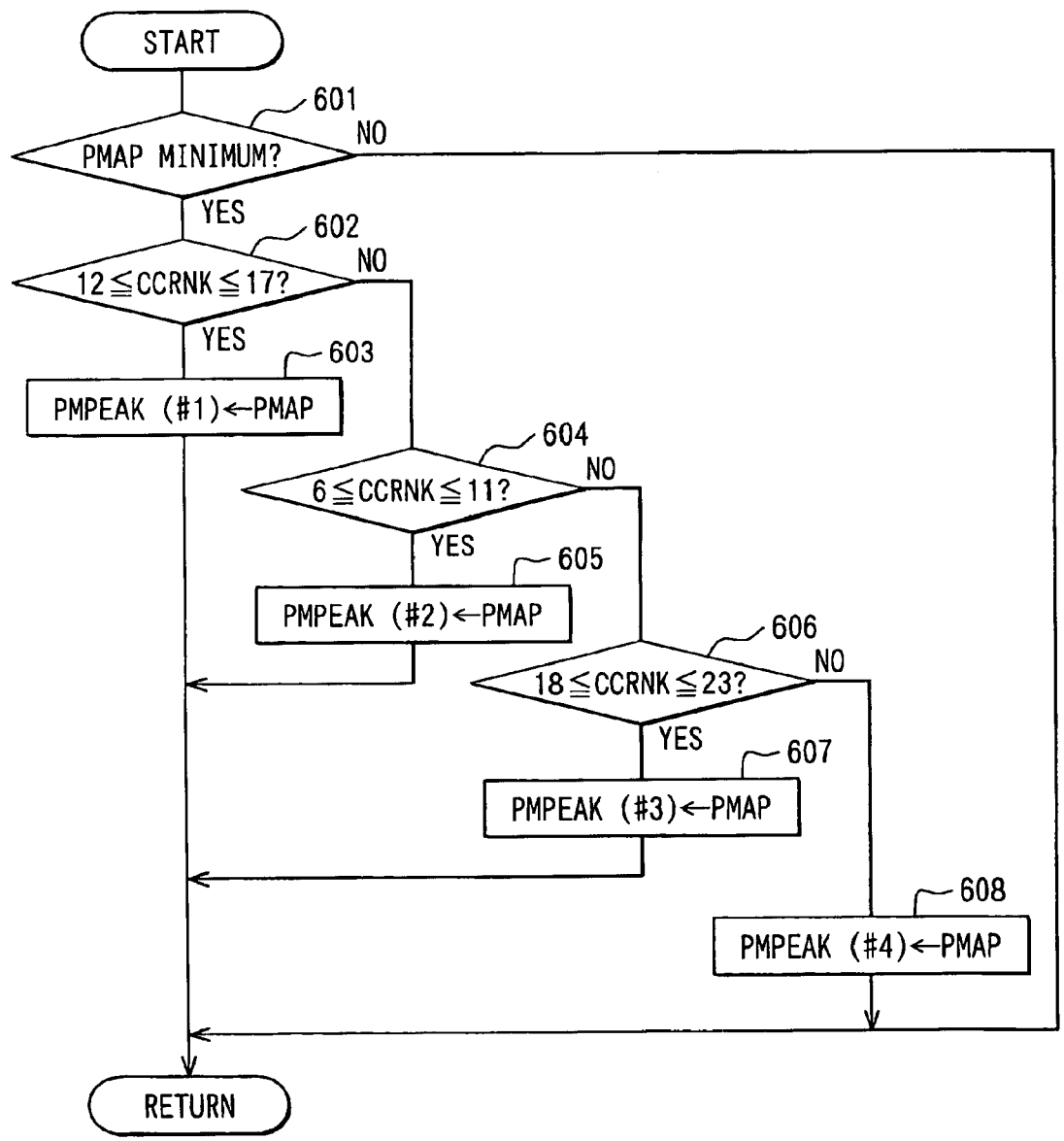
FIG. 18 is a flowchart showing a processing flow of a routine for calculating the minimum value of the instantaneous intake pipe pressure of each cylinder according to a fourth embodiment in the present invention.

Accordingly, in the fourth embodiment, the routine for calculating the minimum value of the instantaneous intake pipe pressure in each cylinder 100 shown in FIG. 18 is executed, the maximum value of instantaneous intake pipe pressure PMPEAK (#i) in the period corresponding to the intake stroke of each cylinder 100 is obtained, and the rate of cylinder-to-cylinder variations in intake air quantity DEV (#i) is calculated using the obtained minimum value of instantaneous intake pipe pressure DMPEAK (#i).

In the routine for calculating the minimum value of instantaneous intake pipe pressure in each cylinder 100 shown in FIG. 18 is activated at timings of A/D conversions (for example, 4 ms cycles) of the output from the intake pipe pressure sensor 18. When this routine is activated, whether or not the instantaneous intake pipe pressure PMAP detected by the intake pipe pressure sensor 18 is the minimum value is determined at step 601. This method of determination of the minimum value is such that the current value of the instantaneous intake pipe pressure PMAP is compared with the previous value and the whether or not the direction of change of the instantaneous intake pipe pressure PMAP is inverted from decrease to increase is determined.

When the instantaneous intake pipe pressure PMAP is determined to be the minimum value at step 601, the procedure proceeds to step 602, where whether or not the counted value of the crankshaft angle counter is CCRNK= 12–17 (that is, the period corresponding to the intake stroke of the first cylinder #1) is determined. If CCRNK=12–17, the procedure proceeds to step 603, where the minimum value of the instantaneous intake pipe pressure PMAP during the period corresponding to the intake stroke of the first cylinder #1 is determined to be a minimum value of the instantaneous intake pipe pressure of the first cylinder #1 PMPEAK (#1).

When it is determined to be "No" at step 602, and the counted value of the crankshaft angle counter is determined to be CCRNK=6–11 at step 604 (that is, the period corresponding to the intake stroke of the second cylinder #2), the procedure proceeds to step 605, where the minimum value of the instantaneous intake pipe PMAP in the period corresponding to the intake stroke of the second cylinder #2 is determined to be a minimum value of the instantaneous intake pipe pressure of the second cylinder #2 PMPEAK (#2).

When it is determined to be "No" at steps 602 and 604, and the counted value of the crankshaft angle counter is determined to be CCRNK=18–23 (that is, the period corresponding to the intake stroke of the third cylinder #3) at step 606, the procedure proceeds to step 607, where the minimum value of the instantaneous intake pipe pressure PMAP in the period corresponding to the intake stroke of the third cylinder #3 is determined to be a minimum value of the instantaneous intake pipe pressure of the third cylinder #3 PMPEAK (#3).

When it is determined to be "No" in all Steps 602, 604, and 606, that is, when the counted value of the crankshaft angle counter is CCRNK=0–5 (the period corresponding to the intake stroke of the fourth cylinder #4), the procedure proceeds to step 608, where the minimum value of the instantaneous intake pipe pressure PMAP in the period corresponding to the intake stroke of the fourth cylinder #4 is determined to be a minimum value of the instantaneous intake pipe pressure of the fourth cylinder #4 PMPEAK (#4).

Using the minimum value of instantaneous intake pipe pressure in each cylinder PMPEAK (#i) obtained as described above, the rate of cylinder-to-cylinder variations in intake air quantity DEV (#i) for each cylinder 100 is calculated in the same method as calculating the rate of cylinder-to-cylinder variations in intake air quantity (See FIG. 7) described in conjunction with the first embodiment.

In the fourth embodiment described above as well, the rate of cylinder-to-cylinder variations in intake air quantity DEV (#i) can be calculated with high degree of accuracy.

<<Fifth Embodiment>>

Figure 20:
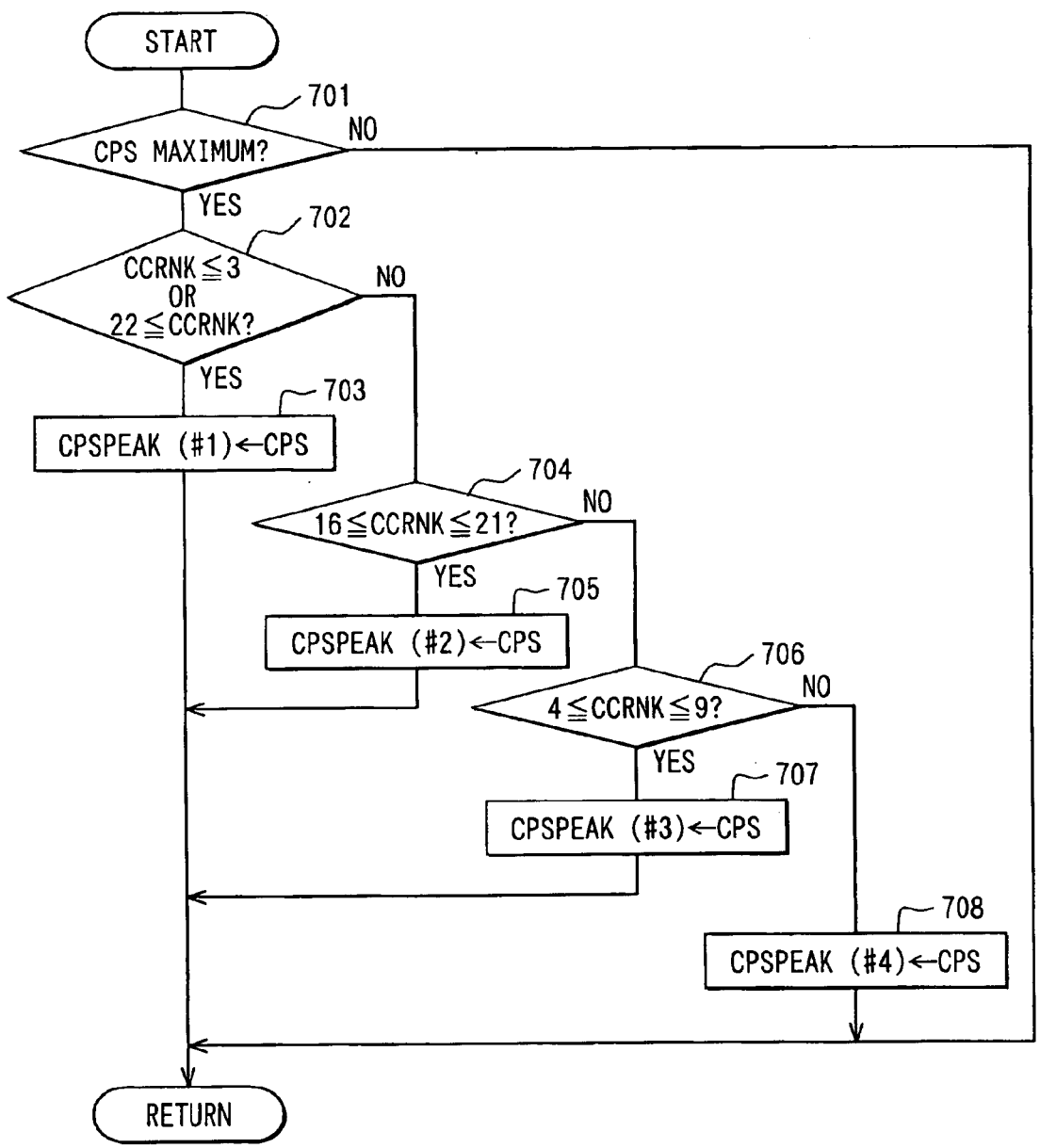
FIG. 20 is a flow chart showing a processing flow of a routine for calculating the maximum value of the in-cylinder pressure of each cylinder according to a fifth embodiment in the present invention.

In the fifth embodiment of the present invention shown in FIG. 20, focusing on such characteristic that the pressure in the cylinder 100 increase with the intake air quantity taken into the cylinder, the pressure in each cylinder 100 is detected, and the maximum value of the pressure in the cylinder 100 in the period about the compression TDC of each cylinder 100 is obtained. In order to achieve this process, in the fifth embodiment, an in-cylinder pressure sensor 21a (detecting unit) for detecting the in-cylinder pressure is provided for each cylinder. The in-cylinder pressure sensor 21a is built in the ignition plug 21 according to FIG. 1. However, the in-cylinder pressure sensor 21a may be provided separately from the ignition plug 21.

In the fifth embodiment, the routine for calculating the maximum value of the in-cylinder pressure, shown in FIG. 20, is executed for each cylinder 100 at timings of A/D conversions of the in-cylinder pressure sensor 21a (for example, 4 ms cycles). When this routine is activated, whether or not the in-cylinder pressure CPS detected by the in-cylinder pressure sensor 21a is the maximum value is determined at step 701. This method of determining the maximum value may be such that the current value of the in-cylinder pressure CPS is compared with the previous value, and whether or not the direction of change of the in-cylinder pressure CPS is inverted from increase to decrease is determined.

When the in-cylinder pressure CPS is determined to be the maximum value at step 701, the procedure proceeds to step 702, where whether or not the counted value of the crankshaft angle counter is 22≦CCRNK or CCRNK≦3 (that is, the period within 90° CA before and 90° CA after the compression TDC of the first cylinder #1) is determined. If the determination is positive at step 702, the procedure proceeds to step 703, and the maximum value of the in-cylinder pressure CPS in the period within 90° CA before and 90° CA after the compression TDC of the first cylinder #1 is determined to be the maximum value of the in-cylinder pressure of the first cylinder #1 CPSPEAK (#1).

When it is determined to be "No" at step S702, and the counted value of the crankshaft angle counter is determined to be CCRNK=16–21 (that is, the period within 90° CA before and 90° CA after the compression TDC of the second cylinder #2) at step 704, the procedure proceeds to step 705, and the maximum value of the in-cylinder pressure CPS in the period within 90° CA before and 90° CA after the compression TDC of the second cylinder #2 is determined to be the maximum value of the in-cylinder pressure of the second cylinder #2 CPSPEAK (#2).

When it is determined to be "No" at steps 702 and 704, and the counted value of the crankshaft angle counter is determined to be CCRNK=4–9 (that is, in the periods within 90° CA before and 90° CA after the compression TDC of the third cylinder #3) at step 706, the procedure proceeds to step 707, and the maximum value of the in-cylinder pressure CPS in the period within 90° CA before and 90° CA after the compression TDC of the third cylinder #3 is determined to be the maximum value of the in-cylinder pressure of the third cylinder #3 CPSPEAK (#3).

When it is determined to be "No" in all Steps of 702, 704, and 706, that is, when the counted value of the crankshaft angle counter is CCRNK=10–15 (in the period within 90° CA before and 90° CA after the compression TDC of the fourth cylinder #4), the procedure proceeds to step 708, and the maximum value of the in-cylinder pressure CPS in the period within 90° CA before and 90° CA after the compression TDC of the fourth cylinder #4) is determined to be the maximum value of the in-cylinder pressure of the fourth cylinder #4 CPSPEAK (#4).

Using the maximum value of the in-cylinder pressure CPSPEAK (#i) for each cylinder 100 obtained as described above, the rate of cylinder-to-cylinder variations in intake air quantity DEV (#i) for each cylinder 100 is calculated in the same manner as the method of calculating the rate of cylinder-to-cylinder variations in intake air quantity (See FIG. 7) described in conjunction with the first embodiment.

The rate of cylinder-to-cylinder variations in intake air quantity DEV (#i) can be calculated with high degree of accuracy in the fifth embodiment as well.

<<Sixth Embodiment>>

Referring now to FIGS. 4, 8 and 21 to 28, the sixth embodiment of the present invention will be described.

The processing of the respective routines for correcting the cylinder-to-cylinder variations executed by the ECU 27 in the sixth embodiment will be described.

[Routine for Correcting Cylinder-to-Cylinder Variations]

The routine for correcting the cylinder-to-cylinder variation shown in FIG. 8 is executed at predetermined cycles while the engine is in operation. This routine is the same as the respective steps shown in FIG. 8 described in the first embodiment except for starting condition. When this routine is activated, whether or not the condition to execute cylinder-to-cylinder variation correction is met is determined at step 401. The condition to execute cylinder-to-cylinder variation correction is to satisfy both of the following two conditions 1 and 2.

1. More than a predetermined time has elapsed after starting operation (that is, it is not in unstable operating condition immediately after starting).

2. It is not in the transient operating condition (that is, it is in the constant operating condition).

When both of these two conditions 1 and 2 are satisfied, the condition to execute cylinder-to-cylinder variation correction is met. However, if one or both of these conditions are not satisfied, the condition to execute cylinder-to-cylinder variation correction is not met.

When it is determined that the condition to execute cylinder-to-cylinder variation correction is not met, the routine is terminated without executing the processing relating to the cylinder-to-cylinder variation correction from Step 402 on.

On the other hand, when it is determined that the condition to execute cylinder-to-cylinder variation correction is met at step 401, the processing relating to the cylinder-to-cylinder variation correction from Step 402 on will be executed in the same manner as the first embodiment described above.

[Main Routine for Calculating the Area of the Intake Air Quantity]

Figure 21:
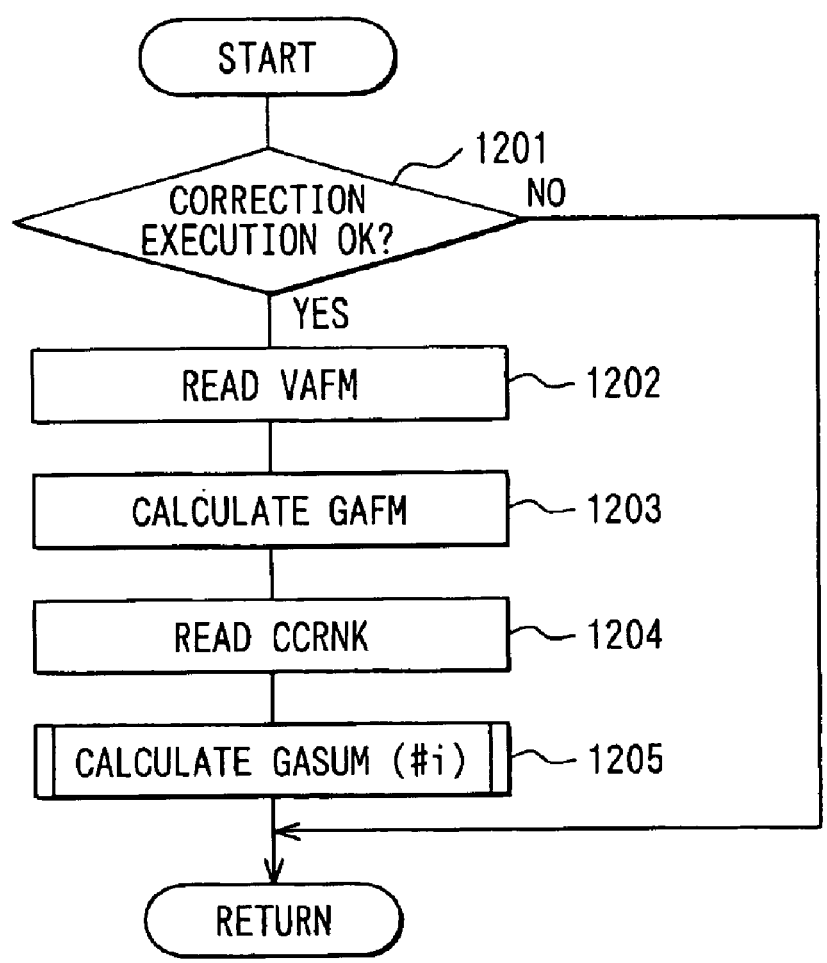
FIG. 21 is a flowchart showing a processing flow of a main routine for calculating the area of the intake air quantity according to a sixth embodiment in the present invention.

The main routine for calculating the area of the intake air quantity shown in FIG. 21 is activated at timings of A/D conversions of the output voltage from the airflow meter 14 (for example 4 ms cycles). When this routine is activated, whether or not the same condition of execution (condition to execute cylinder-to-cylinder variation correction) as Step 401 in FIG. 8 in this embodiment is met is determined at step 1201. When the condition to execute cylinder-to-cylinder variation correction is not met, the routine is terminated without executing the processing relating to the calculation of the area of the intake air quantity for a predetermined period from Step 1202 on.

On the other hand, when it is determined that the condition to execute cylinder-to-cylinder variation correction is met at step 1201, the processing relating to the calculation of the area of the intake air quantity for a predetermined period from Step 1202 will be executed as follows. In a first place, the output voltage VAFM after filtering of the airflow meter 14 is read at step 1202, and then the procedure proceeds to step 1203, where the output voltage VAFM from the airflow meter 14 is converted into the instantaneous airflow rate GAFM passing through the airflow meter 14, using the map of the instantaneous airflow rate GAMF in FIG. 4.

Subsequently, the procedure proceeds to step 1204, where the counted value of the crankshaft angle counter CCRNK is read.

Then, in the next Step 1205, the routine for calculating the area of the intake air quantity in each cylinder 100 for the predetermined period shown in FIG. 8 is executed to calculate the area of the intake air quantity (output waveform of the airflow meter 14) in each cylinder 100 for the predetermined period GASUM (#i).

[Routine for Calculating the Area of the Intake Air Quantity in each Cylinder 100 for a Predetermined Period]

Figure 22:
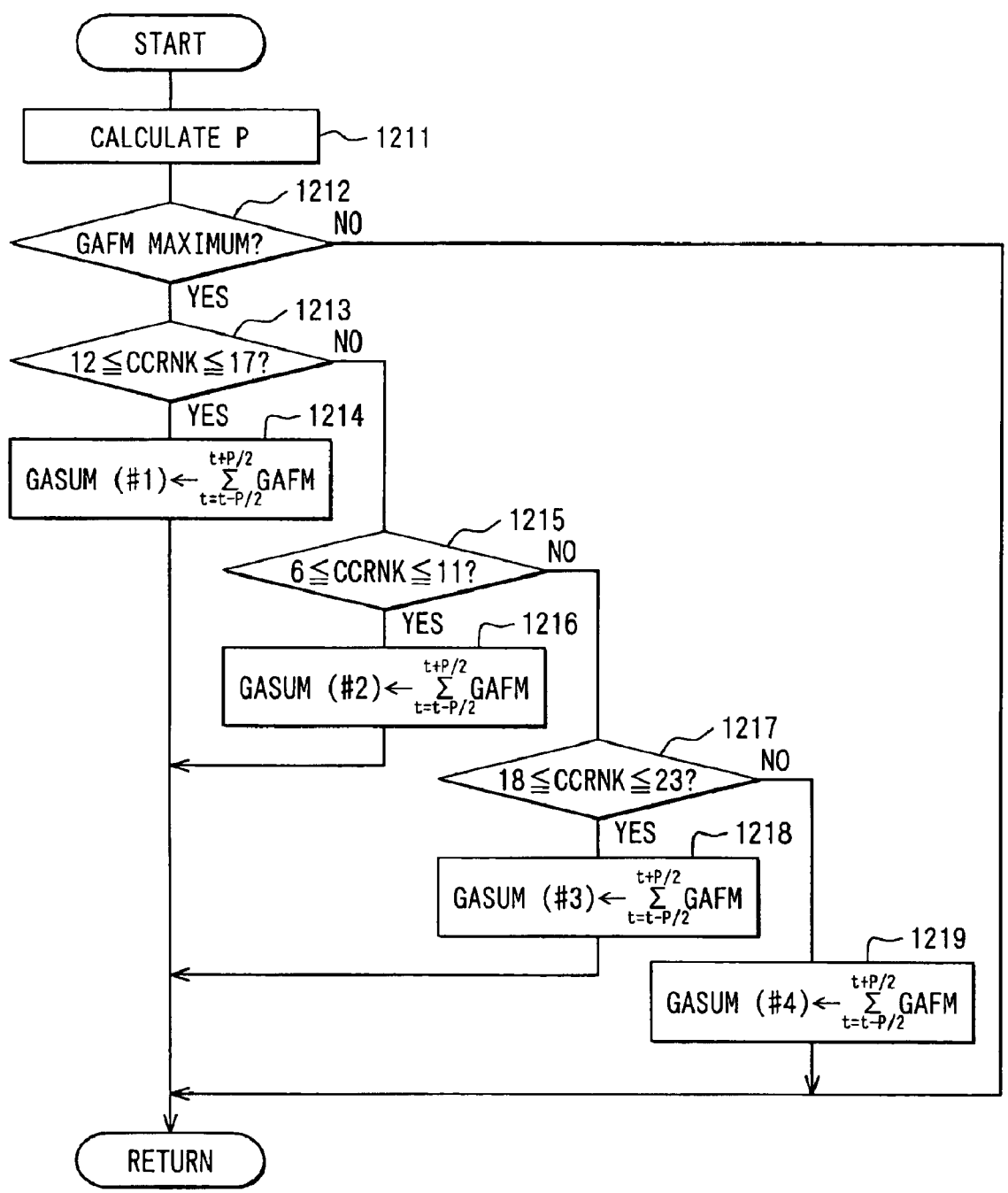
FIG. 22 is a flowchart showing a processing flow of a routine for calculating the area of the intake air quantity of each cylinder for a predetermined period according to the sixth embodiment.

The routine for calculating the area of the intake air quantity in each cylinder 100 for a predetermined period shown in FIG. 22 is a sub-routine activated at step 1205 in FIG. 21 and serves as an area calculating unit. When this routine is activated, the predetermined period P for calculating the area of the intake air quantity in each cylinder 100 (the area of the output waveform from the airflow meter 14) is calculated using the map in FIG. 23, at step 1211. Here, as shown in FIG. 24, the predetermined period P is set to a period in which the intake air quantity is hardly subjected to the influence of the reflected wave from the intake air pulsation or the air intake interference of other cylinder, more specifically, the period including the maximum value of the output waveform (intake air quantity) of the airflow meter 14.

Figure 23:
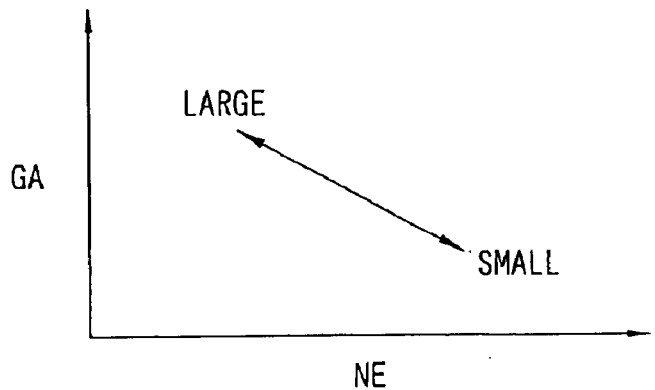
FIG. 23 is a conceptual diagram showing a map of a predetermined period P according to the sixth embodiment.
Figure 24:
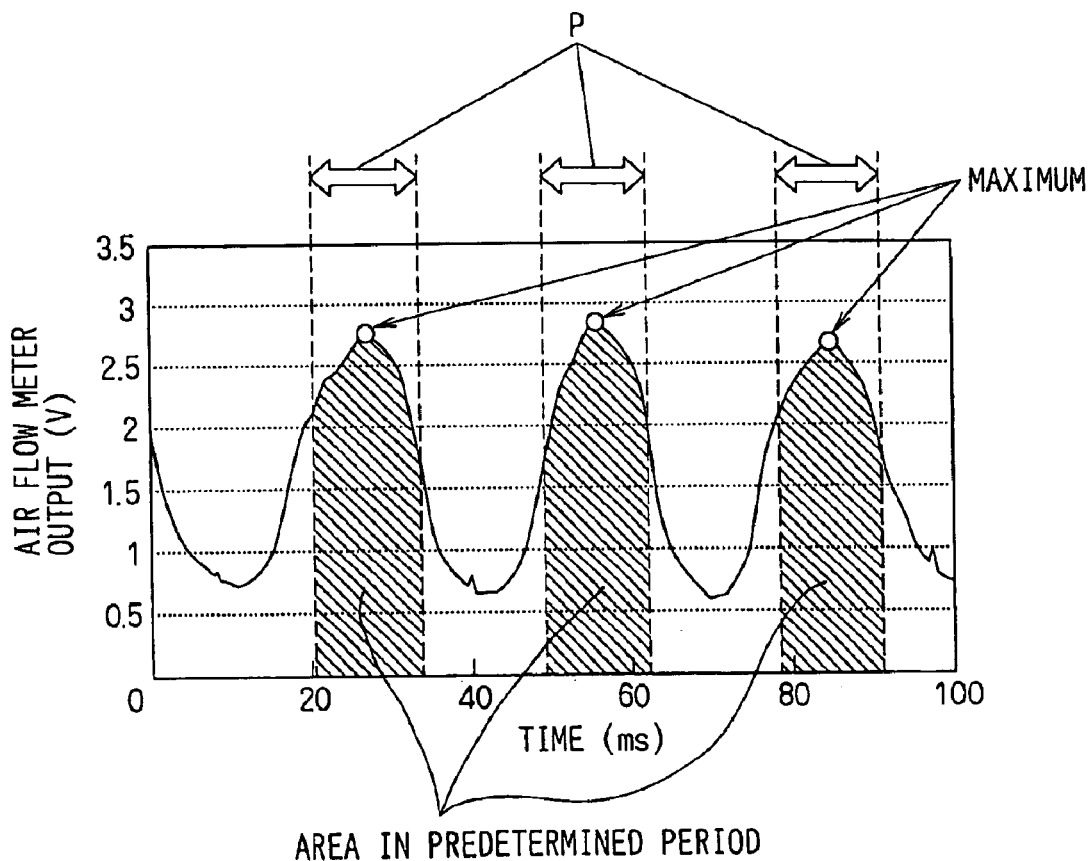
FIG. 24 is a drawing for explaining a method of calculating the area of the intake air quantity for the predetermined period P according to the sixth embodiment.

The map of the predetermined period P in FIG. 23 is for calculating the predetermined period P using the number of engine revolution NE and the intake air quantity GA as parameters. The map is set in such a manner that the predetermined period P increases as the amplitude of the pulsation waves increases in the area, in which the number of engine revolution NE is small or in the area in which the intake air quantity GA is large.

After the predetermined period P is calculated, the procedure proceeds to step 1212, where whether or not the instantaneous airflow rate GAFM detected by the airflow meter 14 is the maximum value is determined.

When it is determined that the instantaneous airflow quantity GAFM is not the maximum value at step 1212, the routine is terminated without executing the subsequent processing. Subsequently, at the timing when the instantaneous airflow rate GAFM reaches the maximum value, the procedure proceeds to step 1213, where whether or not the counted value of the crankshaft angle counter is CCRNK= 12–17 (that is, the period corresponding to the intake stroke of the first cylinder #1) is determined. If CCRNK=12–17, the procedure proceeds to step 1214, where the instantaneous airflow rate GAFM for the predetermined period P of the intake stroke of the first cylinder #1 (the period within P/2 before and P/2 after the time point t at which the value becomes the maximum value) is integrated to obtain the area of the intake air quantity of the first cylinder GASUM (#1). The data of the instantaneous airflow rate GAFM is stored in the RAM of the ECU 27 every time when the details is detected at predetermined sampling cycles (for example 4 ms cycles) in time sequence, and after the stored data of the instantaneous airflow rate GAFM for the predetermined period P is integrated and the area of the intake air quantity GASUM (#1) is obtained, the stored data of the instantaneous airflow rate GAFM is cleared.

When it is determined to be "No" at step 1213, and the counted value of the crankshaft angle counter is determined to be CCRNK=6–11 (that is, the period corresponding to the intake stroke of the second cylinder #2) at step 1215, the procedure proceeds to step 1216, where the instantaneous airflow rate GAFM of the intake stroke of the second cylinder #2 for the predetermined period P is integrated to obtain the area of the intake air quantity of the second cylinder #2 GASUM (#2).

When it is determined to be "No" at steps 1213 and 1215, and the counted value of the crankshaft angle counter is determined to be CCRNK=18–23 (that is, the period corresponding to the intake stroke of the third cylinder #3) at step 1217, the procedure proceeds to step 1218, where the instantaneous airflow rate GAFM of the intake stroke of the third cylinder #3 for the predetermined period P is integrated to obtain the area of the intake air quantity of the third cylinder GASUM (#3).

When it is determined to be "No" in all Steps 1213, 1215, and 1217, that is, when the counted value of the crankshaft angle counter is determined to be CCRNK=0–5 (the period corresponding to the intake stroke of the fourth cylinder #4), the procedure proceeds to step S1219, where the instantaneous airflow rate GAFM of the intake stroke of the fourth cylinder #4 for the predetermined period P is integrated to obtain the area of the intake air quantity of the fourth cylinder GASUM (#4).

[Routine for Calculating the Rate of Cylinder-to-Cylinder Variations in Intake Air Quantity]

Figure 25:
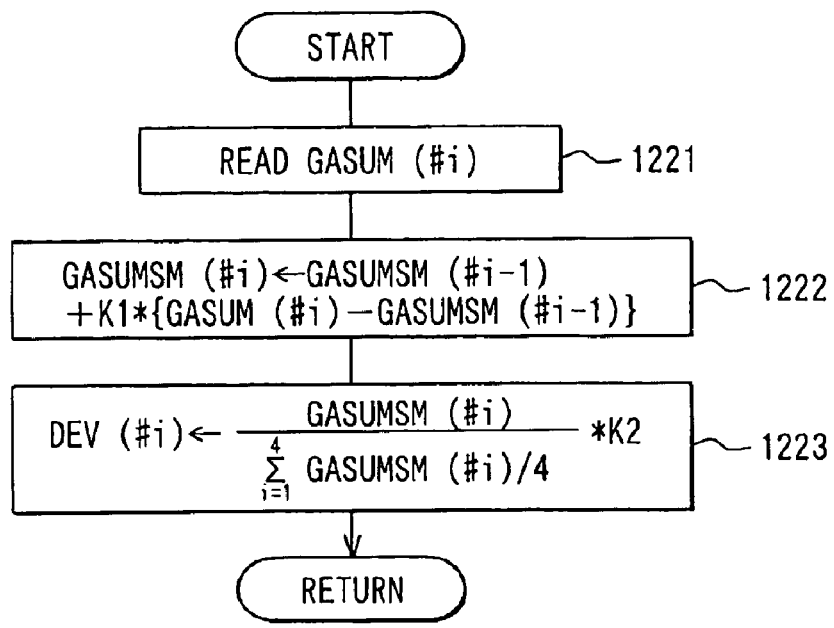
FIG. 25 is a flowchart showing a processing flow of a routine for calculating the rate of cylinder-to-cylinder variations in intake air quantity according to the sixth embodiment.

The routine for calculating the rate of cylinder-to-cylinder variations in intake air quantity shown in FIG. 25 is executed at every cycle (every 180° CA in the case of the four-cylinder engine). The procedure is the same as the routine for calculating the rate of cylinder-to-cylinder variation shown in the first embodiment, and serves as a cylinder-to-cylinder variation in intake air quantity calculating unit. When this routine is activated, the area of the intake air quantity in each cylinder GASUM (#i) is read at step 1221, and the area of the intake air quantity in each cylinder GASUM (#i) is conditioned among the cylinders in the next Step 1222 to obtain an conditioned value of the area of the intake air quantity GASUMSM (#i) for each cylinder.

GASUMSM(#i)=GASUMSM(#i-1)+K1×{GASUM(#i)−GASUMSM(#i-1)}

In this equation, K1 is an conditioning coefficient, and GASUMSM (#i-1) is a conditioned value of the area of the intake air quantity in the (#i-1)$^{th}$ cylinder.

Subsequently, the procedure proceeds to step 1223, and the rate of cylinder-to-cylinder variations in intake air quantity DEV (#i) may be calculated for each cylinder.

Equation 2 (2)

$$DEV(\#i) = \frac{GASUMSM(\#i)}{\sum_{i=1}^{4} GASUMSM(\#i)/4} \times K2$$

Figure 26:
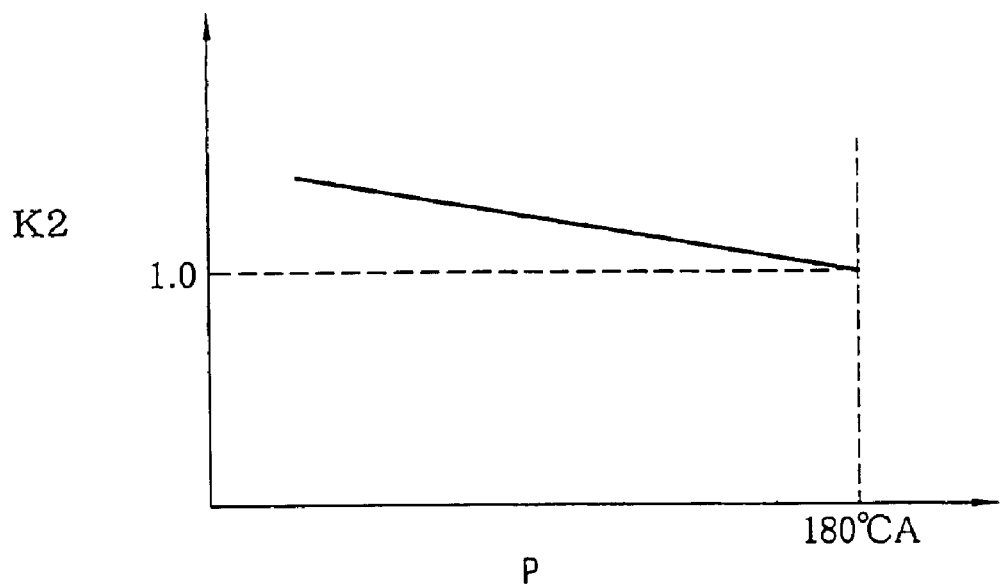
FIG. 26 is a conceptual diagram showing a map of a correction coefficient K2.

The denominator of the equation shown above is an average value of the conditioned values of the areas of the intake air quantities GASUMSM (#i) for all the cylinders, and K2 is a correction coefficient for converting variations in the area of the intake air quantity to the variation in the intake air quantity, which is set by the map shown in FIG. 26. Generally, when the predetermined period P for calculation of the area of the intake air quantity of each cylinder GASUM (#i) decreases, variations in the area of the intake air quantity GASUM (#i) decrease correspondingly. Therefore, the correction coefficient K2 is set to increase with decrease of the predetermined period P.

As is clear from Equation 2, the rate of cylinder-to-cylinder variations in intake air quantity DEV (#i) for each cylinder 100 is a value obtained by dividing the conditioned value of the rate of cylinder-to-cylinder variations in intake air quantity for each cylinder GASUMSM (#i) by the average value of the conditioned values of the rates of cylinder-to-cylinder variations in intake air quantities for all the cylinders and then multiplied by the correction coefficient K2.

The cylinder-by-cylinder intake air quantity can be obtained by multiplying the rate of cylinder-to-cylinder variations in intake air quantity DEV (#i) by the intake air quantity GA (average airflow rate) detected by the airflow meter 14.

Referring now to time charts in FIG. 27 and FIG. 28, an example of cylinder-to-cylinder variation correction in this embodiment will be described.

Figure 27:
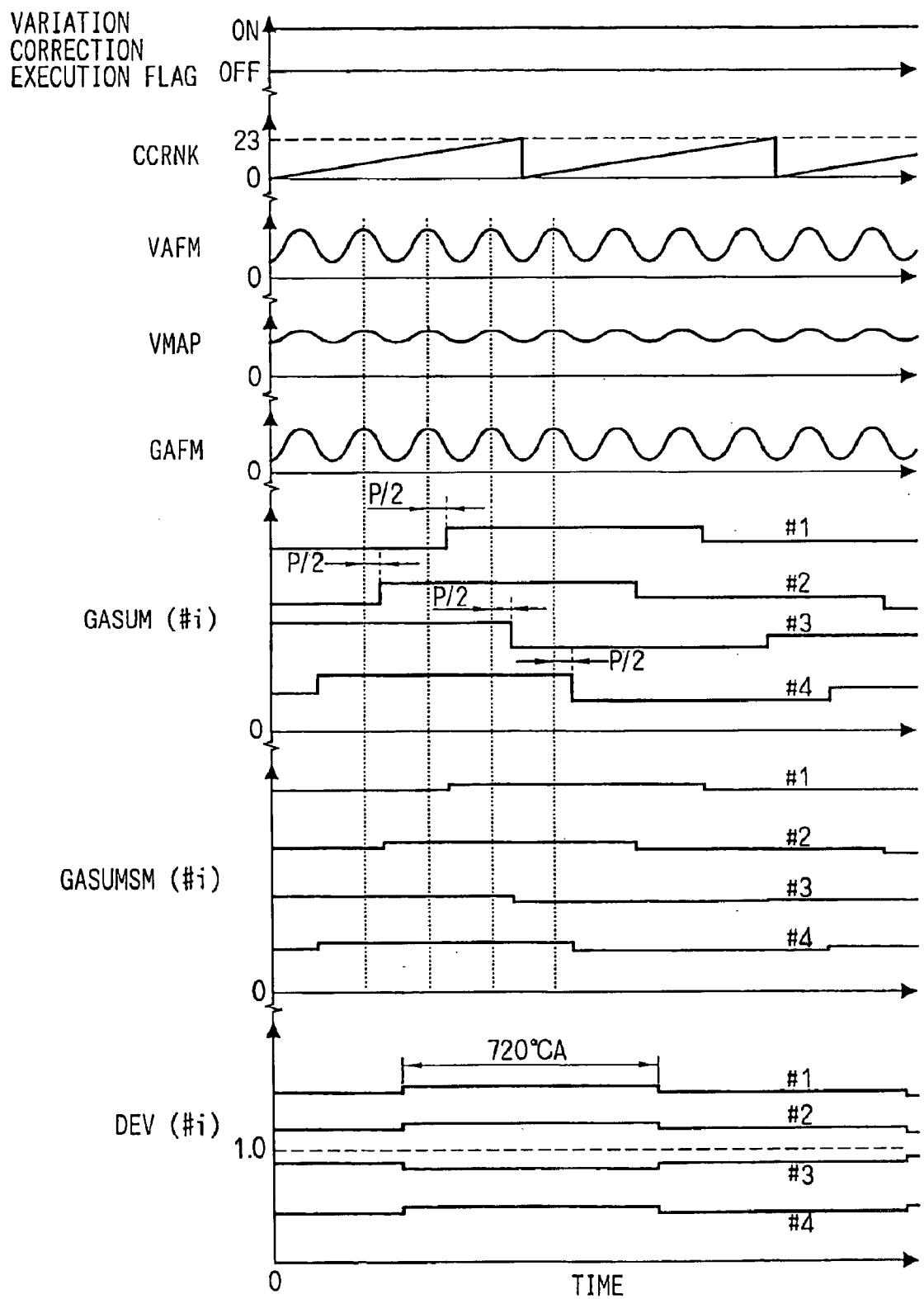
FIG. 27 is a time chart for explaining an example of a process of calculating the rate of cylinder-to-cylinder variations in intake air quantity according to the sixth embodiment.

In the period in which the condition to execute cylinder-to-cylinder variation correction is met and the cylinder-to-cylinder variation correction execution flag is turned ON, as shown in FIG. 27, the area of the intake air quantity GASUM (#i) of a predetermined period (the period within P/2 before and P/2 after the time point t at which the instantaneous airflow rate GAFM becomes the maximum value) for every intake stroke of each cylinder 100 is calculated, and the area of intake air quantity of each cylinder GASUM (#i) is conditioned among the cylinders to obtain an conditioned value of the area of the intake air quantity GASUMSM (#i) for each cylinder. In this manner, the conditioned value of the area of the intake air quantity GASUMSM (#i) for each cylinder 100 is divided by the average of the conditioned values of the areas of intake air quantities of all the cylinders every time when the conditioned values of the areas of the intake air quantities GASUMSM (#i) for all the cylinders are obtained (at every 720° CA), and then is multiplied by the correction coefficient K2 to obtain the rate of cylinder-to-cylinder variations in intake air quantity DEV (#i) for each cylinder.

Figure 28:
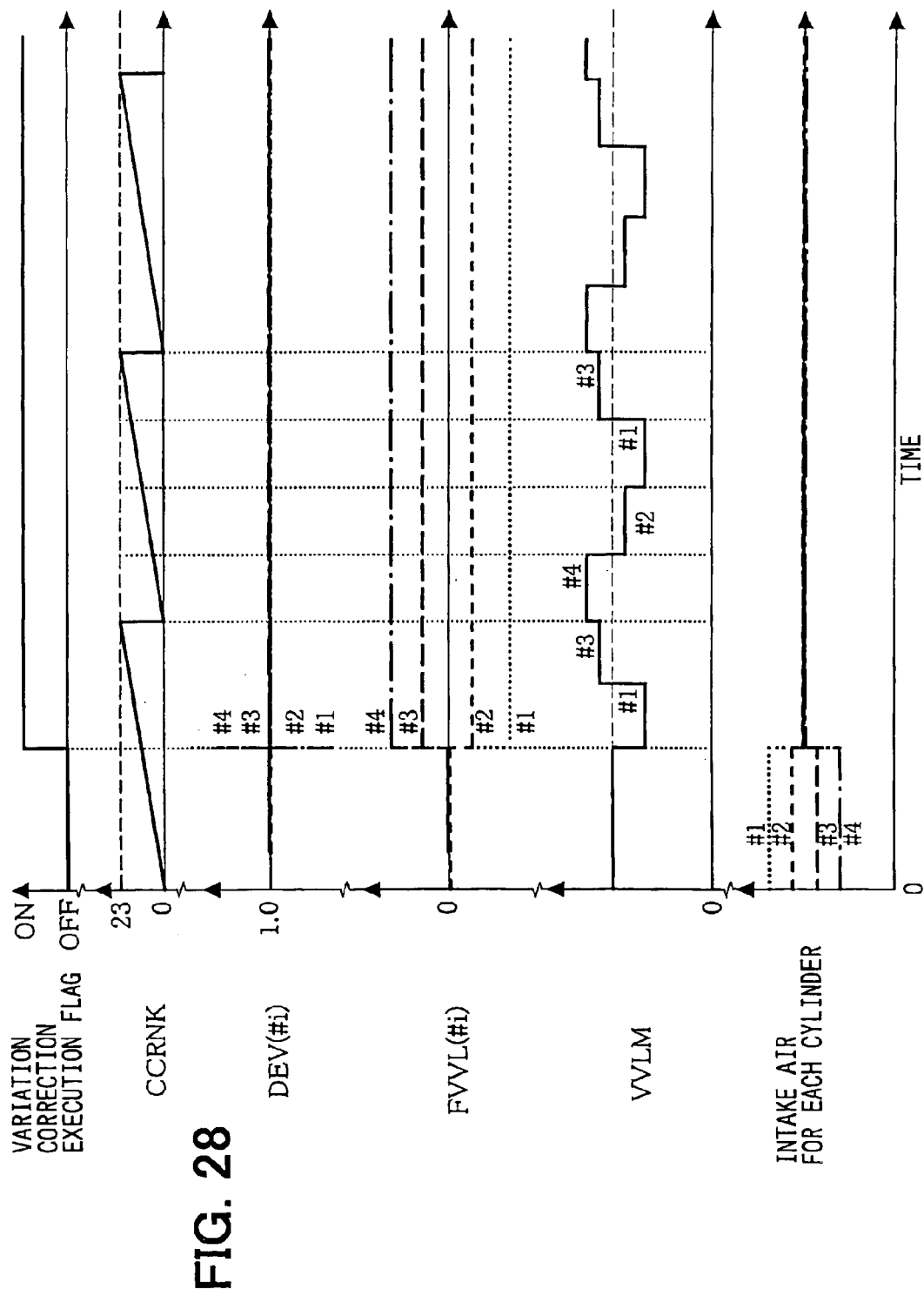
FIG. 28 is a time chart for explaining an example of the cylinder-to-cylinder variation correction according to the sixth embodiment.

As shown in FIG. 28, every time when the rate of cylinder-to-cylinder variations in intake air quantity DEV (#i) for each cylinder 100 is calculated, the lift correction amount FVVL (#i) is calculated according to the rate of cylinder-to-cylinder variations in intake air quantity DEV (#i) and the conditions of engine operation. Subsequently, the lift correction amount FVVL (#i) of the given cylinder 100 is added at every 180° CA to the average value of lift amounts of the intake valves VVL of all the cylinders before correction to obtain the final target lift amount of the intake valve VVLM.

In this manner, the intake air quantity of each cylinder 100 is corrected by correcting the intake valve lift amount at every intake stroke of each cylinder 100 according to the final target lift amount of the intake valve VVLM for each cylinder, which varies in accordance with the intake stroke of each cylinder. Thereby, the cylinder-to-cylinder variations in intake air quantities are corrected.

According to the sixth embodiment described above, since the predetermined period P for calculation of the area of the intake air quantity GASUM (#i) is set to the period including the maximum value of the instantaneous airflow rate GAFM, the predetermined period P can be set to the period in which the intake air quantity is hardly subjected to the influence of the reflected wave from the intake air pulsation or the air intake interference of other cylinder. Accordingly, the rate of cylinder-to-cylinder variations in intake air quantity of each cylinder DEV (#i) can be calculated with high degree of accuracy using the area of the intake air quantity GASUM (#i) of each cylinder, and the cylinder-to-cylinder variations in intake air quantity may be corrected with high degree of accuracy by correcting the lift amount of the intake valve using the rate of cylinder-to-cylinder variations in intake air quantity DEV (#i), whereby both of the cylinder-to-cylinder variations in torque and variations in air-fuel ratio can be reduced.

<<Seventh Embodiment>>

Figure 30:
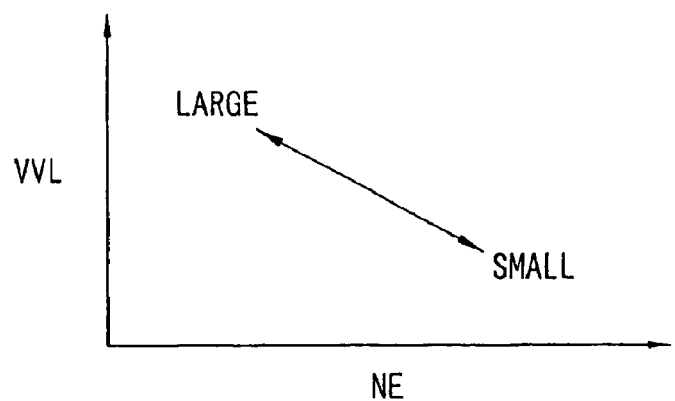
FIG. 30 is a conceptual diagram showing a map for calculating a detection delay DLY of the airflow meter according to the seventh embodiment.
Figure 31:
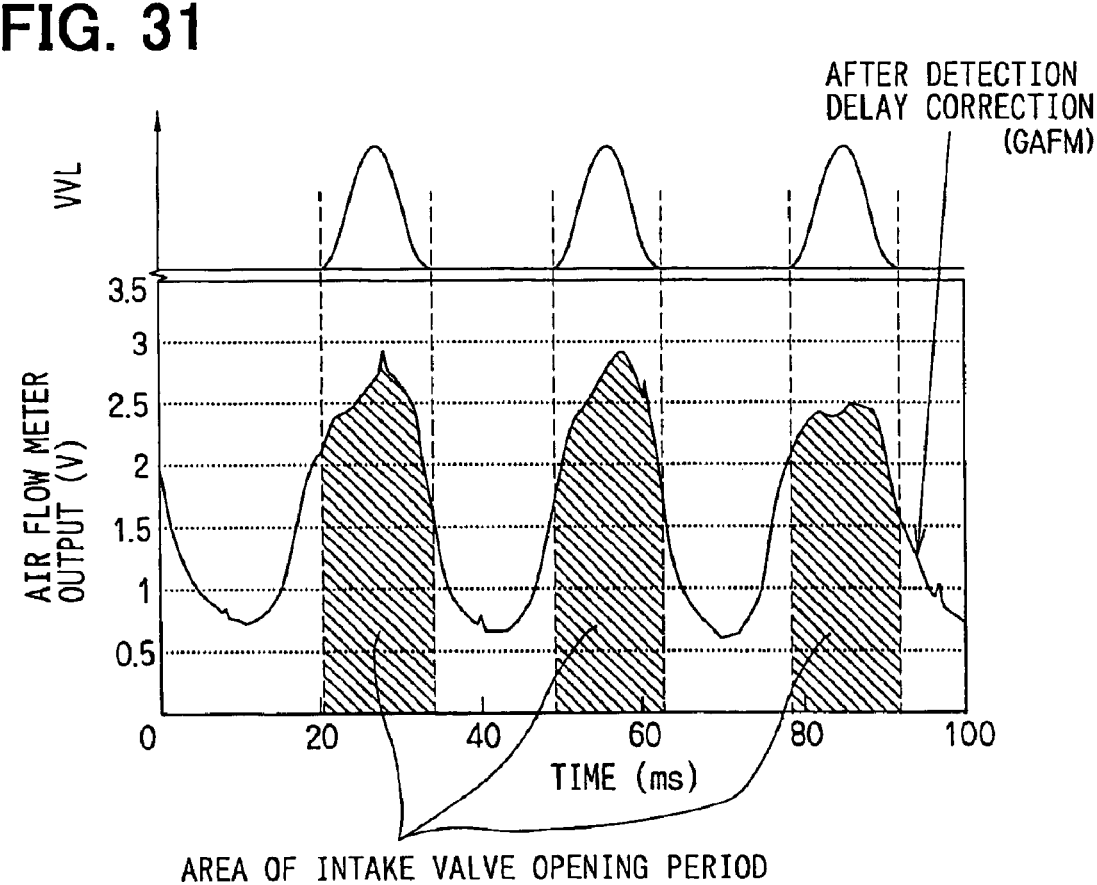
FIG. 31 is a drawing for explaining a method of calculating the area of the intake air quantity for a predetermined period according to the seventh embodiment.

The predetermined period P for calculation of the area of the intake air quantity GASUM (#i) is set to the period including the maximum value of the instantaneous airflow rate GAFM in the sixth embodiment described above. In the seventh embodiment shown in FIG. 29 to FIG. 32, the predetermined period for calculation of the area of the intake air quantity GASUM (#i) is set to a valve-opening period of the intake valve 28. As shown in FIG. 31, the maximum point of the instantaneous airflow rate GAFM exists in the valve-opening period of the intake valve 28, where VVL is positive value.

In this case, since there is a time delay from the timing when the intake air flowing in the intake pipe 12 passes through the periphery of the airflow meter 14 to the timing when the intake air is actually taken into the cylinder 100 (detection delay of the airflow meter 14), detection delay of the airflow meter 14 is taken into account when setting the predetermined period for calculation of the area of the intake air quantity GASUM (#i) in the seventh embodiment.

Figure 29:
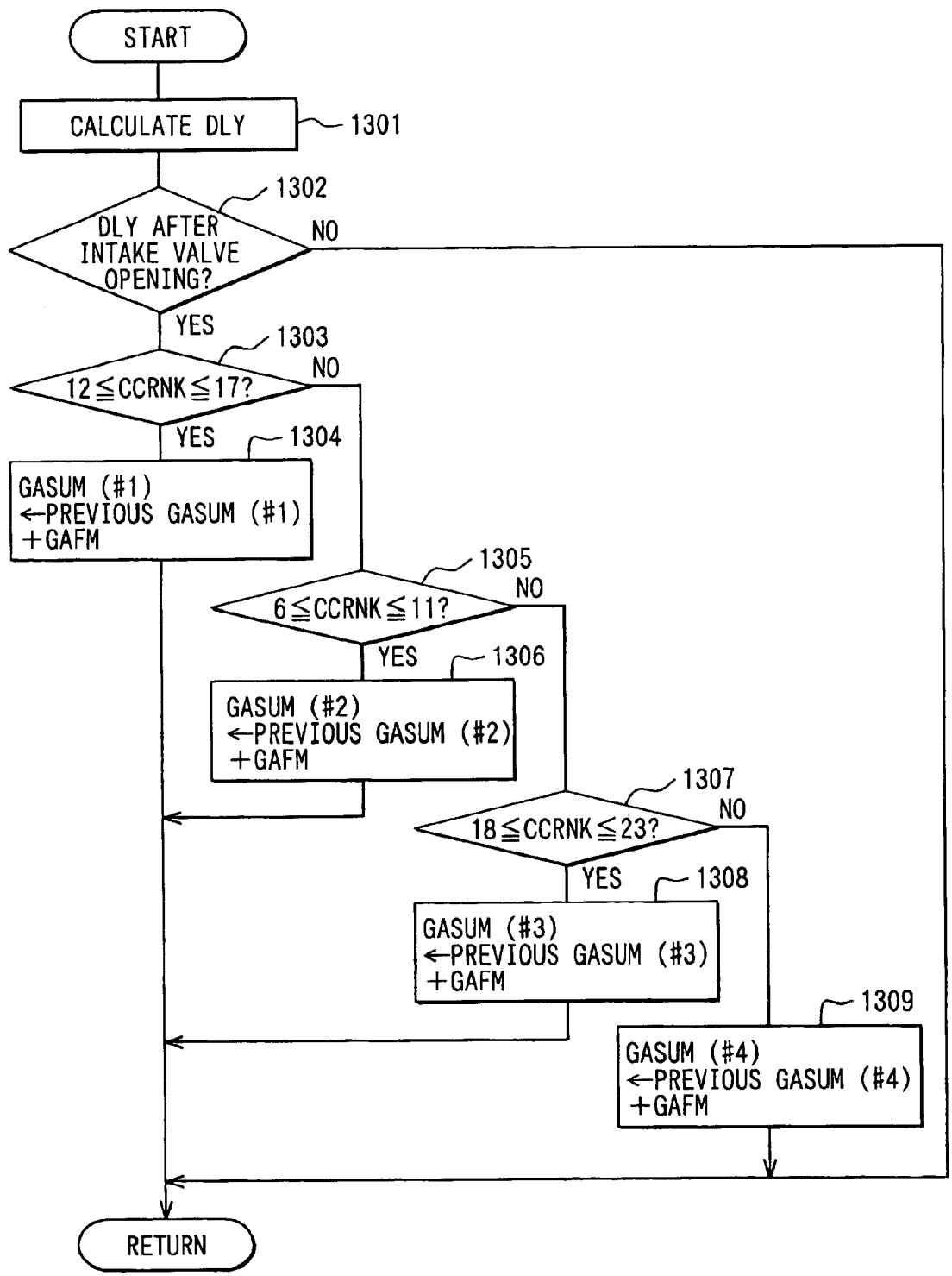
FIG. 29 is a flowchart showing a processing flow of a routine for calculating the area of the intake air quantity of each cylinder for a predetermined period according to a seventh embodiment in the present invention.

In the seventh embodiment, the routine shown in FIG. 29 is executed to calculate the area of the intake air quantity GASUM (#i) of each cylinder 100 in the following manner. At step 1301, the detection delay DLY of the airflow meter 14 is calculated using a map in FIG. 30 according to the current lift amount of the intake valve VVL and the number of engine revolution NE. The map in FIG. 30 is set in such a manner that the detection delay DLY increases with increase of the lift amount of the intake valve VVL in the low revolution range. The flow rate of the air toward the cylinder 100 is lowered with increase in the lift amount of the intake valve VVL in the low revolution range.

After the detection delay DLY is calculated, the procedure proceeds to step 1302, where whether or not it corresponds to the period of the detection delay DLY of the airflow meter 14 with respect to the valve-opening period of the intake valve 28 (the period during which the intake valve open flag is ON) is determined. Here, the valve-opening period of the intake valve 28 may be determined based on the output from a lift sensor (not shown) for detecting the lift amount of the intake valve VVL, or the control target value for the valve-opening period may be used.

If it does not correspond to the period of detection delay DLY of the airflow meter 14 with respect to the valve-opening period of the intake valve 28, the routine is terminated without executing the subsequent processing. Then when it reaches the period corresponding to the period of detection delay DLY of the airflow meter 14 with respect to the valve-opening period of the intake valve 28, the procedure proceeds to step 1303, where whether or not the counted value of the crankshaft angle counter is CCRNK= 12–17 (that is, the period corresponding to the intake stroke of the first cylinder #1) is determined. If CCRNK=12–17, the procedure proceeds to step 1304, where the stored value of the area of the intake air quantity of the first cylinder GASUM (#1) until the previous time is integrated by the current instantaneous airflow rate GAFM to renew the stored value of the area of the intake air quantity of the first cylinder GASUM (#1).

When it is determined to be "No" at step 1303, and the counted value of the crankshaft angle counter is determined to be CCRNK=6–11 at step 1305 (the period corresponding to the intake stroke of the second cylinder #2), the procedure proceeds to step 1306, where the stored value of the area of the intake air quantity of the second cylinder GASUM (#2) until the previous time is integrated by the current instantaneous airflow rate GAFM to renew the stored value of the area of the intake air quantity of the second cylinder GASUM (#2).

When it is determined to be "No" at steps 1303 and 1305 and the counted value of the crankshaft angle counter is determined to be CCRNK=18–23 (the period corresponding to the intake stroke of the third cylinder #3) at step 1307, the procedure proceeds to step 1308, where the stored value of the area of the intake air quantity of the third cylinder GASUM (#3) until the previous time is integrated by the current instantaneous airflow rate GAFM to renew the stored value of the area of the intake air quantity of the third cylinder GASUM (#3).

When it is determined to be "No" in all Steps 1303, 1305, and 1307, that is, when the counted value of the crankshaft angle counter is CCRNK=0–5 (the period corresponding to the intake stroke of the fourth cylinder #4), the procedure proceeds to step 1309, where the stored value of the area of the intake air quantity of the fourth cylinder GASUM (#4) until the previous time is integrated by the current instantaneous airflow rate GAFM to renew the stored value of the area of the intake air quantity of the fourth cylinder GASUM (#4).

Figure 32:
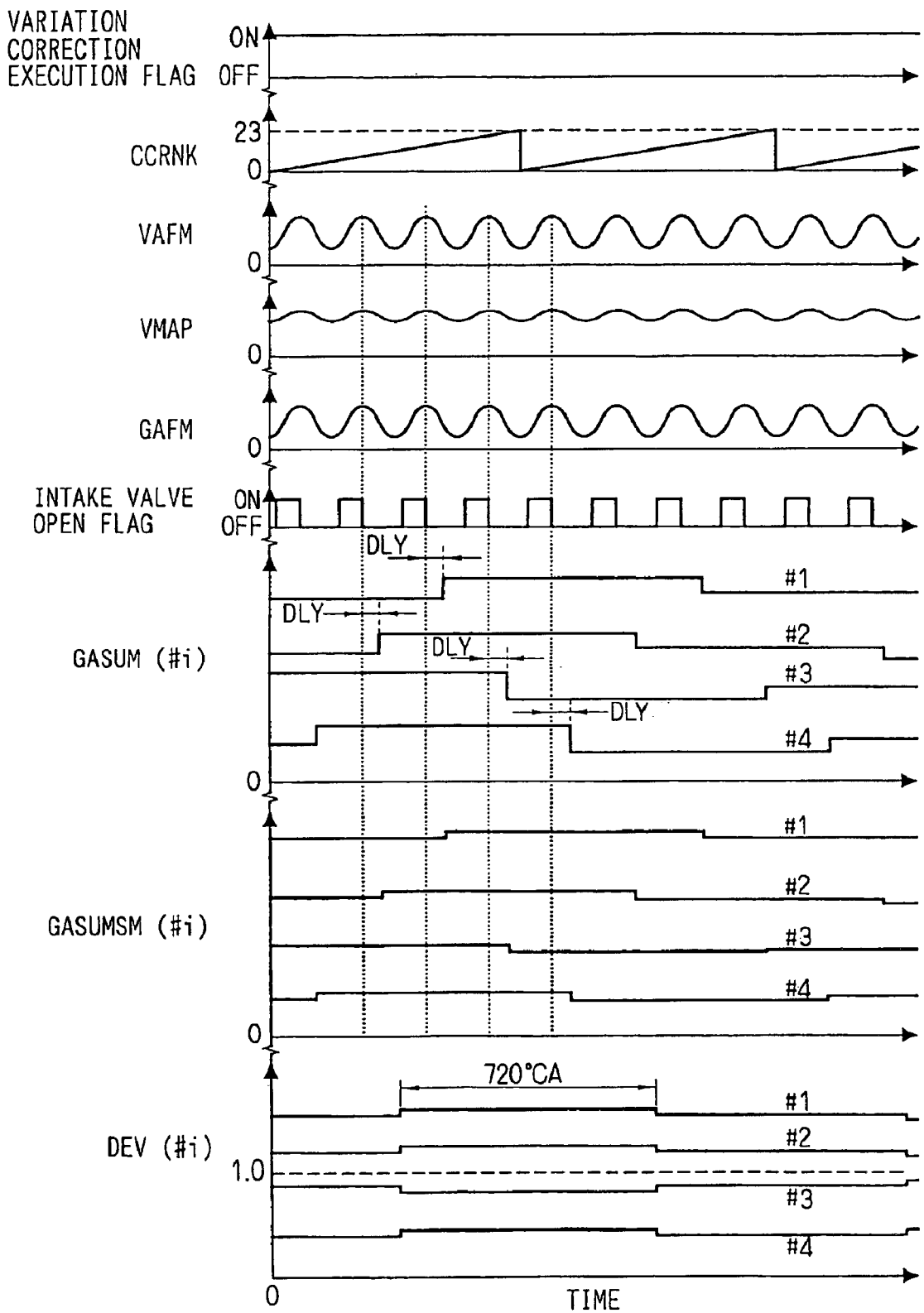
FIG. 32 is a time chart for explaining an example of processing for calculating the rate of cylinder-to-cylinder variations in intake air quantity according to the seventh embodiment.

According to the seventh embodiment, as shown in FIG. 32, the area of the intake air quantity of each cylinder GASUM (#i) is renewed every time when the detection delay DLY of the airflow meter 14 is elapsed from the timing of termination of the valve-opening period of the intake valve 28 of each cylinder 100 (timing of termination of ON period of the intake valve open flag). Other parts of processing are the same as the sixth embodiment.

In the seventh embodiment as well, the same effect as the sixth embodiment may be achieved. In addition, since the predetermined period for calculating the area of the intake air quantity of each cylinder GASUM (#i) is set to the valve-opening period of the intake valve 28, it is not necessary to set the predetermined period for each operating range in the stages of designing and developing, and thus the number of steps for adaptation may advantageously be reduced.

<<Eighth Embodiment>>

Figure 33:
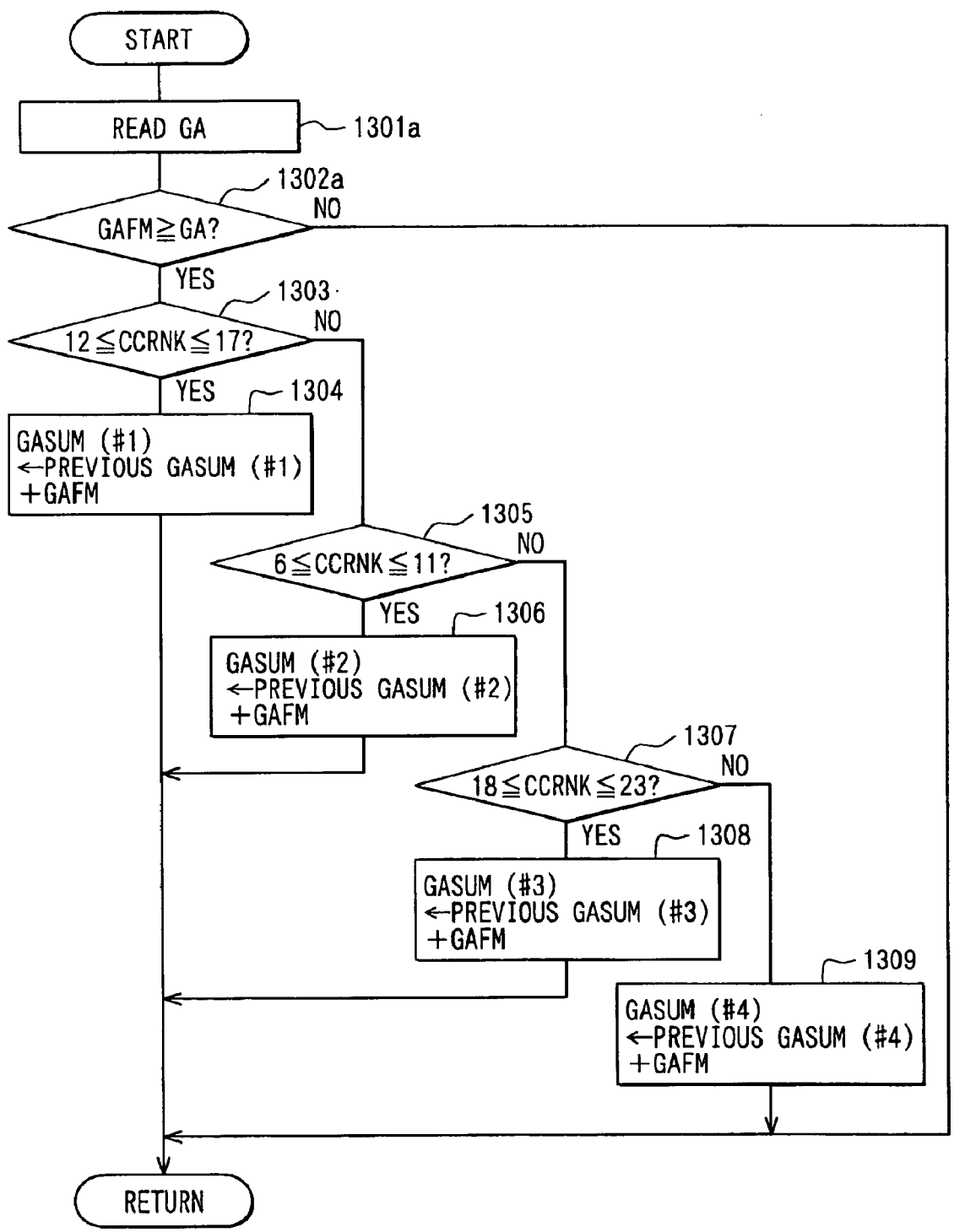
FIG. 33 is a flowchart showing a processing flow of a routine for calculating the area of the intake air quantity of each cylinder for a predetermined period according to an eighth embodiment in the present invention.
Figure 34:
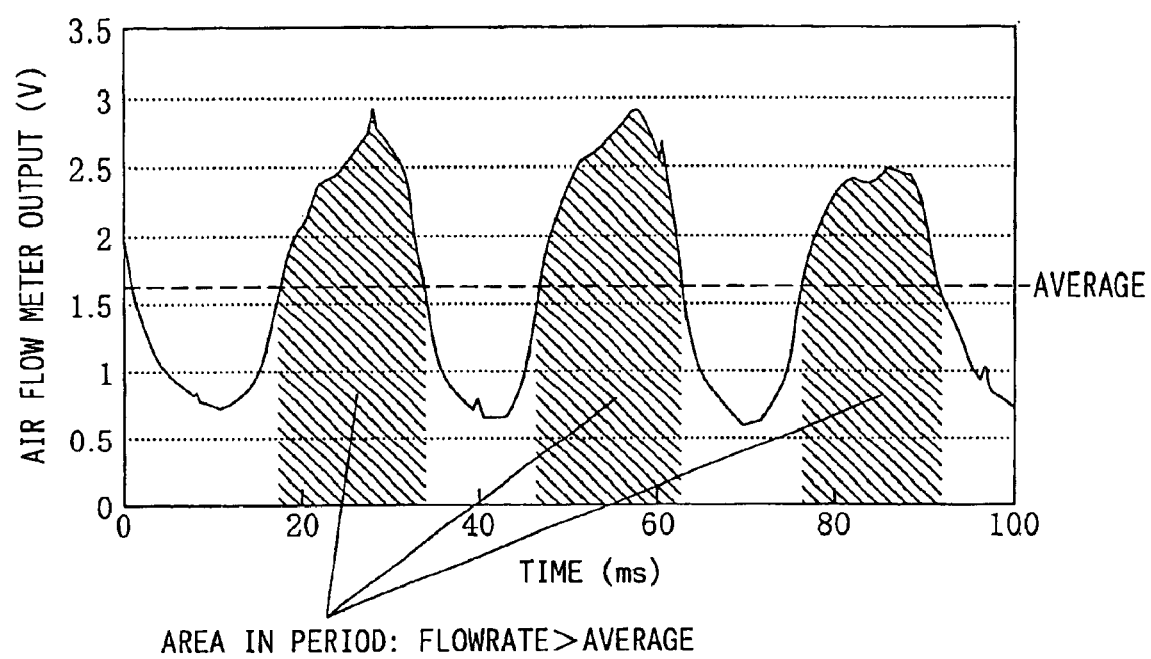
FIG. 34 is a drawing for explaining a method of calculating the area of the intake air quantity for a predetermined period according to the eighth embodiment.
Figure 35:
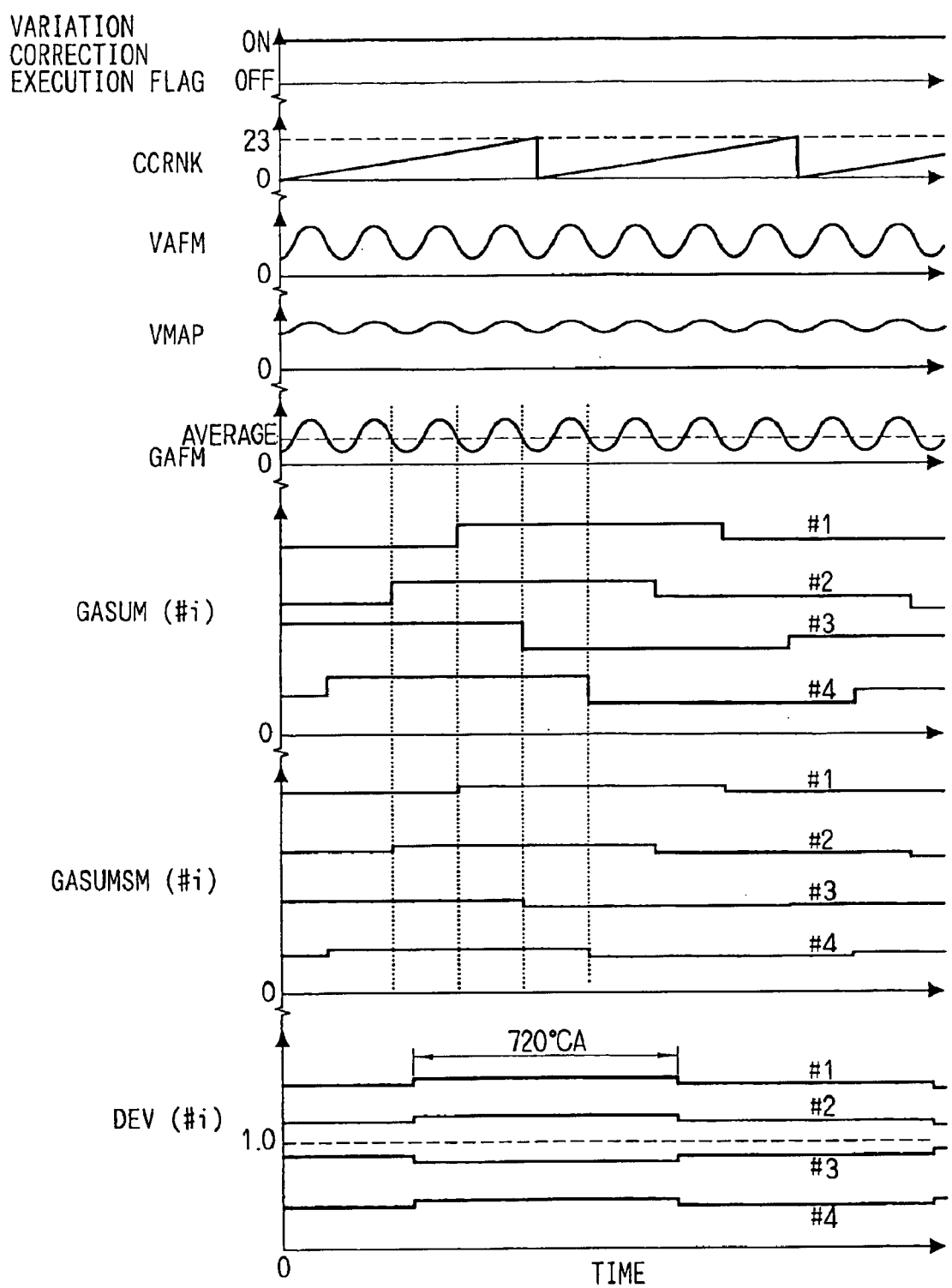
FIG. 35 is a time chart for explaining an example of processing for calculating the rate of cylinder-to-cylinder variations in intake air quantity according to the eighth embodiment.

The eighth embodiment of the present invention shown from FIG. 33 to FIG. 35 is characterized in that the predetermined period for calculation of the area of the intake air quantity GASUM (#i) is set to a period in which the instantaneous airflow rate GAFM is higher than the average value (See FIG. 34).

In the eighth embodiment, a routine shown in FIG. 33 is executed and the area of the intake air quantity for each cylinder GASUM (#i) is calculated as follows. At step 1301a, the average airflow rate GA detected by the airflow meter 14 is read. Subsequently, the procedure proceeds to step 1302a, where whether or not the instantaneous airflow rate GAFM is higher than the average airflow rate GA is determined.

If the instantaneous airflow rate GAFM is less than the average airflow rate GA, the routine is terminated without executing the subsequent processing. However, if the instantaneous airflow rate GAFM is higher than the average airflow rate GA, area of the intake air quantity for each cylinder GASUM (#i) is calculated according to the same procedure as the seventh embodiment (s 1303–1309).

According to the eighth embodiment described above, as shown in FIG. 35, the area of the intake air quantity for each cylinder GASUM (#i) is renewed every time when the period, in which the instantaneous airflow rate GAFM of each cylinder 100 is higher than the average value, terminates. Other parts of processing are the same as in the sixth embodiment.

As the eighth embodiment, the predetermined period for calculating the area of the intake air quantity GASUM (#i) is set to the period in which the instantaneous airflow rate GAFM is higher than the average value, so that it is not necessary to set the predetermined period for each operating range in the stages of designing and developing as in the seventh embodiment, and thus the work volume may advantageously be reduced.

<<Ninth Embodiment>>

Though the area of the intake air quantity of each cylinder GASUM (#i) for a predetermined period is calculated using the instantaneous airflow rate GAFM detected by the airflow meter 14 in the sixth embodiment to the eighth embodiment. While the ninth embodiment of the present invention shown in FIGS. 8, 19, 23, 24, and 36 to 38 is characterized in that the instantaneous airflow rate GMAP is calculated by the use of the instantaneous intake pipe pressure PMAP detected by the intake pipe pressure sensor 18 (detecting unit), and the area of the intake air quantity of each cylinder GASUM (#i) for a predetermined period is calculated using the instantaneous airflow rate GMAP.

During engine operation, as shown in FIG. 19, the output from the intake pipe pressure sensor 18 pulsates synchronously with the pulsation of the output (instantaneous airflow rate GAFM) from the airflow meter 14, and the output from the intake pipe pressure sensor 18 (instantaneous intake pipe pressure PMAP) becomes a substantially minimum value when the output (instantaneous airflow rate GAFM) from the airflow meter 14 becomes the maximum value.

The instantaneous intake pipe pressure PMAP detected by the intake pipe pressure sensor 18 can be converted into the instantaneous airflow rate GMAP by the following nozzle equation.

Equation for Calculating Instantaneous Airflow Rate GMAP (Equation 3, nozzle equation) (3)

$$GMAP = \mu \cdot Av \sqrt{\frac{2k}{k-1} \rho \cdot Pa \left\{ \left(\frac{PMAP}{Pa}\right)^{\frac{2}{k}} - \left(\frac{PMAP}{Pa}\right)^{\frac{k-1}{k}} \right\}}$$

Av: intake valve opening area
κ: ratio of specific heat
ρ: gas density
μ: flow rate coefficient
Pa: ambient pressure Therefore, by converting the output from the intake pipe pressure sensor 18 (instantaneous intake pipe pressure PMAP) into the instantaneous airflow rate GMAP using the nozzle equation shown above, the area of the intake air quantity of each cylinder GASUM (#i) for a predetermined period may be calculated in almost the same approach as the sixth to eighth embodiments.

Figure 36:
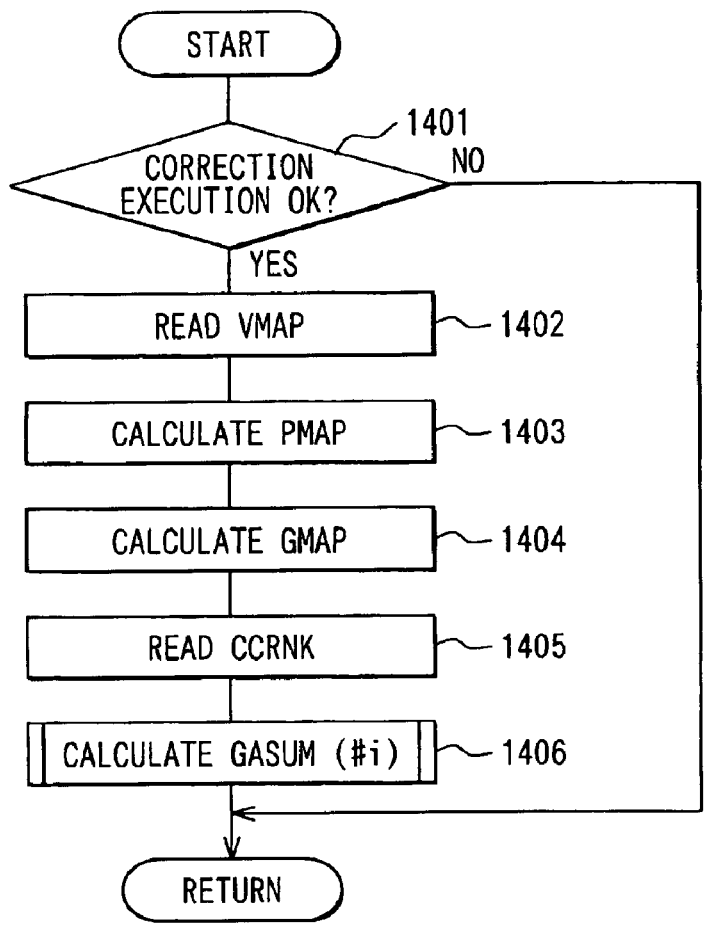
FIG. 36 is a flowchart showing a processing flow of a main routine for calculating the area of the intake air quantity according to a ninth embodiment in the present invention.
Figure 37:
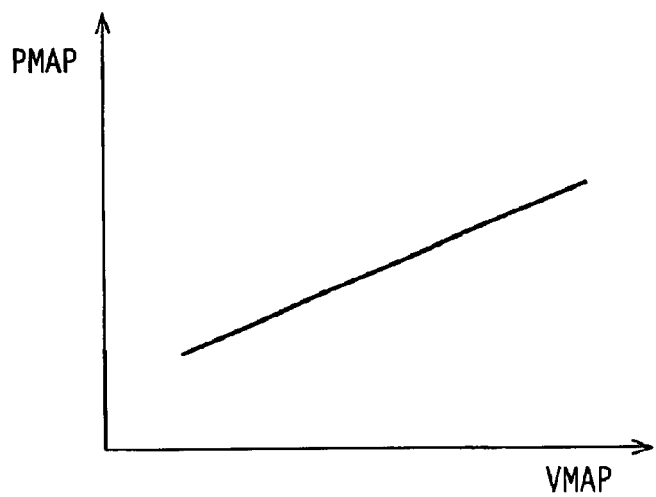
FIG. 37 is a conceptual diagram showing a map for converting an output voltage from the intake pipe pressure sensor VMAP into an instantaneous intake pipe pressure PMAP.

In the ninth embodiment, in order to calculate the area of the intake air quantity of each cylinder GASUM (#i) for a predetermined period from the output from the intake pipe pressure sensor 18, the main routine for calculating the area of the intake air quantity shown in FIG. 36 is executed at timings of A/D conversions of the output from the intake pipe pressure sensor 18 (for example at cycles of 4 ms). When the routine is activated, whether or not the same condition to execute cylinder-to-cylinder variation correction as Step 401 in FIG. 8 is met is determined at step 1401 (refer to the two conditions 1, 2 in the sixth embodiment). When the condition to execute cylinder-to-cylinder variation correction is not met, the routine is terminated without executing the processing relating to calculation of the area of the intake air quantity for a predetermined period from Step 1402 on.

On the other hand, when it is determined that the condition to execute cylinder-to-cylinder variation correction is met at step 1401, the processing relating calculation of the area of the intake air quantity for a predetermined period from Step 1402 on is executed as follows. At step 1402, the output voltage VMAP after filtering from the intake pipe pressure sensor 18 is read, the procedure proceeds to step 1403, where the output voltage VMAP from the intake pipe pressure sensor 18 is converted into the instantaneous intake pipe pressure PMAP of the periphery of the intake pipe pressure sensor 18 using the map of the instantaneous intake pipe pressure PMAP in FIG. 37.

Subsequently, the procedure proceeds to step 1404, where the instantaneous intake pipe pressure PMAP is converted into the instantaneous airflow rate GMAP passing through the intake pipe pressure sensor 18 using Equation 3 shown above. After the counted value of the crankshaft angle counter CCRNK is read in the next Step 1405, the procedures proceeds to step 1406, where the routine for calculating the area of the intake air quantity of each cylinder 100 for a predetermined period shown in FIG. 24 is executed to calculate the area of the intake air quantity of each cylinder GASUM (#i) for a predetermined period in the following manner.

Figure 38:
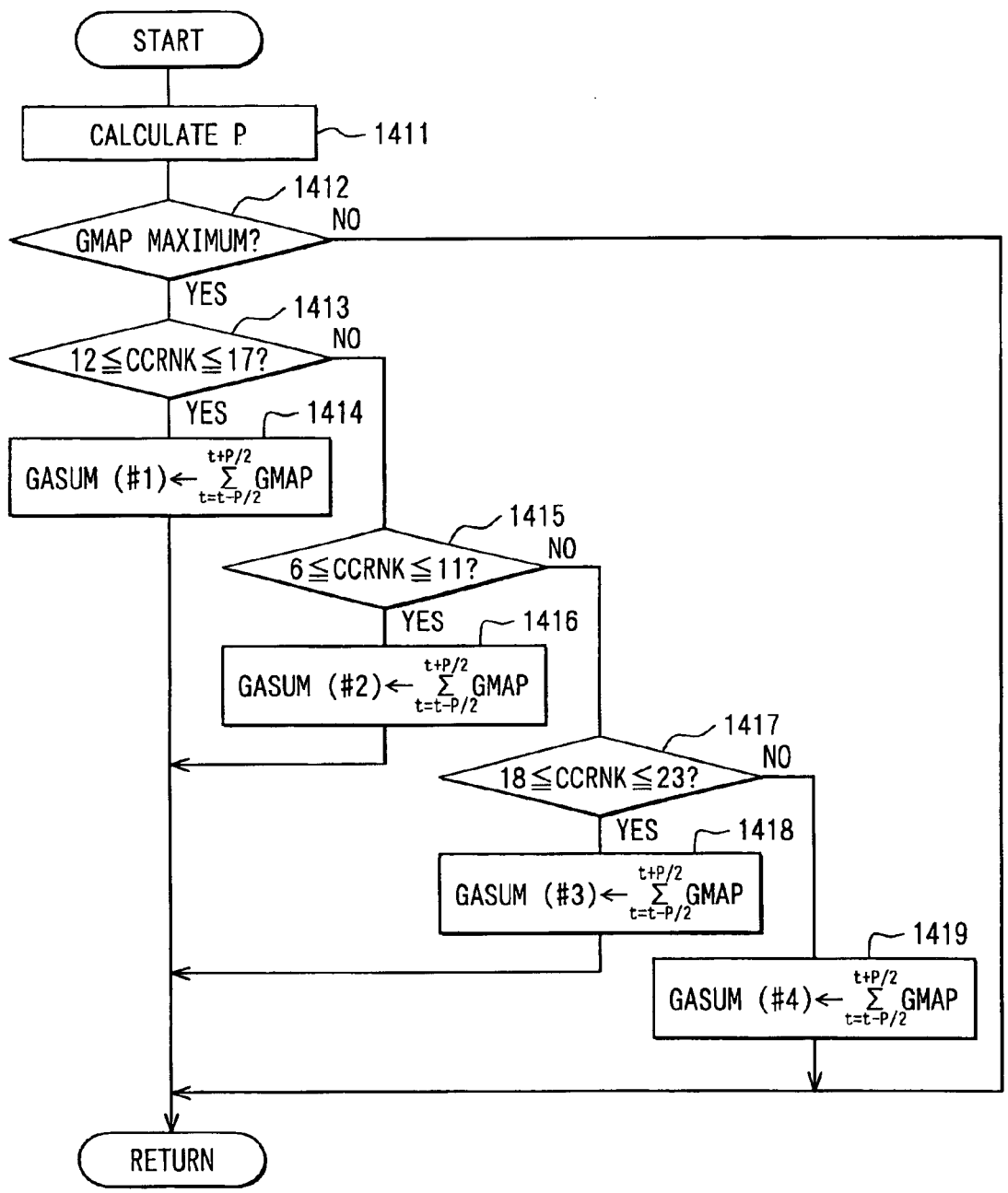
FIG. 38 is a flowchart showing a processing flow of a routine for calculating the area of the intake air quantity of each cylinder for a predetermined period according to the ninth embodiment.

As shown in FIG. 38, at step 1411, the predetermined period P for calculation of the area of the intake air quantity of each cylinder 100 (area of the instantaneous airflow rate GMAP) is calculated using the map in FIG. 23. Here, the predetermined period P is set to a period in which the intake air quantity is hardly subjected to the influence of the reflected wave from the intake air pulsation or the air intake interference of other cylinders. More specifically, it is determined to a period including the maximum value of the instantaneous airflow rate GMAP (the minimum value of the instantaneous intake pipe pressure PMAP) converted from the output from the intake pipe pressure sensor 18 (instantaneous intake pipe pressure PMAP).

In the next Step 1412, whether or not the instantaneous airflow rate GMAP converted from the instantaneous intake pipe pressure PMAP is the maximum value is determined. The maximum value may be determined by whether or not the direction of change of the instantaneous airflow rate GMAP is inverted from increase to decrease, for example, by comparing the current value of the instantaneous airflow rate GMAP with the previous value thereof.

When the instantaneous airflow rate GMAP is not the maximum value at step 1412, the routine is terminated without executing the subsequent steps. Thereafter, at the moment when the instantaneous airflow rate GMAP reached the maximum value, the procedure proceeds to step 1413, where whether the counted value of the crankshaft angle counter is CCRNK=12–17 (that is, the period corresponding to the intake stroke of the first cylinder #1) is determined. If CCRNK=12–17, the procedure proceeds to step 1414, where the instantaneous airflow rate GMAP for the predetermined period P of the intake stroke of the first cylinder #1 (the period within P/2 before and P/2 after the time point t at which the value becomes the maximum value) is integrated to obtain the area of the intake air quantity of the first cylinder GASUM (#1).

When it is determined to be "No" at step 1413, and the counted value of the crankshaft angle counter is determined to be CCRNK=6–11 (that is, the period corresponding to the intake stroke of the second cylinder #2) at step 1415, the procedure proceeds to step 1416, where the instantaneous airflow rate GMAP for the predetermined period P of the intake stroke of the second cylinder #2 is integrated to obtain the area of the intake air quantity of the second cylinder GASUM (#2).

When it is determined to be "No" at steps 1413 and 1415, and the counted value of the crankshaft angle counter is determined to be CCRNK=18–23 (that is, the period corresponding to the intake stroke of the third cylinder #3), the procedure proceeds to step 1418, where the instantaneous airflow rate GMAP for the predetermined period P of the intake stroke of the third cylinder #3 is integrated to obtain the area of intake air quantity of the third cylinder GASUM (#3).

When it is determined to be "No" in all Steps 1413, 1415, and 1417, that is, the counted value of the crankshaft angle counter is determined to be CCRNK=0–5 (that is, the period corresponding to the intake stroke of the fourth cylinder #4), the procedure proceeds to step 1419, where the instantaneous airflow rate GMAP for the predetermined period P of the intake stroke of the fourth cylinder #4 is integrated to obtain the area of the intake air quantity of the fourth cylinder GASUM (#4). Other parts of the processing are the same as the sixth embodiment.

In the ninth embodiment described above, the same effect as the sixth embodiment can be achieved.

<<Tenth Embodiment>>

In the ninth embodiment, the predetermined period P for calculation of the area of the intake air quantity GASUM (#i) is set to a period including the maximum value of the instantaneous airflow rate GMAP (the minimum value of the instantaneous intake pipe pressure PMAP). However, in the tenth embodiment of the present invention shown in FIG. 39, the predetermined period for calculation of the area of the intake air quantity GASUM (#i) is set to a period, which is delayed with respect to the valve-opening period of the intake valve 28 by the detection delay DLY of the intake pipe pressure sensor, similarly to the case of the seventh embodiment.

Figure 39:
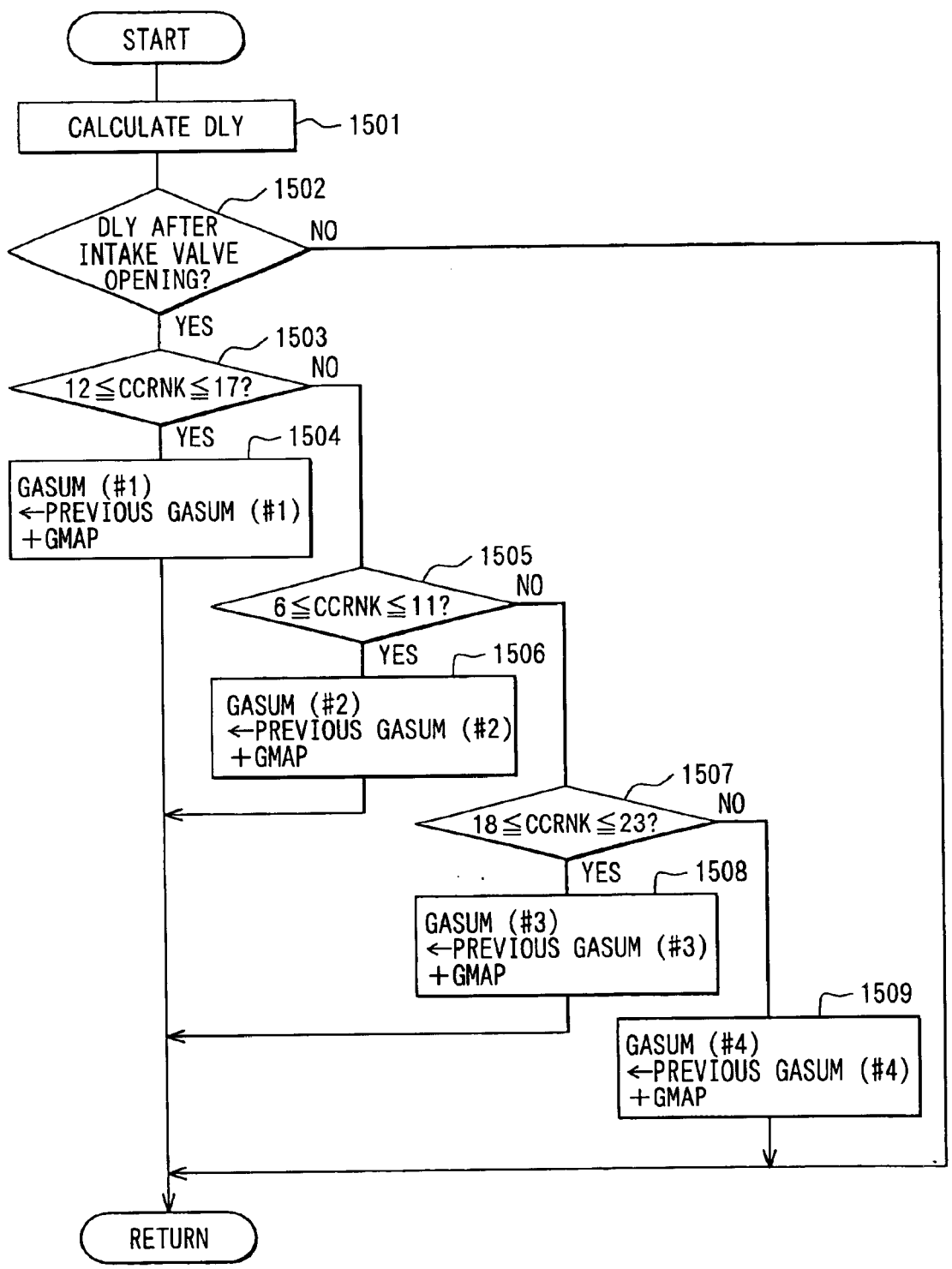
FIG. 39 is a flowchart showing a processing flow of a routine for calculating the area of the intake air quantity of each cylinder for a predetermined period according to a tenth embodiment in the present invention.

In the tenth embodiment, a routine shown in FIG. 39 is executed and the area of the intake air quantity for each cylinder GASUM (#i) is calculated as follows. In the first place, the detection delay DLY of the intake pipe pressure sensor 18 according to the current lift amount of the intake valve VVL and the number of engine revolution NE step 1501 is calculated using the map similar to the map in FIG. 30 at step 1501.

Then the procedure proceeds to step 1502, where whether or not it corresponds to the period of the detection delay DLY of the intake pipe pressure sensor 18 with respect to the valve-opening period of the intake valve 28 is determined. If it does not correspond to the period of detection delay DLY of the intake pipe pressure sensor 18 with respect to the valve-opening period of the intake valve 28, the routine is terminated without executing the subsequent processing.

Then when it reaches the period corresponding to the period of detection delay DLY of the intake pipe pressure sensor 18 with respect to the opening-period of the intake valve 28, the procedure proceeds to step 1503, where whether or not the counted value of the crankshaft angle counter is CCRNK=12–17 (that is, the period corresponding to the intake stroke of the first cylinder #1) is determined. If CCRNK=12–17, the procedure proceeds to step 1504, where the stored value of the area of the intake air quantity of the first cylinder GASUM (#1) until the previous time is integrated by the current instantaneous airflow rate GMAP to renew the stored value of the GASUM (#1).

When it is determined to be "No" at step 1503, and the counted value of the crankshaft angle counter is determined to be CCRNK=6–11 at step 1505 (the period corresponding to the intake stroke of the second cylinder #2), the procedure proceeds to step 1506, where the stored value of the area of the intake air quantity of the second cylinder GASUM (#2) until the previous time is integrated by the current instantaneous airflow rate GMAP to renew the stored value of the GASM (#2).

When it is determined to be "No" at steps 1503 and 1505 and the counted value of the crankshaft angle counter is determined to be CCRNK=18–23 at step S1507 (the period corresponding to the intake stroke of the third cylinder #3), the procedure proceeds to step S1508, where the stored value of the area of the intake air quantity of the third cylinder GASUM (#3) until the previous time is integrated by the current instantaneous airflow rate GMAP to renew the stored value of the GASM (#3).

When it is determined to be "No" in all Steps 1503, 1505, and 1507, that is, when the counted value of the crankshaft angle counter is CCRNK=0–5 (the period corresponding to the intake stroke of the fourth cylinder #4), the procedure proceeds to step 1509, where the stored value of the area of the intake air quantity of the fourth cylinder GASUM (#4) until the previous time is integrated by the current instantaneous airflow rate GMAP to renew the stored value of the GASUM (#4).

According to the tenth embodiment described above, the same effect as in the seventh embodiment can be achieved.

<<Eleventh Embodiment>>

Figure 40:
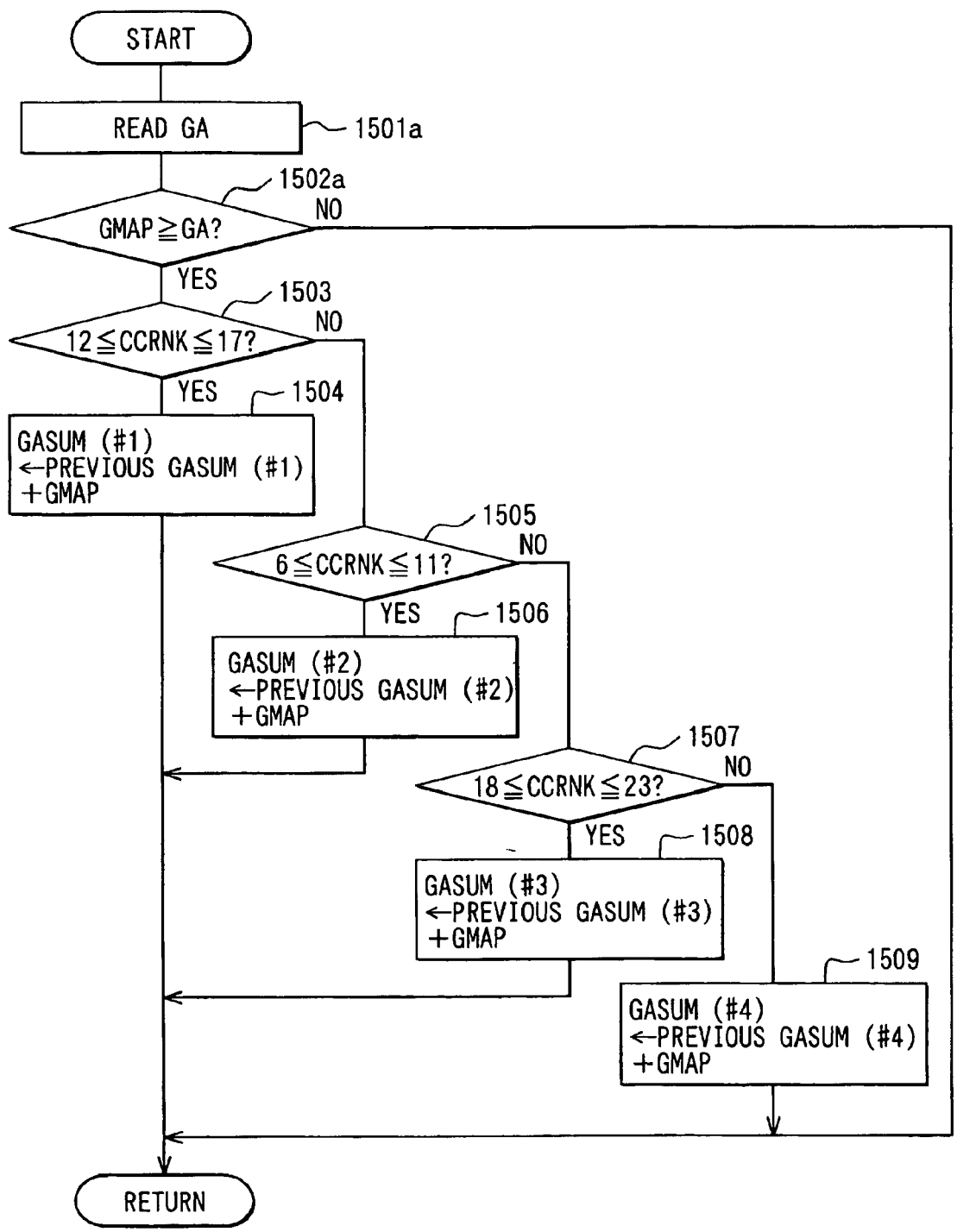
FIG. 40 is a flowchart showing a processing flow of a routine for calculating the area of the intake air quantity of each cylinder for a predetermined period according to an eleventh embodiment in the present invention.

The eleventh embodiment of the present invention, shown in FIG. 40, is characterized in that a predetermined period for calculation of the area of the intake air quantity GASUM (#i) is set to the period in which the instantaneous airflow rate GMAP is higher than the average value as in the eighth embodiment.

In the eleventh embodiment, a routine in FIG. 40 is executed and the area of the intake air quantity for each cylinder GASUM (#i) is calculated as follows. At step 1501a, the average airflow rate GA detected by the airflow meter 14 is read. Subsequently, the procedure proceeds to step 1502a, whether or not the instantaneous airflow rate GMAP calculated from the instantaneous intake pipe pressure PMAP is higher than the average airflow rate GA is determined.

When the instantaneous airflow rate GMAP is less than the average airflow rate GA, the routine is terminated without executing the subsequent processing. However, when the instantaneous airflow rate GMAP is higher than the average airflow rate GA, the area of the intake air quantity GASUM of each cylinder is calculated according to the same processing (s 1503–1509) as in the tenth embodiment. Other parts of processing are the same as the sixth embodiment.

In the eleventh embodiment described above as well, the same effect as the eighth embodiment may be achieved.

In the above-described ninth to eleventh embodiments, the output from the intake pipe pressure sensor 18 (the instantaneous intake pipe pressure PMAP) is converted to the instantaneous airflow rate GMAP to calculate the area of the intake air quantity of each cylinder GASUM (#i) for a predetermined period, and then the rate of cylinder-to-cylinder variations in intake air quantity of each cylinder DEV (#i) is calculated from the area of the intake air quantity of each cylinder GASUM (#i). However it is also possible to integrate the output (the instantaneous intake pipe pressure PMAP) from the intake pipe pressure sensor 18 for a predetermined period to obtain the area of the intake pipe pressure of each cylinder 100 for a predetermined period, and then calculate the rate of cylinder-to-cylinder variations in intake air quantity of each cylinder DEV (#i) from the area of the intake pipe pressure area of each cylinder.

<<Twelfth Embodiment>>

In the twelfth embodiment of the present invention shown from FIGS. 41 to 47, focusing on the characteristic that the in-cylinder pressure increases with increase in intake air quantity taken into the cylinder. Therefore, the in-cylinder pressure of each cylinder 100 is detected and the area of the detected waveform of the in-cylinder pressure for a predetermined period is obtained. In order to achieve this process, in the twelfth embodiment, an in-cylinder pressure sensor 21a (detecting unit) for detecting the in-cylinder pressure is provided for each cylinder, as same as the fifth embodiment as described above.

Figure 45:
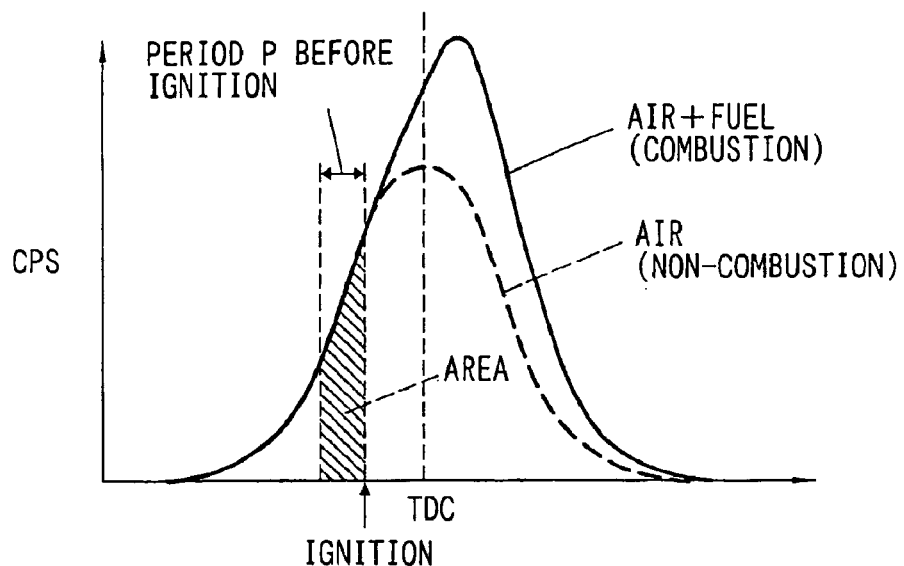
FIG. 45 is a time chart showing an in-cylinder pressure waveform in combustion.

Generally, the waveform of the in-cylinder pressure is, as shown in FIG. 45, such that the in-cylinder pressure increases with compression of the air filled in the cylinder 100 before ignition, however, after ignition, since the in-cylinder pressure is suddenly increased by the combustion pressure, the maximum value (peak value) of the in-cylinder pressure after ignition is significantly larger than the pressure when the cylinder 100 is simply filled with air. In addition, even when the quantity of air filled in the cylinder 100 is the same, the maximum value of the in-cylinder pressure after ignition moves upward and downward according to the fuel quantity or the combustion state. Therefore, it is difficult to estimate the quantity of air filled in the cylinder 100 from the maximum value of the in-cylinder pressure after ignition.

Figure 46:
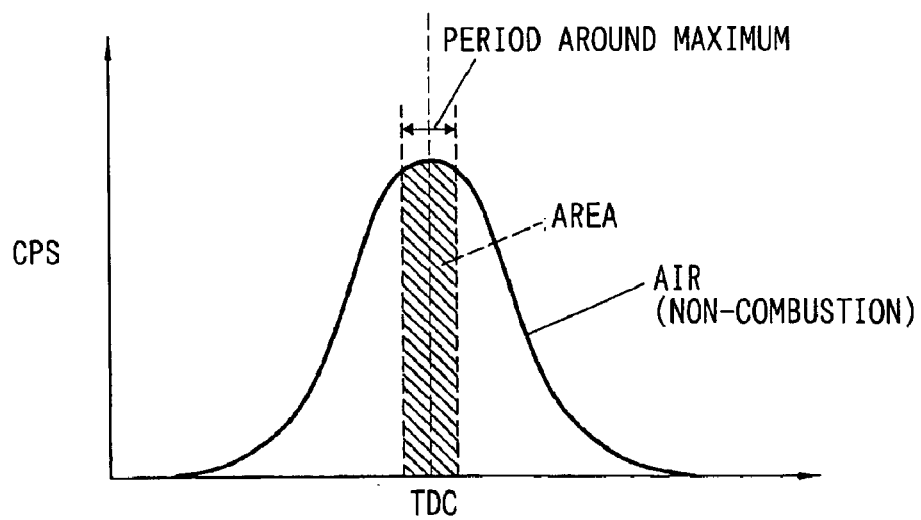
FIG. 46 is a time chart showing the in-cylinder pressure waveform in non-combustion.

In the twelfth embodiment, the predetermined period for calculation of the area of the detected waveform of the in-cylinder pressure is set to the timing before ignition. However, as shown in FIG. 46, during the fuel-cut operation or the cranking operation (when no-combustion), non-combustion is occurred in the cylinder. Therefore, since the maximum value of the in-cylinder pressure is the maximum compressed pressure of the air filled in the cylinder, the area of the detected waveform of the in-cylinder pressure is calculated in the period including the maximum value of the in-cylinder pressure (the period before and after the compression TDC).

Figure 41:
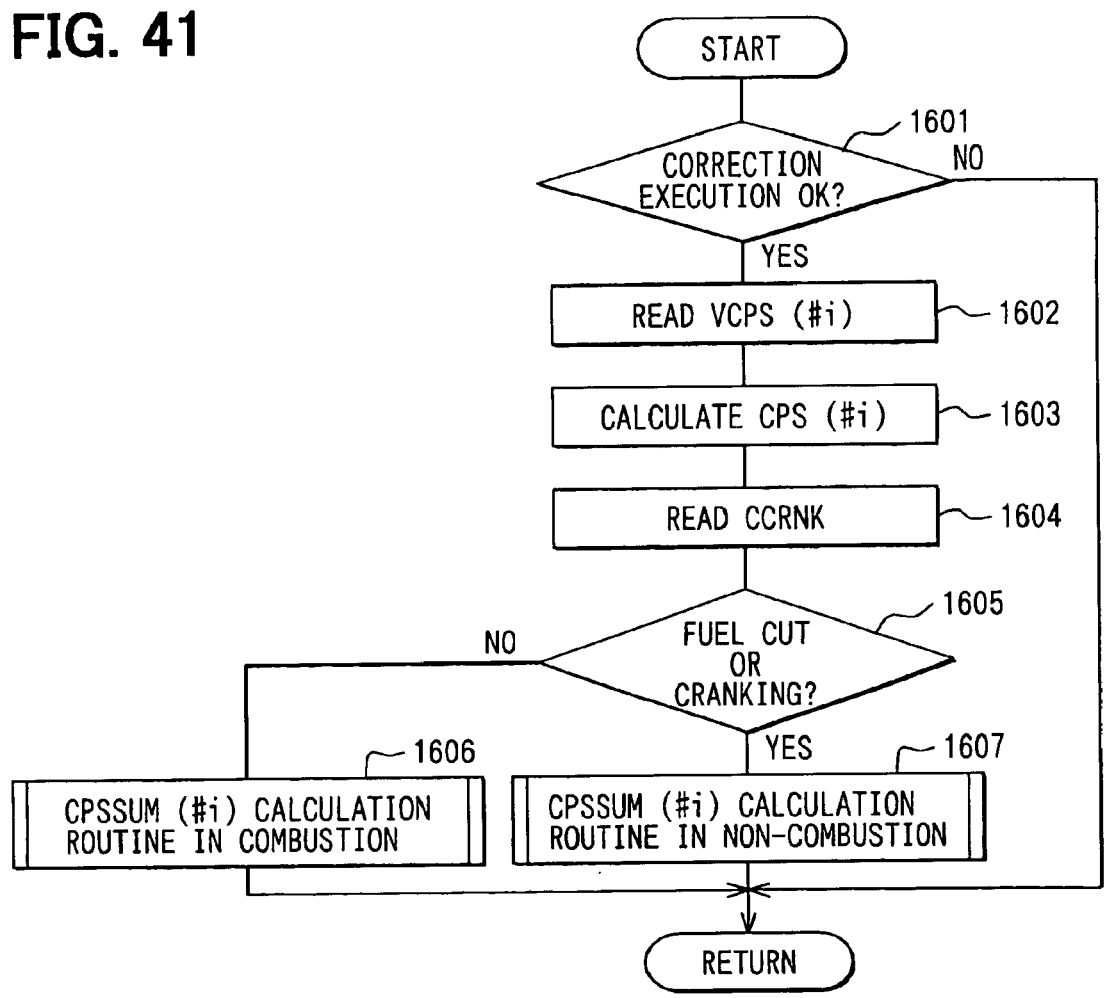
FIG. 41 is a flowchart showing a processing flow of a main routine for calculating the area of the in-cylinder pressure according to a twelfth embodiment in the present invention.
Figure 42:
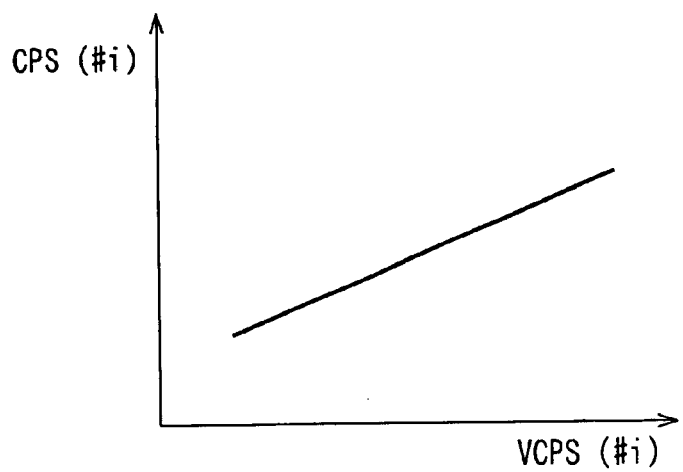
FIG. 42 is a conceptual diagram showing a map for converting an output voltage from an in-cylinder pressure sensor VCPS (#i) to an in-cylinder pressure CPS (#i)

In the twelfth embodiment, the main routine for calculating the area of the in-cylinder pressure shown in FIG. 41 is executed at timings of A/D conversions (for example at cycles of 4 ms) of the in-cylinder pressure sensor 21a. When this routine is activated, whether or not the condition to execute cylinder-to-cylinder variation correction as at step 401 in FIG. 8 is met is determined at step 1601 (refer to the two conditions 1, 2 in the sixth embodiment). If the condition to execute cylinder-to-cylinder variation correction is not met, the routine is terminated without executing the processing relating to the calculation of the area of the in-cylinder pressure for a predetermined period from Step 1602 on.

On the other hand, when it is determined that the condition to execute cylinder-to-cylinder variation correction is met at step 1601, the processing relating to calculation of the area of the in-cylinder pressure for a predetermined period from Step 1602 on is executed in the following manner. The output voltage VCPS (#i) from the in-cylinder pressure sensor 21a of each cylinder 100 after filtering is read at step 1602. Subsequently, the procedure proceeds to step 1603, where the output voltage VCPS (#i) from the in-cylinder pressure sensor 21a is converted into the in-cylinder pressure CPS (#i) using a map shown in FIG. 42.

Subsequently, the procedure proceeds to step 1604, where the counted value of the crankshaft angle counter CCRNK is read. In next Step 1605, whether or not it is in the fuel cut operation or in the cranking operation (non-combustion) is determined. If it is not in the fuel-cut operation or in the cranking operation, the procedure proceeds to step 1606, where a routine for calculating the area of the in-cylinder pressure of each cylinder 100 for a predetermined period during combustion is executed. The routine will be described later referring to FIG. 43. On the other hand, when it is in the fuel-cut operation or the cranking operation, the procedure proceeds to step 1607, and the routine for calculating the area of the in-cylinder pressure of each cylinder 100 for a predetermined period during non-combustion is executed. The routine will be described later referring to FIG. 44.

Figure 43:
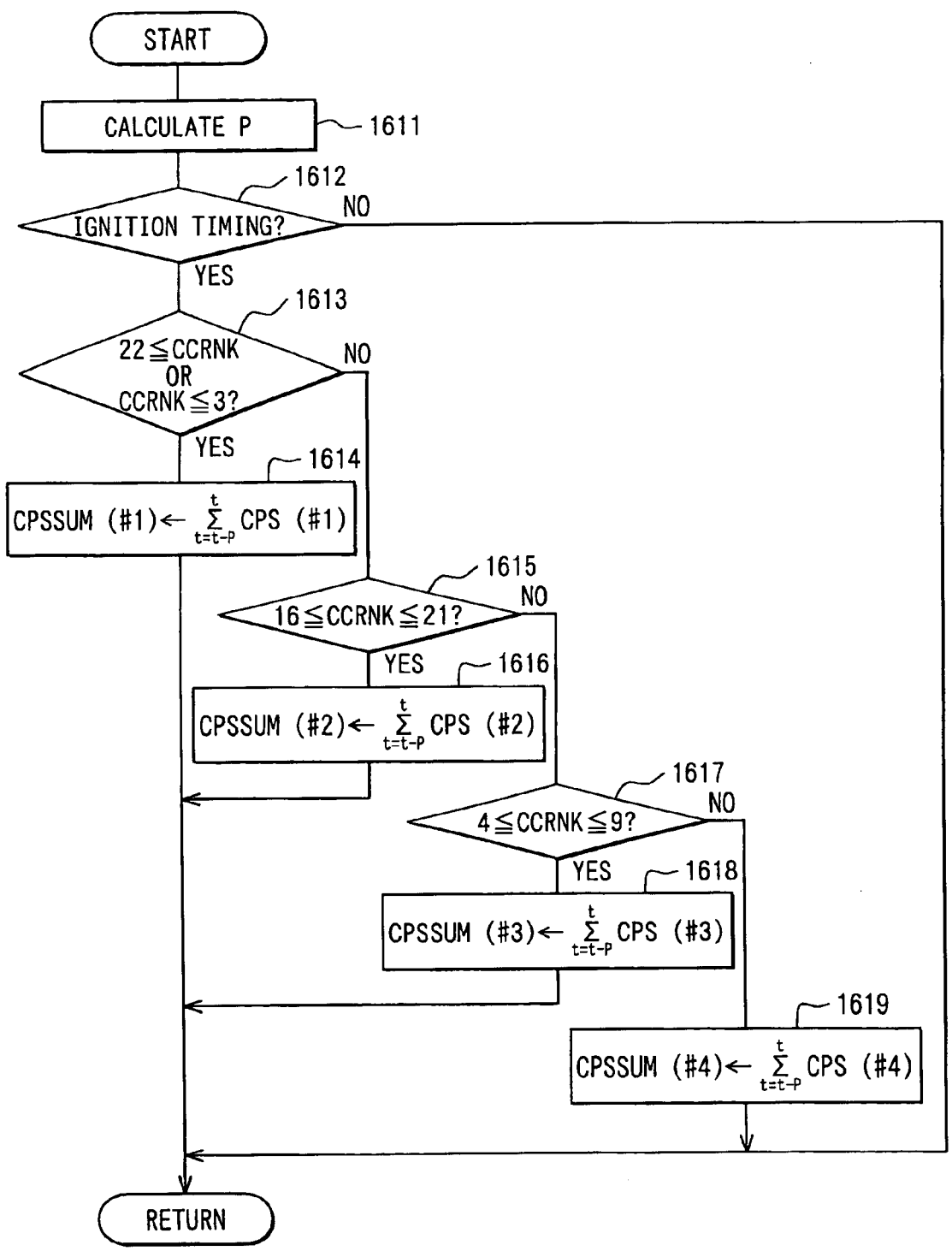
FIG. 43 is a flowchart showing a processing flow of a routine for calculating the area of the in-cylinder pressure of each cylinder for a predetermined period in combustion according to the twelfth embodiment.
Figure 44:
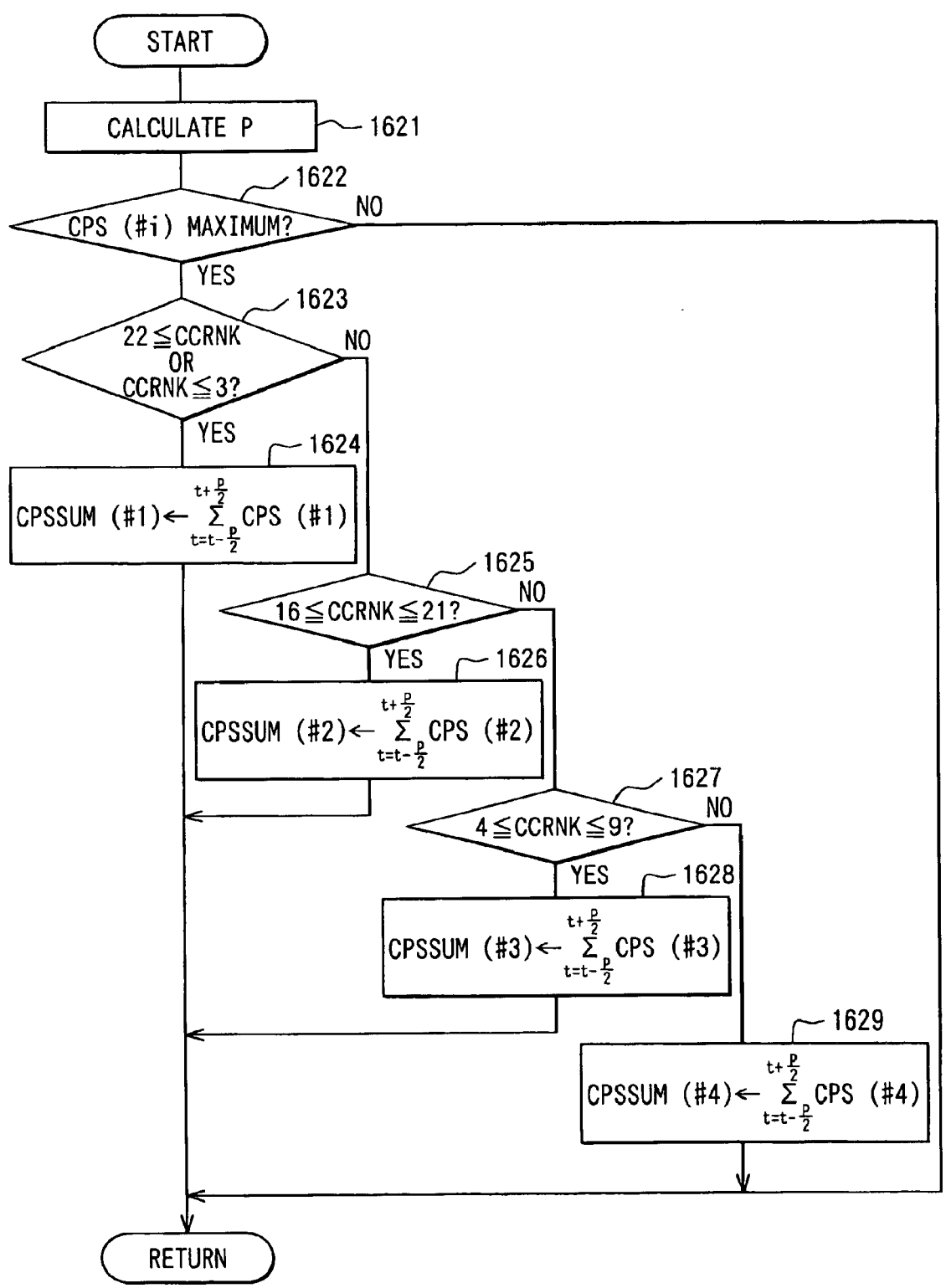
FIG. 44 is a flowchart showing a processing flow of a routine for calculating the area of the in-cylinder pressure of each cylinder for a predetermined period during non-combustion according to the twelfth embodiment.

When the routine for calculating the area of the in-cylinder pressure of each cylinder 100 for a predetermined period during combustion is activated at step 1606, a predetermined period P is calculated at step 1611 for calculation of the area of the in-cylinder pressure of each cylinder, as shown in FIG. 43. During combustion, as shown in FIG. 45, the predetermined period P is set to the timing before ignition. The length of the predetermined period P is calculated by a map or the like according to the number of engine revolution NE and the intake air quantity GA. In this case, it is set such that the predetermined period P increases as the amplitude of the pulsation wave increases, in the region in which the number of engine revolution NE is low or in the region in which the intake air quantity GA is high.

In next Step 1612, whether or not it is an ignition timing is determined. If it is not the ignition timing, the routine is terminated without executing the subsequent procedure. Subsequently, when it becomes the ignition timing, the procedure proceeds to step 1613, where whether or not the counted value of the crankshaft angle counter is 22≦CCRNK or CCRNK≦3 (that is, the period within 90° CA before and 90° CA after the compression TDC of the first cylinder #1) is determined. If the determination is positive at step 1613, the procedure proceeds to step 1614, where the stored data of the in-cylinder pressure CPS (#1) of the first cylinder #1 for the predetermined period P before ignition of the first cylinder #1 is integrated to obtain the area of the in-cylinder pressure of the first cylinder CPSSUM (#1). The data on the in-cylinder pressure of each cylinder CPS (#i) is stored cylinder-by-cylinder in the RAM of the ECU 27 in every predetermined sampling cycles in time sequence. Then the stored data of the in-cylinder pressure of each cylinder CPS (#i) for the predetermined period P before ignition of each cylinder 100 is integrated to obtain the area of the in-cylinder pressure CPSSUM (#i) of each cylinder, and then the stored data of the in-cylinder pressure of each cylinder CPS (#i) is cleared.

When it is determined to be "No" at step 1613 and the counted value of the crankshaft angle counter is determined to be CCRNK=16–21 (that is, the period within 90° CA before and 90° CA after the compression TDC of the second cylinder #2) at step 1615, the procedure proceeds to step 1616, where the in-cylinder pressure of the second cylinder #2 for the predetermined period P before ignition of the second cylinder #2 CPS (#2) is integrated to obtain the area of the in-cylinder pressure of the second cylinder CPSSUM (#2).

When it is determined to be "No" at steps 1613, 1615 and the counted value of the crankshaft angle counter is determined to be CCRNK=4–9 (that is, the period within 90° CA before and 90° CA after the compression TDC of the third cylinder #3), the procedure proceeds to step 1618, where the in-cylinder pressure of the third cylinder #3 CPS (#3) for the predetermined period P before ignition of the third cylinder #3 is integrated to obtain the area of the in-cylinder pressure of the third cylinder CPSSUM (#3).

When it is determined to be "No" in all Steps 1613, 1615, and 1617, that is, when the counted value of the crankshaft angle counter is determined to be CCRNK=10–15 (that is, the period within 90° CA before and 90° CA after the compression TDC of the fourth cylinder #4), the procedure proceeds to step 1619, where the in-cylinder pressure of the fourth cylinder #4 CPS (#4) for the predetermined period P before ignition of the fourth cylinder #4 is integrated to obtain the area of the in-cylinder pressure of the fourth cylinder CPSSUM (#4).

On the other hand, a routine for calculating the area of in-cylinder pressure of each cylinder 100 for a predetermined period during non-combustion (FIG. 44) is started at step 1607 in FIG. 41, so that a predetermined period P for calculation of the area of the in-cylinder pressure of each cylinder 100 in non-combustion (during fuel-cut operation or cranking operation) is calculated at step 1621. When combustion is stopped, as shown in FIG. 46, the predetermined period P is set to a period including the maximum value. The length of the predetermined period P is calculated by a map or the like according to the number of engine revolution NE and the intake air quantity GA. In this case, it is set such that the predetermined period P increases as the amplitude of the pulsation wave increases in the region in which the number of engine revolution NE is low or in the region in which the intake air quantity GA is high.

In next Step 1622, whether or not the in-cylinder pressure CPS (#i) detected by the in-cylinder pressure sensor 21a is the maximum value is determined. The method of determining the maximum value is such that the current value of the in-cylinder pressure CPS (#i) is compared with the previous value, and whether or not the direction of change of the in-cylinder pressure CPS (#i) is inverted from increase to decrease is determined.

When the in-cylinder pressure CPS (#i) is not the maximum value, the routine is terminated without executing the subsequent procedure. Subsequently, when the in-cylinder pressure CPS (#i) is reached at its maximum value, the procedure proceeds to step 1623, where whether or not the counted value of the crankshaft angle counter is determined to be 22≦CCRNK or CCRNK≦3 (that is, the period within 90° CA before and 90° CA after the compression TDC of the first cylinder #1) is determined. If the determination is positive at step 1623, the procedure proceeds to step 1624, where the in-cylinder pressure CPS (#1) of the first cylinder #1 is integrated for the predetermined period P within 90° CA before and 90° CA after the compression TDC of the first cylinder #1 (that is, the period within P/2 before and P/2 after the timing t at which the maximum value exists) to obtain the area of the in-cylinder pressure of the first cylinder CPSSUM (#1).

When it is determined to be "No" at step 1623 and the counted value of the crankshaft angle counter is determined to be CCRNK=16–21 (that is, the period within 90° CA before and 90° CA after the compression TDC of the second cylinder #2) at step 1625, the procedure proceeds to the step 1626, where the in-cylinder pressure CPS (#2) for the predetermined period P around the compression TDC of the second cylinder #2 is integrated to obtain the area of the in-cylinder pressure of the second cylinder CPSSUM (#2).

When it is determined to be "No" at steps 1623, 1625 and the counted value of the crankshaft angle counter is determined to be CCRNK=4–9 (that is, the period within 90° CA before and 90° CA after the compression TDC of the third cylinder #3) at step 1627, the procedure proceeds to step 1628, where the in-cylinder pressure CPS (#3) for the predetermined period P around the compression TDC of the third cylinder #3 is integrated to obtain the area of the in-cylinder pressure of the third cylinder CPSSUM (#3).

When it is determined to be "No" in all Steps 1623, 1625, and 1627, that is, when the counted value of the crankshaft angle counter is CCRNK=10–15 (that is, the period within 90° CA before and 90° CA after the compression TDC of the fourth cylinder #4), the procedure proceeds to step 1629, where the in-cylinder pressure CPS (#4) for the predetermined period P around the compression TDC of the fourth cylinder #4 is integrated to obtain the area of the in-cylinder pressure of the fourth cylinder CPSSUM (#4).

Figure 47:
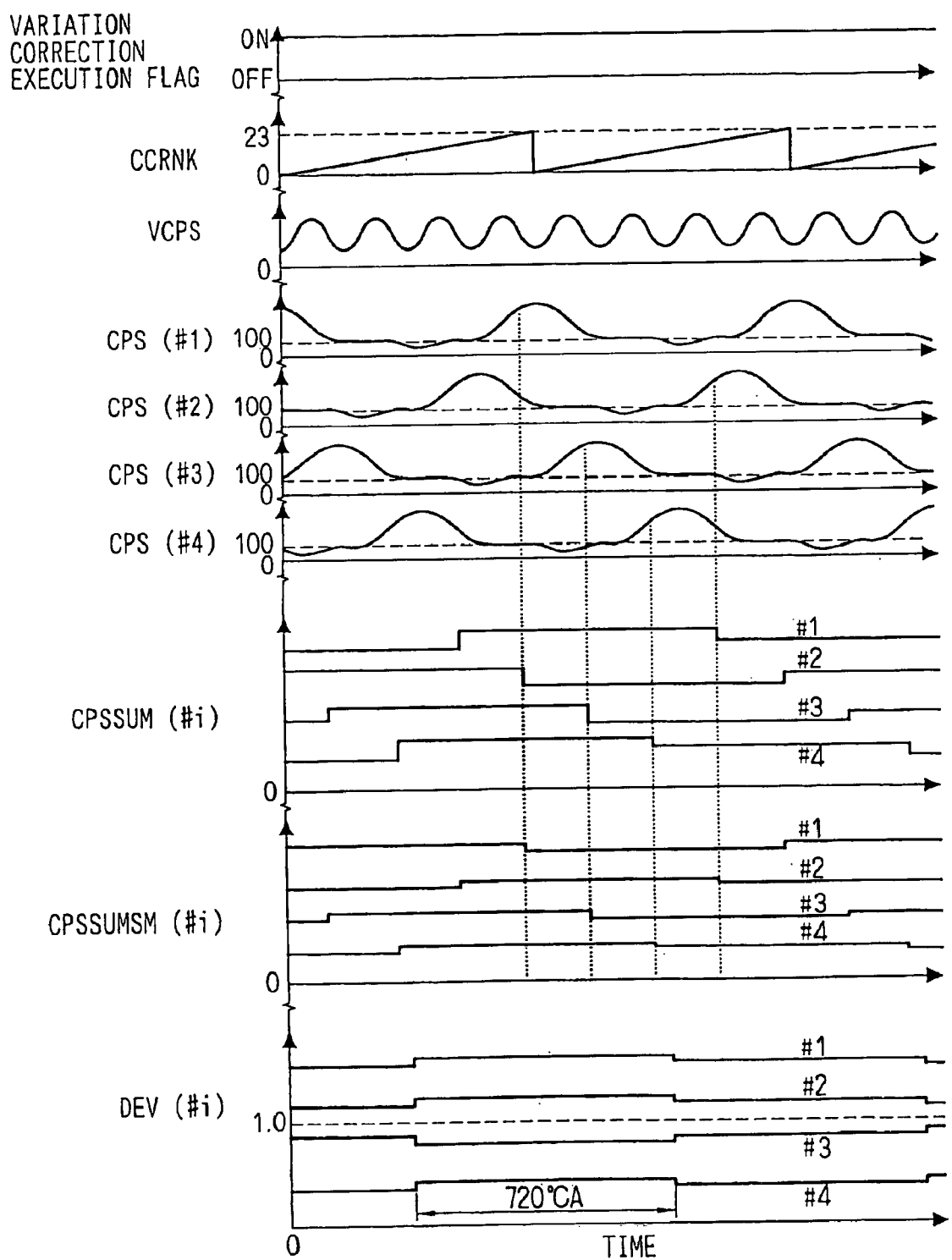
FIG. 47 is a time chart for explaining an example of processing for calculating the rate of cylinder-to-cylinder variations in intake air quantity according to the twelfth embodiment.

An example of execution of the cylinder-to-cylinder variation correction of the twelfth embodiment described above will be described using a time chart shown in FIG. 47.

In the period when the condition to execute cylinder-to-cylinder variation correction is met, the cylinder-to-cylinder variation correction execution flag is ON. The area of the in-cylinder pressure of each cylinder CPSSUM (#i) for the predetermined period is calculated for each compression stroke of each cylinder, and then the area of the in-cylinder pressure of each cylinder CPSSUM (#i) is conditioned among the cylinders in the same manner as the sixth embodiment to obtain an conditioned value of the area of the in-cylinder pressure of each cylinder CPSSUMSM (#i). In this manner, each conditioned value of the area of the CPSSUMSM (#i) is divided by the average of conditioned values of the areas of the in-cylinder pressures of all the cylinders. The calculation is performed every time the conditioned value of the area of the in-cylinder pressure of each cylinder CPSSUMSM (#i) (720° CA) is calculated. The obtained value is multiplied by the correction coefficient K2 to obtain the rate of cylinder-to-cylinder variations in intake air quantity of each cylinder DEV (#i). Other parts of the processing are the same as in the sixth embodiment.

In the twelfth embodiment described above, the same effect as the sixth embodiment can be achieved.

In the twelfth embodiment, the area of the in-cylinder pressure CPSSUM (#i) for a predetermined period is calculated from the output waveform from the in-cylinder pressure sensor 21a of each cylinder. The rate of cylinder-to-cylinder variations in intake air quantity of each cylinder DEV (#i) is calculated from the area of in-cylinder pressure of each cylinder CPSSUM (#i). However, it is also possible to convert the in-cylinder pressure CPS (#i) detected by the in-cylinder pressure sensor 21a of each cylinder 100 into the instantaneous airflow rate, then calculate the area of the intake air quantity of each cylinder 100 for a predetermined period. Subsequently, the rate of cylinder-to-cylinder variations in intake air quantity of each cylinder DEV (#i) is calculated from the area of intake air quantity of each cylinder.

In the embodiments from the first to the twelfth described above, the present invention is applied to the system in which the intake air quantity is controlled by controlling the variable intake valve. However, the present invention may also be applied to the system in which only the intake air quantity is controlled with the throttle.

Especially, in the embodiments from the first to the twelfth, in the system in which the intake air quantity is controlled only by the throttle valve, the amplitude of the intake air pulsation increases in the high-load range. In the high-load range, the throttle valve is fully opened or significantly opened, and thus the characteristic values (the maximum value, the minimum value, the area, and the like) of the intake air pulsation can easily be determined. Therefore, it is recommended to learn the learning value of cylinder-to-cylinder variations in this high-load range.

The scope of the present invention is not limited to the four-cylinder engine, but may be applied to the multi-cylinder engine having five or more, or three or less cylinders.

The method of calculating the rate of cylinder-to-cylinder variations may be modified as needed. What is important is to calculate the value of cylinder-to-cylinder variations based at least on one of the maximum value, the minimum value, the average value, the amplitude, the area, and the length of track for each predetermined period of the intake air quantity, the intake pipe pressure, and the in-cylinder pressure.

When the present invention is applied to the variable valve mechanism having a construction in which the intake valve 28 of each cylinder 100 is driven by an electromagnetic actuator, the lift amount of the intake valve of each cylinder 100 is corrected by correcting the control amount of the electromagnetic actuator of each cylinder 100 according to the final target lift amount of the intake valve VVLM for each cylinder, so that the intake air quantity of each cylinder 100 is corrected.

Other various changes and modifications are to be understood as being within the scope of the present invention as defined by the appended claims.

What is claimed is:

1. A cylinder-by-cylinder intake air quantity detecting apparatus for an internal combustion engine having a plurality of cylinders, the cylinder-by-cylinder intake air quantity detecting apparatus comprising:

a detecting unit including at least one of an airflow meter for detecting an intake air quantity flowing in an intake pipe, a pressure sensor for detecting intake pipe pressure in the intake pipe, and an in-cylinder pressure sensor for detecting in-cylinder pressure;

an area calculating unit for calculating the area of the intake air quantity of the output waveform from the detecting unit for a predetermined period for one of every intake stroke and every compression stroke of each cylinder;

a cylinder-to-cylinder intake air quantity variations calculating unit for calculating the rate of cylinder-to-cylinder variations in intake air quantity or the cylinder-by-cylinder intake air quantities according to the area of the intake air quantity for the predetermined period of each cylinder.

2. A cylinder-by-cylinder intake air quantity detecting apparatus according to claim 1, wherein the detecting unit detects at least one of the intake air quantity and the intake pipe pressure, and the area calculating unit sets the predetermined period to a period in which the intake air quantity is hardly subjected to an influence of a reflected wave from an intake air pulsation or an air intake interference of other cylinders.

3. A cylinder-by-cylinder intake air quantity detecting apparatus according to claim 2, wherein the area calculating unit sets the predetermined period to at least one of a period including a maximum value of the intake air quantity and a period including the minimum value of the intake pipe pressure.

4. A cylinder-by-cylinder intake air quantity detecting apparatus according to claim 2, wherein the area calculating unit sets the predetermined period to a valve-opening period of the intake valve.

5. A cylinder-by-cylinder intake air quantity detecting apparatus according to claim 2, wherein the detecting unit detects the intake air quantity, and the area calculating unit sets the predetermined period taking into account a detection delay of the detecting unit.

6. A cylinder-by-cylinder intake air quantity detecting apparatus according to claim 2, wherein the detecting unit detects the intake air quantity, and the area calculating unit sets the predetermined period to at least one of a period in which the intake air quantity is equal to or greater than an average value and a period in which the intake pipe pressure is less than an average value.

7. A cylinder-by-cylinder intake air quantity detecting apparatus according to claim 2, wherein the detecting unit detects the intake pipe pressure, and the area calculating unit calculates the area of the intake air quantity and converts the intake pipe pressure detected by the detecting unit to the intake air quantity.

8. A cylinder-by-cylinder intake air quantity detecting apparatus according to claim 2, wherein the detecting unit detects the intake pipe pressure, and the area calculating unit sets the predetermined period taking into account a detection delay of the detecting unit.

9. A cylinder-by-cylinder intake air quantity detecting apparatus according to claim 2, wherein the detecting unit detects the intake pipe pressure, and the area calculating unit sets the predetermined period to a period in which an intake air quantity converted from the intake pipe pressure becomes larger than an average value of the intake air quantity converted from the intake pipe pressure.

10. A cylinder-by-cylinder intake air quantity detecting apparatus according to claim 1, wherein the detecting unit detects the in-cylinder pressure, and the area calculating unit sets the predetermined period to the timing before ignition.

11. A cylinder-by-cylinder intake air quantity detecting apparatus according to claim 10, wherein the area calculating unit sets the predetermined period to a period including a maximum value of the in-cylinder pressure during one of a fuel-cut operation and a cranking operation.

* * * * *